US010306241B2

(12) United States Patent
Narroschke et al.

(10) Patent No.: US 10,306,241 B2
(45) Date of Patent: May 28, 2019

(54) EFFICIENT DECISIONS FOR DEBLOCKING

(71) Applicant: Sun Patent Trust, New York, NY (US)

(72) Inventors: Matthias Narroschke, Schaafheim (DE); Thomas Wedi, The Hague (NL); Semih Esenlik, Nazilli (TR)

(73) Assignee: SUN PATENT TRUST, New York, NY (US)

( * ) Notice: Subject to any disclaimer, the term of this patent is extended or adjusted under 35 U.S.C. 154(b) by 0 days.

(21) Appl. No.: 16/225,307

(22) Filed: Dec. 19, 2018

(65) Prior Publication Data
US 2019/0124341 A1 Apr. 25, 2019

Related U.S. Application Data

(63) Continuation of application No. 15/488,899, filed on Apr. 17, 2017, which is a continuation of application
(Continued)

(51) Int. Cl.
H04N 19/11 (2014.01)
H04N 19/80 (2014.01)
(Continued)

(52) U.S. Cl.
CPC ......... H04N 19/176 (2014.11); H04N 19/117 (2014.11); H04N 19/14 (2014.11);
(Continued)

(58) Field of Classification Search
CPC ...... H04N 19/117; H04N 19/80; H04N 19/82; H94N 21/23418; G06T 5/00; G06T 5/002; G06T 5/003
(Continued)

(56) References Cited

U.S. PATENT DOCUMENTS 8,184,689 B2   5/2012  Van Doren et al.
2005/0141616 A1  6/2005  Lim
(Continued)

FOREIGN PATENT DOCUMENTS

CN    1867075    11/2006
CN    101243690   8/2008
(Continued)

OTHER PUBLICATIONS

International Search Report dated Apr. 19, 2012 in International Application No. PCT/EP2012/000817.
(Continued)

Primary Examiner — Jeffery A Williams
(74) Attorney, Agent, or Firm — Wenderoth, Lind & Ponack, L.L.P.

(57) ABSTRACT

The present invention relates to deblocking filtering, which may be advantageously applied for block-wise encoding and decoding of image or video signal. In particular, the present invention relates to performing an efficient and accurate decision on whether or not to apply deblocking filtering on an image block. The efficient and accurate decision is achieved by performing individual decisions on whether or not to apply deblocking filtering for segments of a boundary between adjacent image blocks, wherein the individual decision are based on pixels comprised in a subset of the pixel lines that the image blocks are composed of.

2 Claims, 49 Drawing Sheets

Related U.S. Application Data

No. 15/378,418, filed on Dec. 14, 2016, now Pat. No. 9,667,978, which is a continuation of application No. 14/000,060, filed as application No. PCT/EP2012/000817 on Feb. 24, 2012, now Pat. No. 9,560,355.

(60) Provisional application No. 61/451,348, filed on Mar. 10, 2011, provisional application No. 61/446,766, filed on Feb. 25, 2011.

(51) Int. Cl.
  *H04N 19/14* (2014.01)
  *H04N 19/176* (2014.01)
  *H04N 19/86* (2014.01)
  *H04N 19/117* (2014.01)
  *H04N 19/82* (2014.01)

(52) U.S. Cl.
  CPC ............. *H04N 19/80* (2014.11); *H04N 19/82* (2014.11); *H04N 19/86* (2014.11)

(58) Field of Classification Search
  USPC .................................................... 375/240.29
  See application file for complete search history.

(56) References Cited

U.S. PATENT DOCUMENTS

| | | | |
|---|---|---|---|
| 2008/0232462 | A1 | 9/2008 | Van Doren et al. |
| 2009/0060376 | A1 | 3/2009 | Nam |
| 2011/0170795 | A1 | 7/2011 | Higuchi |
| 2011/0194614 | A1 | 8/2011 | Norkin et al. |
| 2012/0082219 | A1 | 4/2012 | Sun et al. |
| 2013/0051480 | A1* | 2/2013 | Norkin ................. H04N 19/176 375/240.29 |
| 2013/0251029 | A1 | 9/2013 | Ikeda |
| 2013/0287124 | A1 | 10/2013 | Norkin et al. |

FOREIGN PATENT DOCUMENTS

| | | |
|---|---|---|
| JP | 2006-270851 | 10/2006 |
| JP | 2012-165354 | 8/2012 |
| WO | 2010/035403 | 4/2010 |

OTHER PUBLICATIONS

Written Opinion of the International Searching Authority dated Apr. 19, 2012 in International Application No. PCT/EP2012/000817.
"Advanced video coding for generic audiovisual services", ITU-T Recommendation H. 264, Mar. 2010.
Thomas Wiegand et al., "WD1: Working Draft 1 of High-Efficiency Video Coding", Joint Collaborative Team on Video Coding (JCT-VC) of ITU-T SG16 WP3 and ISO/IEC JTC1/SC29/WG11, JCTVC-C403, Ver. 1, 3rd Meeting: Guangzhou, CN, Oct. 7-15, 2010.
Masaru Ikeda et al., "Parallel deblocking filter", Joint Collaborative Team on Video Coding (JCT-VC) of ITU-T SG16 WP3 and ISO/IEC JTC1/SC29/WG11, JCTVC-D263, 4th Meeting: , CH, Jan. 2011.
"Test Model under Consideration", Joint Collaborative Team on Video Coding (JCT-VC) of ITU-T SG16 WP3 and ISO/IEC JTC1/SC29/WG11, JCTVC-B205, 2nd Meeting: Geneva, CH, Jul. 21-28, 2010.
Gary Sullivan et al., "Meeting report of the fourth meeting of the Joint Collaborative Team on Video Coding (JCT-VC), Daegu, KR, Jan. 20-28, 2011", Joint Collaborative Team on Video Coding (JCT-VC), of ITU-T SG16 WP3 and ISO/IEC JTC1/SC29/WG11, JCTVC-D500, 4th Meeting: Daegu, KR, Jan. 20-28, 2011.
Yih Han Tan et al., "CE5: Cross-check of Qualcomm/Cisco proposal on improved intra prediction mode coding in LCEC", Joint Collaborative Team on Video Coding (JCT-VC) of ITU-T SG16 WP3 and ISO/IEC JTC1/SC29/WG11, JCTVC-D403 WG11, No. m19182, 4th Meeting: Daegu, KR, Jan. 20-28, 2011.
Matthias Narroschke et al: "Decisions for Deblocking", 5. JCT-VC Meeting; 96. MPEG Meeting; Mar. 16, 2011 to Mar. 23, 2011; Geneva; (Joint Collaborative Team on Video Coding of ISO/IEC JTC1/SC29/WG11 and ITU-T SG.16); URL:http://wftp.itu.int/av-arch/jctvc-site/, No. JCTVC-E251, Mar. 10, 2011 (Mar. 10, 2011), XP030008757, ISSN: 0000-0007 the whole document.
Ugur (Nokia) K et al: "Video coding technology proposal by Tandberg, Nokia, and Ericsson", 1. JCT-VC Meeting; Apr. 15, 2010 to Apr. 23, 2010; Dresden; (Joint Collaborative Team on Video Coding of ISO/IEC JTC1/SC29/WG11 and ITU-T SG.16); URL:http://wftp3.itu.int/av-arch/jctvc-site/,, No. XP030007562, Apr. 24, 2010 (Apr. 24, 2010), XP030007563, ISSN: 0000-0049, p. 48.
Sim D et al: "Modification of Deblocking Filter for Improvement of Coding Efficiency", 36. VCEG Meeting; Oct. 8, 2008 to Oct. 10, 2008; San Diego, US; (Video Coding Experts Group of ITU-TSG. 16), No. VCEG-AJ17, 6 Oct. 6, 2008 (Oct. 6, 2008), XP030003639, ISSN: 0000-0086 p. 2.
Office Action and Search Report dated Feb. 6, 2016 in Chinese Application No. 201280009365.X, with partial English translation.
Sim D et al: "Modification of Deblocking Filter for Improvement of Coding Efficiency", 36. VCEG Meeting; Oct. 8, 2008 to Oct. 10, 2008; San Diego, US; (Video Coding Experts Group of ITU-TSG. 16), No. VCEG-AJ17, 6 Oct. 6, 2008 (Oct. 6, 2008), XP030003639, ISSN: 0000-0086 pp. 1-7.
Office Action dated Jun. 30, 2016 in Chinese Patent Application No. 201280009365.X, with English translation of Search Report.
Summons to attend oral proceedings pursuant to Rule 115(1) EPC issued Oct. 27, 2016 in European Patent Application No. 12705802.2.

* cited by examiner

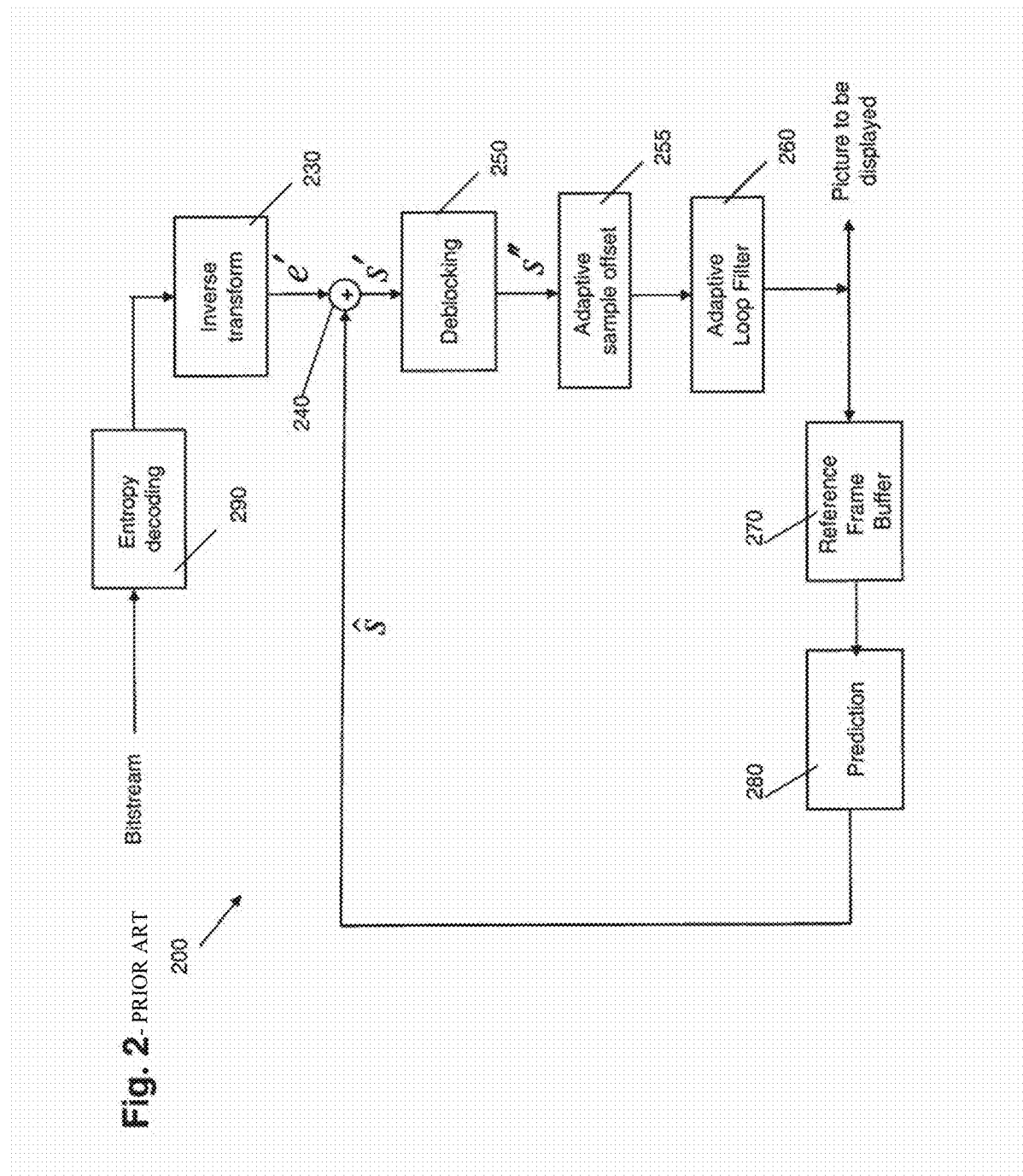
Fig. 2 - PRIOR ART

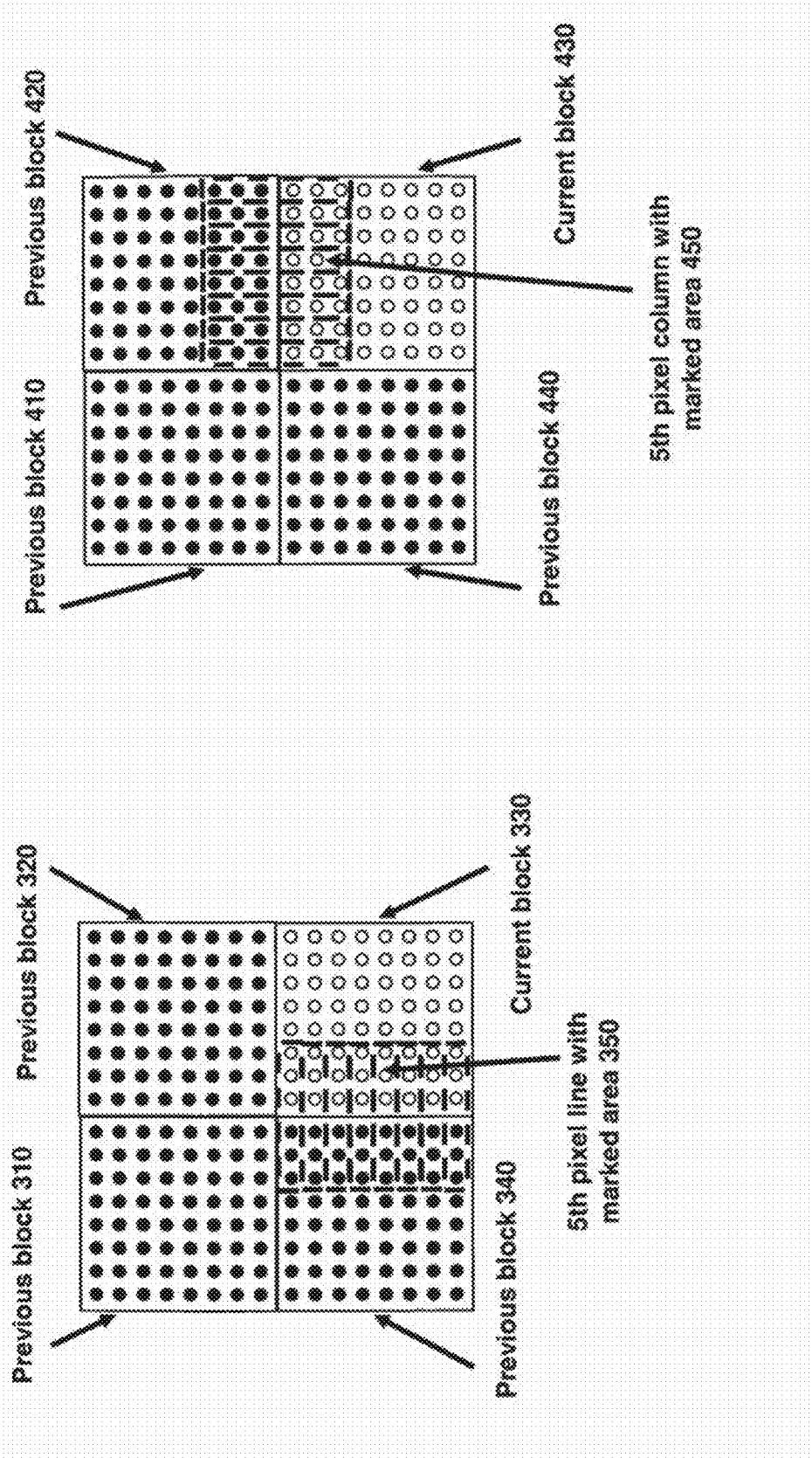

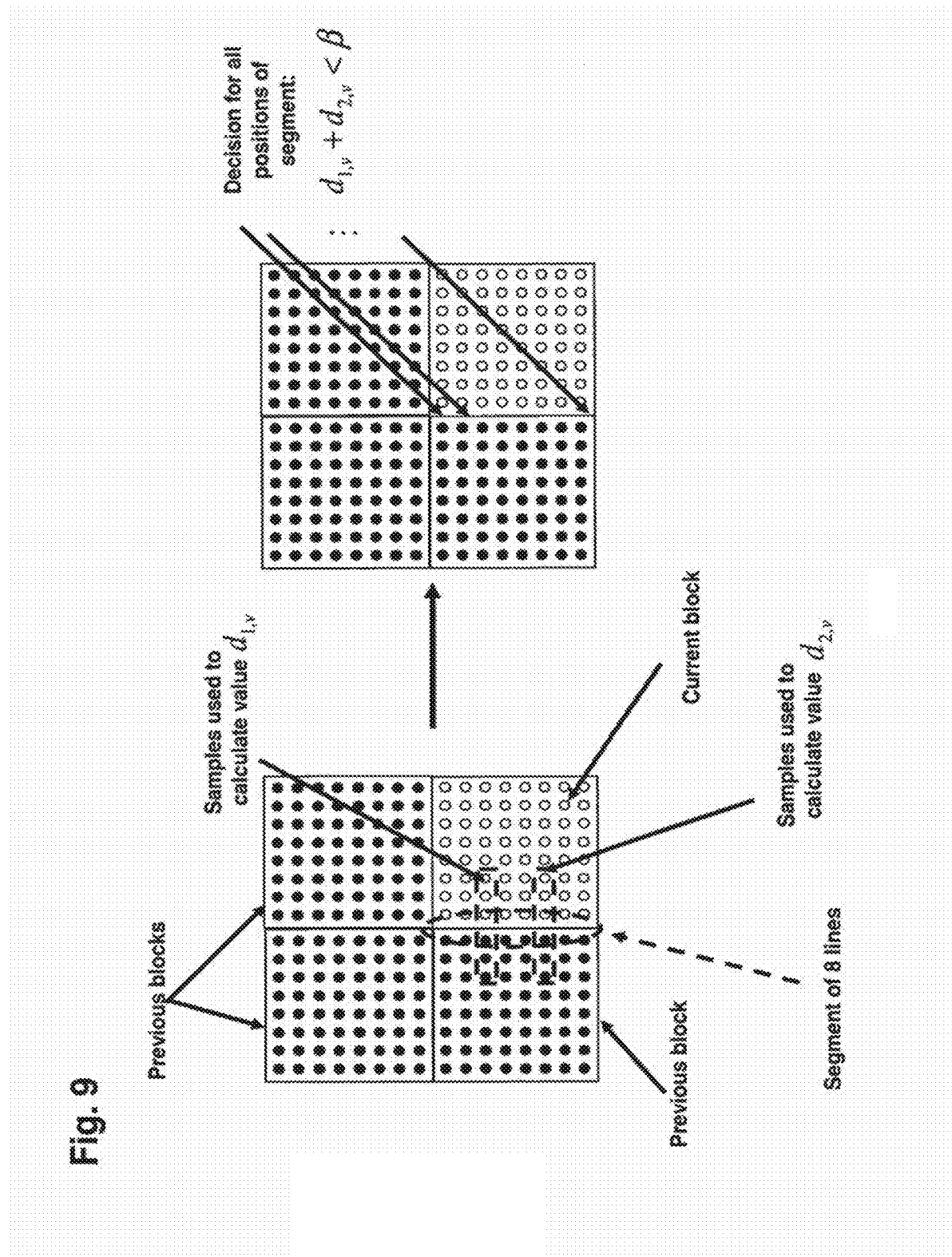

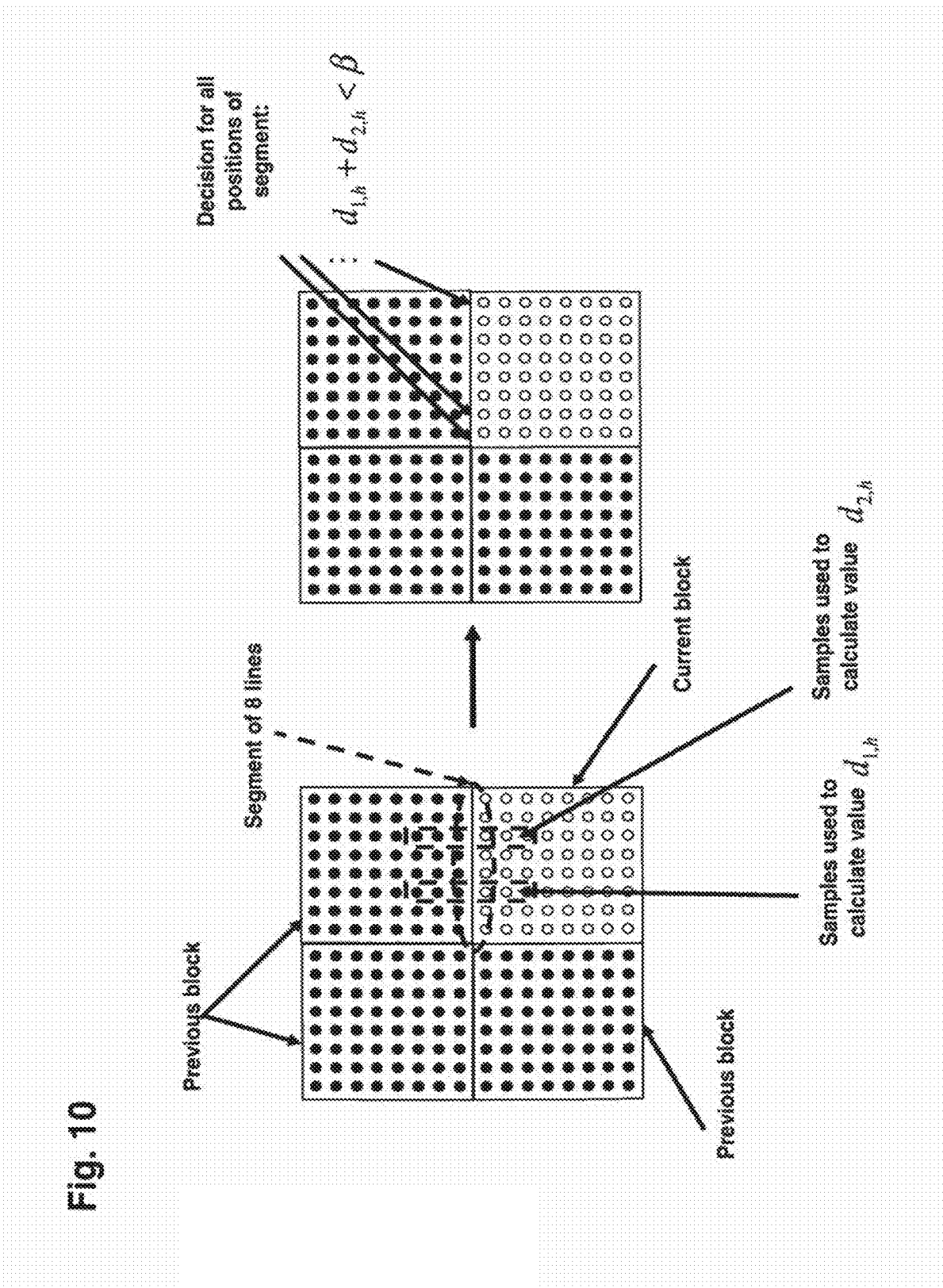

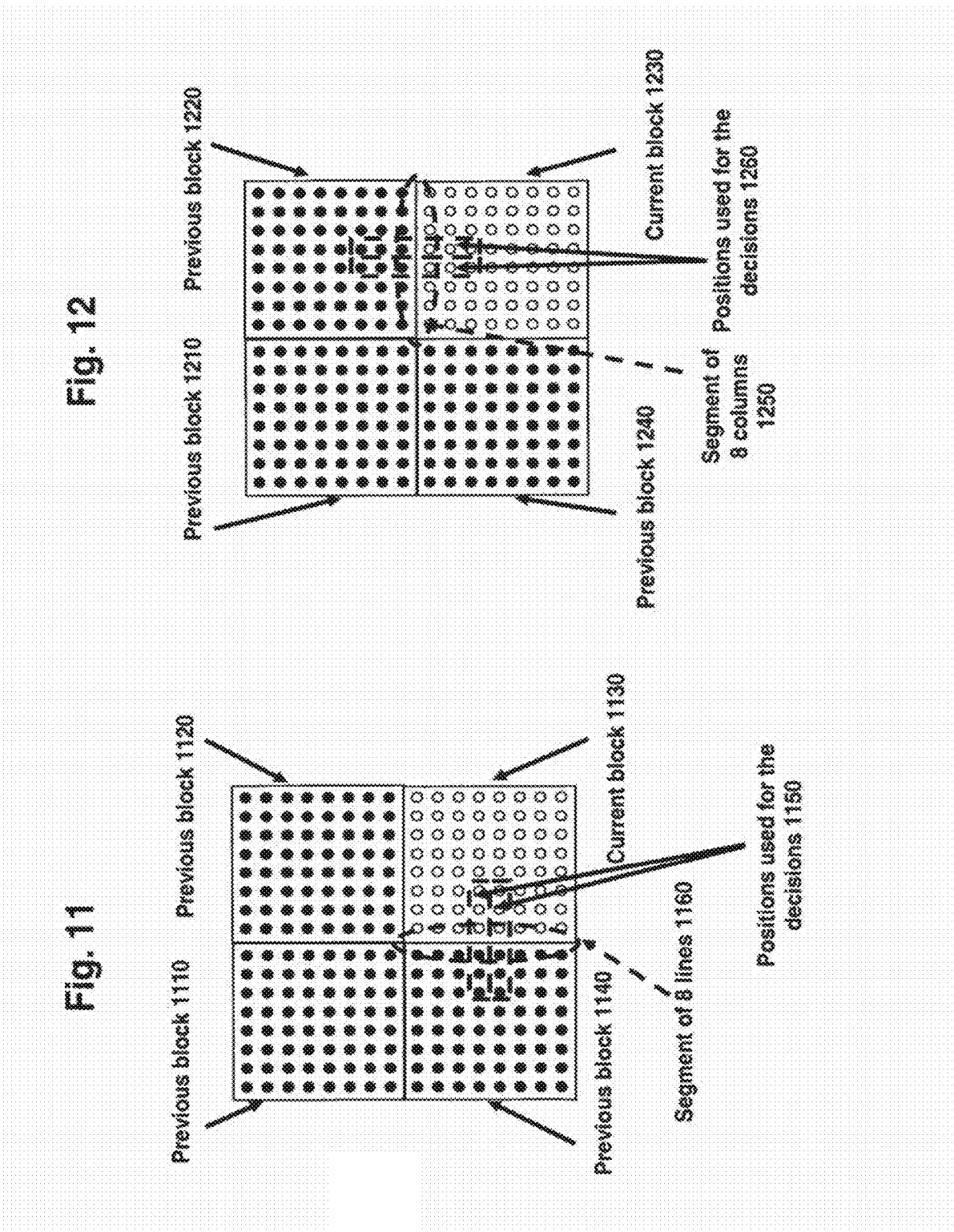

Fig. 26

Fig. 27
$d_2 = |p2_2 - 2 \cdot p1_2 + p0_2| + |q2_2 - 2 \cdot q1_2 + q0_2|$
$d_5 = |p2_5 - 2 \cdot p1_5 + p0_5| + |q2_5 - 2 \cdot q1_5 + q0_5|$ Fig. 28
$d_0 = |p2_0 - 2 \cdot p1_0 + p0_0| + |q2_0 - 2 \cdot q1_0 + q0_0|$
$d_7 = |p2_7 - 2 \cdot p1_7 + p0_7| + |q2_7 - 2 \cdot q1_7 + q0_7|$ Fig. 29
$d_0 = |p2_0 - 2 \cdot p1_0 + p0_0| + |q2_0 - 2 \cdot q1_0 + q0_0|$
$d_2 = |p2_2 - 2 \cdot p1_2 + p0_2| + |q2_2 - 2 \cdot q1_2 + q0_2|$
$d_5 = |p2_5 - 2 \cdot p1_5 + p0_5| + |q2_5 - 2 \cdot q1_5 + q0_5|$
$d_7 = |p2_7 - 2 \cdot p1_7 + p0_7| + |q2_7 - 2 \cdot q1_7 + q0_7|$

| Test Sequence | Coding configuration | QP | Subjective Quality |
|---|---|---|---|
| Kimono | Low delay, low complexity | 32 | No difference noticeable |
| Kimono | Random access, high efficiency | 37 | No difference noticeable |
| BQ_Mall | Low delay, low complexity | 32 | No difference noticeable |
| BQ_Mall | Random access, high efficiency | 37 | No difference noticeable |
| Vidyo3 | Low delay, low complexity | 32 | No difference noticeable |
| Vidyo3 | Low delay, high efficiency | 37 | Proposal sharper than reference without increase of blocking. Proposal has less color artifacts than reference. |

Fig. 55

| Corresponding standard | Driving frequency |
|---|---|
| MPEG4. AVC | 500MHz |
| MPEG2 | 350MHz |
| ... | ... |

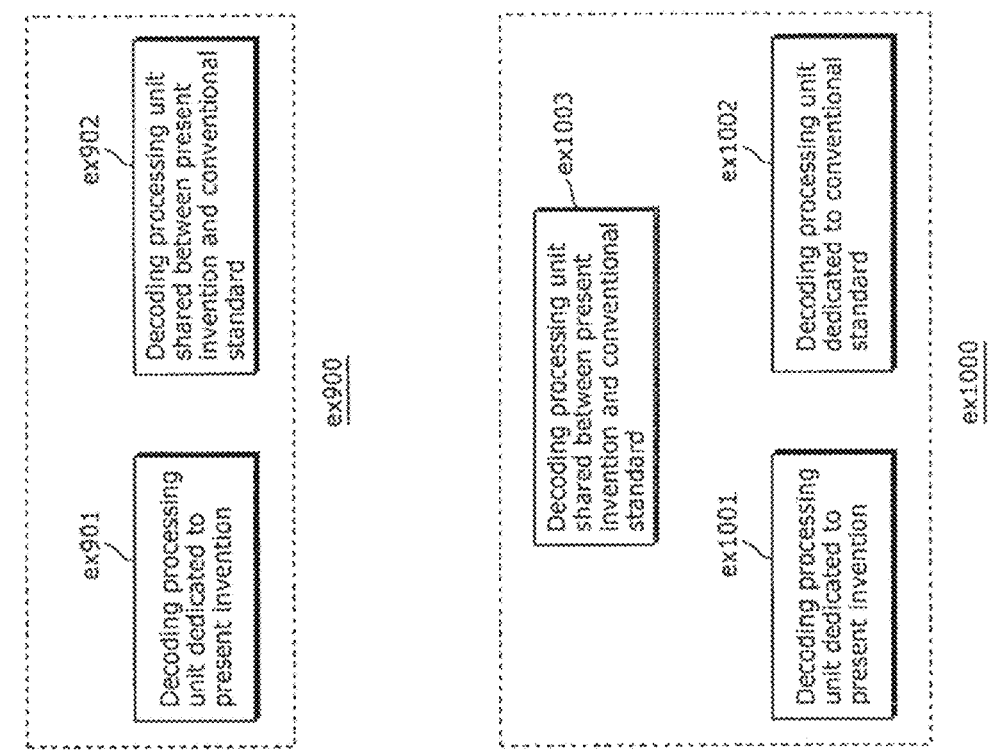

EFFICIENT DECISIONS FOR DEBLOCKING

The present invention relates to the filtering of images. In particular, the present invention relates to deblocking filtering and to decisions on enabling or disabling deblocking filtering for an image block of a video image.

BACKGROUND OF THE INVENTION

At present, the majority of standardized video coding algorithms are based on hybrid video coding. Hybrid video coding methods typically combine several different lossless and lossy compression schemes in order to achieve the desired compression gain. Hybrid video coding is also the basis for ITU-T standards (H.26x standards such as H.261, H.263) as well as ISO/IEC standards (MPEG-X standards such as MPEG-1, MPEG-2, and MPEG-4). The most recent and advanced video coding standard is currently the standard denoted as H.264/MPEG-4 advanced video coding (AVC) which is a result of standardization efforts by joint video team (JVT), a joint team of ITU-T and ISO/IEC MPEG groups. This codec is being further developed by Joint Collaborative Team on Video Coding (JCT-VC) under a name High-Efficiency Video Coding (HEVC), aiming, in particular at improvements of efficiency regarding the high-resolution video coding.

A video signal input to an encoder is a sequence of images called frames, each frame being a two-dimensional matrix of pixels. All the above-mentioned standards based on hybrid video coding include subdividing each individual video frame into smaller blocks consisting of a plurality of pixels. The size of the blocks may vary, for instance, in accordance with the content of the image. The way of coding may be typically varied on a per block basis. The largest possible size for such a block, for instance in HEVC, is 64×64 pixels. It is then called the largest coding unit (LCU). In H.264/MPEG-4 AVC, a macroblock (usually denoting a block of 16×16 pixels) was the basic image element, for which the encoding is performed, with a possibility to further divide it in smaller subblocks to which some of the coding/decoding steps were applied.

Typically, the encoding steps of a hybrid video coding include a spatial and/or a temporal prediction. Accordingly, each block to be encoded is first predicted using either the blocks in its spatial neighborhood or blocks from its temporal neighborhood, i.e. from previously encoded video frames. A block of differences between the block to be encoded and its prediction, also called block of prediction residuals, is then calculated. Another encoding step is a transformation of a block of residuals from the spatial (pixel) domain into a frequency domain. The transformation aims at reducing the correlation of the input block. Further encoding step is quantization of the transform coefficients. In this step the actual lossy (irreversible) compression takes place. Usually, the compressed transform coefficient values are further compacted (losslessly compressed) by means of an entropy coding. In addition, side information necessary for reconstruction of the encoded video signal is encoded and provided together with the encoded video signal. This is for example information about the spatial and/or temporal prediction, amount of quantization, etc.

FIG. 1 is an example of a state of the art hybrid coder 100, as for example a typical H.264/MPEG-4 AVC and/or HEVC video encoder. A subtractor 105 first determines differences e between a current block to be encoded of an input video image (input signal s) and a corresponding prediction block ŝ, which is used as a prediction of the current block to be encoded. The prediction signal may be obtained by a temporal or by a spatial prediction 180. The type of prediction can be varied on a per frame basis or on a per block basis. Blocks and/or frames predicted using temporal prediction are called "inter"-encoded and blocks and/or frames predicted using spatial prediction are called "intra"-encoded. Prediction signal using temporal prediction is derived from the previously encoded images, which are stored in a memory. The prediction signal using spatial prediction is derived from the values of boundary pixels in the neighboring blocks, which have been previously encoded, decoded, and stored in the memory. The difference e between the input signal and the prediction signal, denoted prediction error or residual, is transformed 110 resulting in coefficients, which are quantized 120. Entropy encoder 190 is then applied to the quantized coefficients in order to further reduce the amount of data to be stored and/or transmitted in a lossless way. This is mainly achieved by applying a code with code words of variable length wherein the length of a code word is chosen based on the probability of its occurrence.

Within the video encoder 100, a decoding unit is incorporated for obtaining a decoded (reconstructed) video signal s'. In compliance with the encoding steps, the decoding steps include dequantization and inverse transformation 130. The so obtained prediction error signal e' differs from the original prediction error signal due to the quantization error, called also quantization noise. A reconstructed image signal s' is then obtained by adding 140 the decoded prediction error signal e' to the prediction signals. In order to maintain the compatibility between the encoder side and the decoder side, the prediction signals is obtained based on the encoded and subsequently decoded video signal which is known at both sides the encoder and the decoder.

Due to the quantization, quantization noise is superposed to the reconstructed video signal. Due to the block-wise coding, the superposed noise often has blocking characteristics, which result, in particular for strong quantization, in visible block boundaries in the decoded image. Such blocking artifacts have a negative effect upon human visual perception. In order to reduce these artifacts, a deblocking filter 150 is applied to every reconstructed image block. The deblocking filter is applied to the reconstructed signal s'. Deblocking filter generally smoothes the block edges leading to an improved subjective quality of the decoded images. Moreover, since the filtered part of an image is used for the motion compensated prediction of further images, the filtering also reduces the prediction errors, and thus enables improvement of coding efficiency.

After a deblocking filter, an adaptive loop filter 160 may be applied to the image including the already deblocked signal s" for improving the pixel wise fidelity ("objective" quality). The adaptive loop filter (ALF) is used to compensate image distortion caused by compression. Typically, the adaptive loop filter is a Wiener Filter, as shown in FIG. 1, with filter coefficiency determined such that the mean square error (MSE) between the reconstructed s', and source images s is minimized. The coefficients of ALF may be calculated and transmitted on a frame basis. ALF can be applied to the entire frame (image of the video sequence) or the local areas (blocks). An additional side information indicating which areas are to be filtered may be transmitted (block-based, frame-based or quadtree-based).

In order to be decoded, inter-encoded blocks require also storing the previously encoded and subsequently decoded portions of image(s) in a reference frame buffer (not shown). An inter-encoded block is predicted 180 by employing motion compensated prediction. First, a best-matching block is found for the current block within the previously encoded and decoded video frames by a motion estimator. The best-matching block then becomes a prediction signal and the relative displacement (motion) between the current block and its best match is then signalized as motion data in the form of three-dimensional motion vectors within the side information provided together with the encoded video data. The three dimensions consist of two spatial dimensions and one temporal dimension. In order to optimize the prediction accuracy, motion vectors may be determined with a spatial sub-pixel resolution e.g. half pixel or quarter pixel resolution. A motion vector with spatial sub-pixel resolution may point to a spatial position within an already decoded frame where no real pixel value is available, i.e. a sub-pixel position. Hence, spatial interpolation of such pixel values is needed in order to perform motion compensated prediction. This may be achieved by an interpolation filter (in FIG. 1 integrated within Prediction block 180).

For both, the intra- and the inter-encoding modes, the differences e between the current input signal and the prediction signal are transformed 110 and quantized 120, resulting in the quantized coefficients. Generally, an orthogonal transformation such as a two-dimensional discrete cosine transformation (DCT) or an integer version thereof is employed since it reduces the correlation of the natural video images efficiently. After the transformation, lower frequency components are usually more important for image quality then high frequency components so that more bits can be spent for coding the low frequency components than the high frequency components. In the entropy coder, the two-dimensional matrix of quantized coefficients is converted into a one-dimensional array. Typically, this conversion is performed by a so-called zig-zag scanning, which starts with the DC-coefficient in the upper left corner of the two-dimensional array and scans the two-dimensional array in a predetermined sequence ending with an AC coefficient in the lower right corner. As the energy is typically concentrated in the left upper part of the two-dimensional matrix of coefficients, corresponding to the lower frequencies, the zig-zag scanning results in an array where usually the last values are zero. This allows for efficient encoding using run-length codes as a part of/before the actual entropy coding.

FIG. 2 illustrates a state of the art decoder 200 according to the H.264/MPEG-4 AVC or HEVC video coding standard. The encoded video signal (input signal to the decoder) first passes to entropy decoder 990, which decodes the quantized coefficients, the information elements necessary for decoding such as motion data, mode of prediction etc. The quantized coefficients are inversely scanned in order to obtain a two-dimensional matrix, which is then fed to inverse quantization and inverse transformation 230. After inverse quantization and inverse transformation 230, a decoded (quantized) prediction error signal e' is obtained, which corresponds to the differences obtained by subtracting the prediction signal from the signal input to the encoder in the case no quantization noise is introduced and no error occurred.

The prediction signal is obtained from either a temporal or a spatial prediction 280. The decoded information elements usually further include the information necessary for the prediction such as prediction type in the case of intra-prediction and motion data in the case of motion compensated prediction. The quantized prediction error signal in the spatial domain is then added with an adder 240 to the prediction signal obtained either from the motion compensated prediction or intra-frame prediction 280. The reconstructed image s' may be passed through a deblocking filter 250, sample adaptive offset processing, and an adaptive loop filter 260 and the resulting decoded signal is stored in the memory 270 to be applied for temporal or spatial prediction of the following blocks/images When compressing and decompressing an image, the blocking artifacts are typically the most annoying artifacts for the user. The deblocking filtering helps to improve the perceptual experience of the user by smoothing the edges between the blocks in the reconstructed image. One of the difficulties in deblocking filtering is to correctly decide between an edge caused by blocking due to the application of a quantizer and between edges which are part of the coded signal. Application of the deblocking filter is only desirable if the edge on the block boundary is due to compression artifacts. In other cases, by applying the deblocking filter, the reconstructed signal may be despaired, distorted. Another difficulty is the selection of an appropriate filter for deblocking filtering. Typically, the decision is made between several low pass filters with different frequency responses resulting in strong or weak low pass filtering. In order to decide whether deblocking filtering is to be applied and to select an appropriate filter, image data in the proximity of the boundary of two blocks are considered.

To summarize, state of the art hybrid video coders, see e.g. FIG. 1, apply block-wise prediction and block-wise prediction error coding. The prediction error coding includes a quantization step. Due to this block-wise processing, so called blocking artifacts occur, especially in the case of coarse quantization. A blocking artifact is associated with a large signal change at a block edge. These blocking artifacts are very annoying for the viewer. In order to reduce these blocking artifacts, deblocking filtering is applied, e.g. in the H.264/MPEG-4 AVC video coding standard or in the HM, which is the test model of the HEVC video coding standardization activity. Deblocking filters decide for each sample at a block boundary if it is filtered or not and apply a low pass filter in the case it is decided to filter. The aim of this decision is to filter only those samples, for which the large signal change at the block boundary results from the quantization applied in the block-wise processing. The result of this filtering is a smoothed signal at the block boundary. The smoothed signal suppresses or reduces the blocking artifacts. Those samples, for which the large signal change at the block boundary belongs to the original signal to be coded, should not be filtered in order to keep high frequencies and thus the visual sharpness. In the case of wrong decisions, the image is either unnecessarily smoothened or remains blocky.

According to the above, it is desirable to reliably judge whether a deblocking filtering needs to be applied at a block boundary between adjacent image blocks or not. The H.264/MPEG-4 AVC standard provides decision operations for the deblocking filtering on a block basis for the pixels close to the boundary in each individual pixel line, i.e., pixel row or pixel column respectively, at a block boundary. In general, the block size of the image blocks for which deblocking filtering processing is conducted in the H.264/MPEG-4 AVC standard is an 8 by 8 pixel block. It is noted, that for other purposes the smallest block size may be different, as, for example, prediction is supporting 4 by 4 blocks.

FIG. 3 illustrates the decisions for horizontal filtering of a vertical boundary/edge for each individual pixel line according to H.264/MPEG-4 AVC. FIG. 3 depicts four 8 by 8 pixel image blocks, the previously processed blocks 310, 320, 340 and the current block 330. At the vertical boundary between previously processed block 340 and current block 330 it is decided, whether deblocking filtering is applied or not. The pixel values of the pixel lines running perpendicular to the vertical boundary serve as a basis for decision for each individual pixel line. In particular, the pixel values in the marked area of each pixel line, as for instance the marked area 350 of the 5th pixel line, are the basis for the filtering decision.

Similarly, as shown in FIG. 4, decisions for vertical filtering of a horizontal boundary/edge are performed for each individual column of pixels. For instance, for the fifth column of the current block 430, the decision on whether to filter or not, the pixels of this column close to the boundary to the previously processed block 420 is performed based on the pixels marked by a dashed rectangle 450.

The decision process for each sample of either each individual pixel column or each individual pixel line, at the boundary is performed by utilizing pixel values of the adjacent blocks as shown in FIG. 5. In FIG. 5, block p represents the previously processed block 340 or 440 as shown in FIG. 3 or FIG. 4 with the pixel values p0, p1 and p2 of one line (row or column). Block q represents the current block 330 or 430, as in FIG. 3 or FIG. 4, with the pixel values q0, q1 and q2 in the same line. Pixel q0 is the pixel in the line closest to the boundary with the block q. Pixel q1 is the pixel in the same line, second closest to the boundary with the block q, etc. In particular, the pixels values p0 and q0 of the pixel line are filtered, if the following conditions are satisfied:

$|p_0-q_0|<\alpha(QP+Offset_A)$, $|p_1-p_0|<\beta(QP+Offset_B)$, and $|q_1-q_0|<\beta(QP+Offset_B)$, wherein, QP is a quantization parameter, $Offset_A$ and $Offset_B$ are slice level offsets, and $\beta$ is chosen to be smaller than $\alpha$. Further, pixel p1 of the line is filtered, if additionally $|p_2-p_0|<\beta(QP+Offset_B)$.

Further, the pixel of a pixel line or pixel column corresponding to the pixel value q1 is filtered if additionally $|q_2-q_0|<\beta(QP+Offset_B)$.

According to H.264/MPEG-4 AVC, for each individual pixel line (row or column for the respective horizontal and vertical deblocking filtering), decision operations as above are performed. The filtering can be switched on/off for each individual pixel line which is associated with a high accuracy for the deblocking decision. However, this approach is also associated with a high computational expense.

A decision process for application of a deblocking filtering with a lower computational expense as for the above mentioned H.264/MPG-4 AVC standard, is suggested in "High Efficiency Video Coding (HEVC) text specification Working Draft 1" (HM deblocking filter, JCTVC-C403), freely available under http://wftp3.itu.int/av-arch/jctvc-site/ 2010_10_C_Guangzhou/, which is incorporated herein by reference. Here, one deblocking filtering on/off decision is applied for the entire block boundary between two adjacent image blocks based only on information of pixel lines in the block. Also here the block size of the image blocks for which deblocking filtering processing is conducted is an 8 by 8 pixel.

The decision for horizontal filtering of a vertical edge/boundary according to JCTVC-C403 is described in the following by referring to FIGS. 6, 8 and 9. FIG. 6 depicts four 8 by 8 pixel blocks, the previously processed blocks 610, 620, 640 and the current block 630. The vertical boundary between the previous block 640 and the current block 630 is the boundary for which it is decided, whether deblocking filtering is to be applied or not. The vertical boundary extends over a boundary segment corresponding to 8 lines (rows) 660. The $3^{rd}$ and the $6^{th}$ pixel line, which are oriented perpendicular to the vertical boundary, serve as a basis for a deblocking filtering decision. In particular, the pixel values in the marked area 650 of the $3^{rd}$ and the $6^{th}$ pixel line are used as a basis for the filtering decision. Hence, the filtering decision of the entire boundary corresponding to the segment of 8 lines 660, will be based on only a subset of two out of 8 pixel lines of the block.

Similarly, referring to FIG. 7, the decision for vertical filtering of a horizontal edge/boundary according to JCTVC-C403 is based on the pixel values of only two pixel columns 760 out of the segment of 8 columns 750, which constitutes the horizontal boundary.

FIG. 8 shows a matrix of pixel values, which corresponds to parts of the previous block 640 and the current block 630 of FIG. 6. The pixel values in the matrix are $p_{i,j}$ and $q_{i,j}$, with i being an index varying perpendicular to the boundary between the blocks and with j being an index varying along to the boundary between the blocks. Index i in FIG. 8 varies only in the range from 0 to 3, corresponding to the pixel positions within a line to be filtered, which are employed for the decision and/or filtering. The remaining pixel positions of the previous and the current block are not shown. Index j in FIG. 8 varies in the range from 0 to 7, corresponding to the 8 pixel rows in the block, the vertical boundary of which is to be filtered. The two pixel lines 820 with indexes j=2 and j=5, which correspond to the respective $3^{rd}$ and the $6^{th}$ pixel lines, are used as a basis for the filtering decision (on/off decision) for the entire block boundary and are marked with dashed lines. In order to decide whether the segment of 8 pixel lines, which correspond to the entire boundary, is filtered, the following condition is evaluated:

$|p2_2-2 \cdot 1_2+p0_2|+|q2_2-2 \cdot q1_2+q0_2|+|p2_5-2 \cdot p15+p0_5|+ |q2_5-2 \cdot q1_5+q0_5|<\beta$, wherein $\beta$ is a threshold value. If the above condition is true, it is decided that the filtering is to be applied to all 8 lines of the boundary.

This decision process is further depicted in FIG. 9. When the upper equation is separated into a term $d_{1,v}$, containing only pixel values of the pixel line with index j=2 and a term $d_{2,v}$, containing only pixel values of the line with index j=5, the decision for filtering can be rewritten as:

$d_{1,v}+d_{2,v}<\beta$, wherein $d_{1,v}=|p2_2-2 \cdot p1_2+p0_2|+|q2_2-2 \cdot q1_2+q0_2|$ and $d_{2,v}=|p2_5-2 \cdot p1_5+p0_5|+|q2_5-2 \cdot q1_5+q0_5|$.

Hence, by use of the two values $d_{1,v}$ and $d_{2,v}$, it is decided by the threshold operation whether the entire vertical boundary is to be filtered or not. The index v is used herein to indicate that a decision for a vertical boundary is assessed.

FIG. 8 shows a matrix of pixel values forming boundary portions of two neighbouring blocks A and B. It is noted that this boundary may also be a horizontal boundary, so that the block A is a previously processed block and block B is the current block, block A being the top neighbour of block B. This arrangement corresponds to parts of the previous block 720 and the current block 730 in FIG. 7. The pixel values in the matrix are $p_{i,j}$ and $q_{i,j}$, with i being an index varying perpendicular to the boundary between the blocks, the index i ranging from 0 to 3 in this example corresponding to only the part of the block A and B shown, and with the index j varying along the boundary between the blocks A and B, ranging from 0 to 7 corresponding to the number of lines (in third case columns) to be processed by deblocking filtering. In this context, "processing" or "deblocking processing" includes deciding whether deblocking filtering is to be applied or not and/or selection of the filter type. The type of filter here refers to a weak, strong or no filter for filtering pixels around the boundary in a particular line of the block. The derivation process of boundary filtering strength is described, for instance, in section 8.1.6 of the above mentioned "High Efficiency Video Coding (HEVC) text specification Working Draft 1". In particular, when it is decided that the block is to be filtered, an individual decision is performed for each line for deciding whether a strong filter or a weak filter is to be applied. If it is decided that a weak filter is to be applied, it is tested whether it is to be applied to the line at all. A strong filter in this sense is applied to more pixels around the boundary in the pixel line than the weak filter. In general, a strong filter is a filter with a narrower pass-band than the weak filter.

The two pixel columns 820 with indexes j=2 and j=5, which correspond to the $3^{rd}$ and the $6^{th}$ pixel column, are used as a basis for the filtering decision and are marked with dashed lines. The horizontal boundary is filtered if $$|p2_2-2\cdot p1_2+p0_2|+|q2_2-2\cdot q1_2+q0_2|+|p2_5-2\cdot p1_5+p0_5|+|q2_5-2\cdot q1_5+q0_5|<\beta,$$

wherein β is again a threshold value. If the above decision is true, filtering is applied to all 8 columns of the horizontal boundary, which corresponds to entire boundary. This decision process is further depicted in FIG. 10. When the upper equation is separated into a term $d_{1,h}$ containing only pixel values of the pixel column with index j=2 and a term $d_{2,h}$, containing only pixel values of the pixel column with index j=5, the decision for filtering can be rewritten as:

$$d_{1,h}+d_{2,h}<\beta,$$

wherein $$d_{1,h}=|p2_2-2\cdot p1_2+p0_2|+|q2_2-2\cdot q1_2+q0_2|$$

and $$d_{2,h}=|p2_5-2\cdot p1_5+p0_5|+|q2_5-2\cdot q1_5+q0_5|.$$

Hence, by the use of the two values $d_{1,h}$ and $d_{2,h}$, it is decided by the threshold operation if the entire horizontal boundary is filtered or not. The index h is hereby used to indicate that a decision for a horizontal boundary is assessed.

To summarize, according to JVCT-D403, the filtering can be switched on/off for the entire boundary based on only two pixel lines or pixel columns perpendicular to that boundary. For only two positions of each segment of 8 lines/columns, a decision process is performed. The filtering can be switched on/off for each segment of 8 lines/columns, corresponding to the entire block. This is associated with a lower computational expense but also with a lower accuracy of the decisions.

In contribution JCTVC-D263, "Parallel deblocking Filter", Daegu, January 2011, freely available at http://wftp3.itu.int/av-arch/jctvc-site/2011_01_D_Daegu/which is incorporated herein by reference, the decision operations for deblocking filtering of a block are performed similarly to JCTVC-C403: One deblocking filtering on/off decision is applied for the entire block boundary based only on pixel values of two pixel rows, or pixel columns respectively, of the two vertically or horizontally adjacent image blocks. However, the difference between the two approaches is that the pixel rows, or pixel columns respectively, which are used as a basis for the decision whether the boundary is filtered or not, have a different position in the block.

The decision for horizontal filtering of a vertical boundary/edge according to JCTVC-D263 is briefly described in the following by referring to FIGS. 11 and 13. In FIG. 11, the pixel lines used as a basis for deciding on whether to filter or not, are the 4th and $5^{th}$ lines 1160 at the boundary between the previous 1140 and the current block 1130. The entire vertical boundary corresponds to a segment of 8 lines 1150.

FIG. 13 shows a matrix of pixel values forming parts of the blocks A and B around a common boundary. The blocks A and B correspond to the previous block 1140 and the current block 1130 of FIG. 11, respectively. The pixel values in the matrix are $p_{i,j}$ and $q_{i,j}$, with i being an index varying perpendicular to the boundary between the blocks and ranging from 0 to 3, and with j being an index varying along to the boundary between the blocks and ranging from 0 to 7. The two pixel lines 1320 with indexes j=3 and j=4, which correspond to the 4th and the 5th pixel line, are used as a basis for the filtering decision(s) and are marked with dashed lines. The following condition is evaluated in order to judge whether to filter or not the pixels close to the boundary in the current block:

$$|p2_3-2\cdot p1_3+p0_3|+|q2_3-2\cdot q1_3+q0_3|+|p2_4-2\cdot p1_4+p0_4|+|q2_4-2\cdot q1_4+q0_4|<\beta,$$

wherein β is a threshold value. If the above decision is true, filtering and/or further decision is performed for all lines of the boundary which corresponds to a segment comprising 8 lines. When the upper equation is separated into a term $d_{1,v}$, containing only pixel values of the pixel line with index j=3 and a term $d_{2,v}$, containing only pixel values of the line with index j=4, the decision for filtering can be rewritten as:

$$d_{1,v}+d_{2,v}<\beta,$$

wherein $$d_{1,v}=|p2_3-2\cdot p1_3+p0_3|+|q2_3-2\cdot q1_3+q0_3|$$

and $$d_{2,v}=|p2_4-2\cdot p1_4+p0_4|+|q2_4-2\cdot q1_4+q0_4|.$$

Hence, by the use of the two values $d_{1,v}$ and $d_{2,v}$, it is decided by the threshold operation if all 8 lines of the corresponding segment are filtered or not. The index v is hereby used to indicate that a decision for a vertical boundary is assessed.

Similarly, as shown in FIG. 12, the decision for vertical filtering of a horizontal edge/boundary between a current block 1230 and a previous block 1220 according to JCTVC-D263 is based on the pixel values of only two columns 1260 out of the segment 1250 of pixels from 8 columns which constitutes the horizontal boundary between the blocks 1230 and 1220.

FIG. 13 may be also seen as corresponding to parts of the previous block 1220 and the current block 1230 of FIG. 12. The pixel values in the matrix are $p_{i,j}$ and $q_{i,j}$, with i being an index varying perpendicular to the boundary between the blocks, ranging from 0 to 3 and with j being an index varying along to the boundary between the blocks, ranging from 0 to 7. The two pixel columns 1320 with indexes j=3 and j=4, which in this example correspond to the $4^{th}$ and the $5^{th}$ pixel column, are used as a basis for the filtering decision and are marked with dashed lines. Accordingly, the horizontal boundary is filtered when $$|p2_3-2 \cdot p1_3+p0_3|+|q2_3-2 \cdot q1_3+q0_3|+|p2_4-2 \cdot p1_4+p0_4|+ |q2_4-2 \cdot q1_4+q0_4|<\beta,$$

wherein β is a threshold value. If the above condition is true, filtering is applied to all columns of the boundary corresponding to one segment which is composed of 8 columns. When the upper equation is separated into a term $d_{1,h}$, containing only pixel values of the column with index j=3 and a term $d_{2,h}$, containing only pixel values of the column with index j=4, the decision for filtering can be rewritten as:

$$d_{1,h}+d_{2,h}<\beta,$$

wherein $$d_{1,h}=|p2_3-2 \cdot p1_3+p0_3|+|q2_3-2 \cdot q1_3+q0_3|$$

and $$d_{2,h}=|p2_4-2 \cdot p1_4+p0_4|+|q2_4-2 \cdot q1_4+q0_4|.$$

Hence, by using the two values $d_{1,h}$ and $d_{2,h}$, it is decided by the threshold operation whether all 8 columns of the segment 1010 are filtered or not. The index h is hereby used to indicate that a decision for a horizontal boundary is assessed.

To summarize, similarly to the JVCT-C403, according to JVCT-D263, the filtering can be switched on/off for the entire boundary segment based on only two pixel lines or pixel columns from this segment. For only two positions of each segment of 8 lines (rows or columns), a decision process is performed. Thus, the filtering can be switched on/off for each segment of 8 lines/columns. This is associated with a low computational expense but also with a low accuracy of the decisions. An advantage of JCTVC-D263 over JCTVC-C403 is that the use of other samples allows a higher degree of a parallel processing. However, both approaches JCTVC-C403 and JCTVC-D263 provide a lower accuracy of decisions in comparison with, for example, H.264/MPEG-4 AVC.

In H.264/MPEG-4 AVC, the decisions are performed as shown in FIG. 2 to FIG. 5. At each pixel position at a block boundary, individual values are calculated using samples adjacent to the block boundary. Based on these individual values, individual decision operations are performed at each position of (for each line perpendicular to) the block boundary. This is associated with a high computational expense while providing a high accuracy of the decisions. In JCTVC-C403, pixels at the block edges form segments of 8 lines/columns (corresponding to the smallest block size used for the deblocking filtering) as shown in FIG. 6 and FIG. 7. For each segment of 8 lines/columns, values are calculated only for a subset of positions, in the examples above for only two positions rather than for all 8 positions. Based on these values, one single decision is performed whether to filter all 8 lines/columns of the segment or not. Compared to H.264/MPEG-4 AVC the computational expense is reduced since less values are calculated. The term value refers to the measure based on values of the pixels in a line close to the boundary such as $d_{1,v}$ and $d_{2,v}$ or $d_{1,h}$, or $d_{2,h}$ as shown above. In addition, the memory bandwidth is reduced since for the calculation of values, less samples need to be accessed from the memory. However, also the accuracy of the decisions is reduced compared to the accuracy of the decisions in H.264/MPEG-4 AVC. In JCTVC-D263, the calculation of values and the decision operations are performed similar to the JCTVC-C403. The difference is that samples at other positions of the segments of 8 lines/columns are used to calculate the values. The use of these other samples allows a higher degree a parallel processing. Compared to JCTVC-C403, the computational expense as well as the memory bandwidth is the same. However, the accuracy of the decisions is further reduced. Details are explained in FIG. 11 to FIG. 13. Thus, the known approaches are either associated with a high computational expense and high memory bandwidth or with a low accuracy of the decisions. A low accuracy of the decisions, on the other hand, may result to a low coding efficiency. High computational expense and high memory bandwidth may both lead to high implementation costs.

SUMMARY OF THE INVENTION

In view of the above problems with the existing deblocking filtering approaches, the present invention aims to provide a more efficient deblocking filtering with improved accuracy and reduced computational expenses.

It is the particular approach of the present invention to judge whether or not to apply a deblocking filter to segments of the boundary of a block by judging individually for each segment of the boundary based on pixels comprised in a subset of pixel lines of the block.

According to an aspect of the present invention, a method for deblocking processing of an image divided into blocks, of which the boundaries are to be processed, is provided, wherein each block is composed of pixel lines perpendicular to a boundary with an adjacent block, the method comprising the steps of judging whether or not to apply a deblocking filter to segments of the boundary of the block by judging individually for each segment of the boundary based on pixels comprised in a subset of pixel lines of the block, and applying or not applying the deblocking filter to the segments of the boundary according to the result of the respective individual judgements According to another aspect of the present invention, an apparatus for deblocking processing of an image divided into blocks, of which the boundaries are to be processed, is provided, wherein each block is composed of pixel lines perpendicular to a boundary with an adjacent block, the apparatus comprising a judging unit configured to judge whether or not to apply a deblocking filter to segments of the boundary of the block by judging individually for each segment of the boundary based on pixels comprised in a subset of pixel lines of the block, and a deblocking filtering unit configured to apply or not apply the deblocking filter to the segments of the boundary according to the result of the respective individual judgements.

The above and other objects and features of the present invention will become more apparent from the following description and preferred embodiments given in conjunction with the accompanying drawings in which:

FIG. 2 is a block diagram illustrating an example of a state of the art hybrid decoder;

FIG. 3 is a schematic drawing illustrating the decisions for horizontal deblocking filtering of a vertical edge according to H.264/MPEG-4 AVC;

FIG. 4 is a schematic drawing illustrating decisions for vertical deblocking filtering of a horizontal edge according to H.264/MPEG-4 AVC;

FIG. 9 is a schematic drawing illustrating the decision process for each sample at the block boundary whether to filter or not according to JCTVC-C403 for horizontal filtering of a vertical edge;

FIG. 10 is a schematic drawing illustrating a decision process for each sample at the block boundary whether to filter or not according to JCTVC-C403 for vertical filtering of a horizontal edge as according to FIG. 7;

FIG. 11 is a schematic drawing illustrating the decision process for each sample at the block boundary whether to filter or not according to JCTVC-D263 for horizontal filtering of a vertical boundary;

FIG. 12 is a schematic drawing illustrating the decision process for each sample at the block boundary whether to filter or not according to JCTVC-D263 for vertical filtering of a horizontal boundary;

FIG. 26 shows the notation of a part of a vertical edge for deblocking;

FIG. 27 shows an illustration of the samples used to decide whether to filter or not according to the HM2.0;

FIG. 28 shows an illustration of the samples used to decide whether to filter or not similar as in H.264/MPEG-4 AVC;

FIG. 29 shows an illustration of the samples used to decide whether to filter or not according to an embodiment of the invention;

FIG. 30 shows BD-bit rates and run time ratios of the decisions similar as in H.264/MPEG-4 AVC compared to the reference HM2.0;

FIG. 31 shows BD-bit rates and run time ratios of the decisions compromising HM2.0 and H.264/MPEG-4 AVC compared to the reference HM2.0;

FIG. 32 illustrates subjective quality of the approach of an embodiment of the present invention compared to the reference with the results shown in the table;

FIG. 55 is a schematic drawing showing an example of a look-up table in which the standards of video data are associated with the driving frequencies;

FIG. 56A is a schematic drawing showing an example of a configuration for sharing a module of a signal processing unit;

FIG. 56B is a schematic drawing showing another example of a configuration for sharing a module of a signal processing unit;

DETAILED DESCRIPTION

Figure 1:
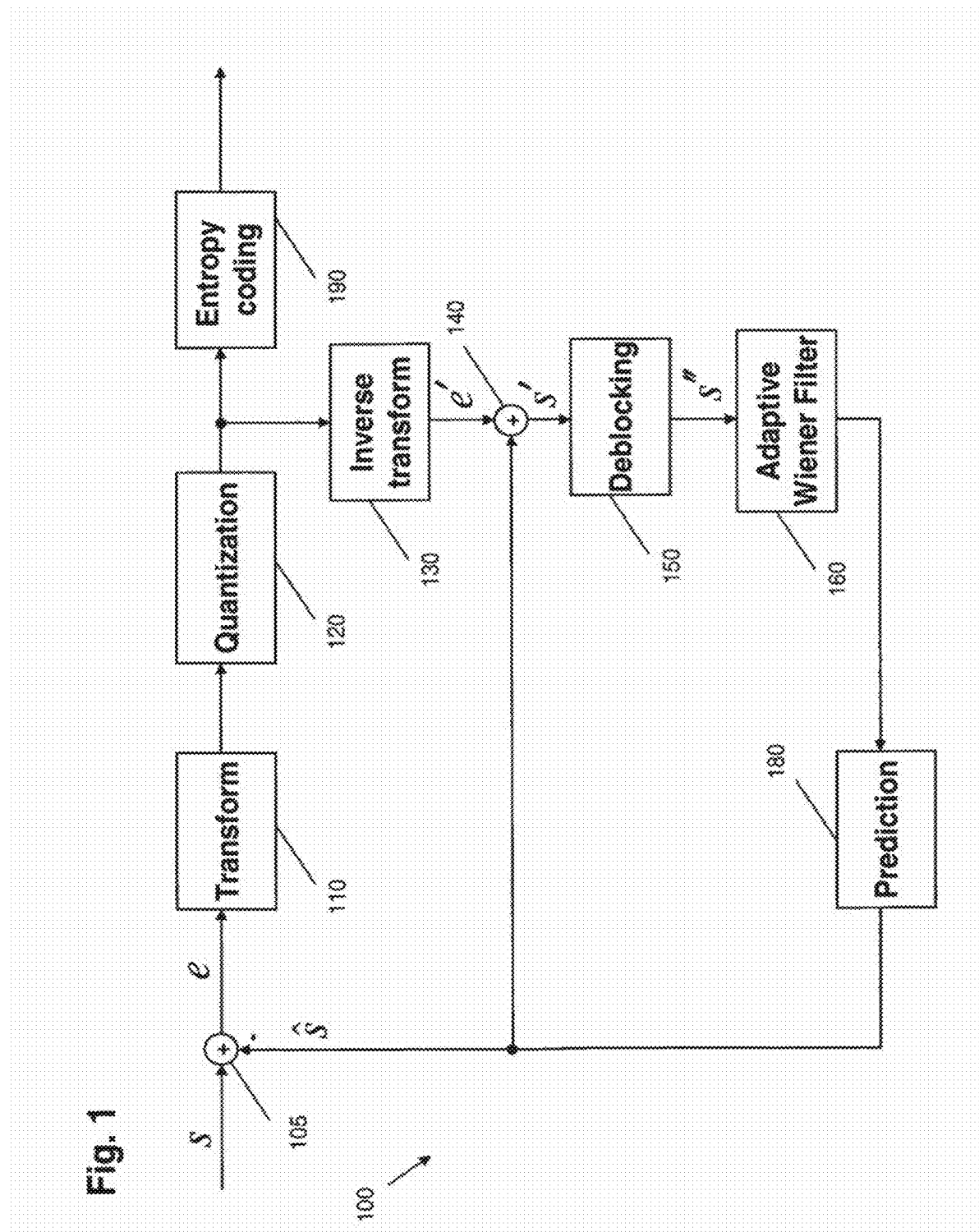
FIG. 1 is a block diagram illustrating an example of a state of the art hybrid coder.
Figure 5:
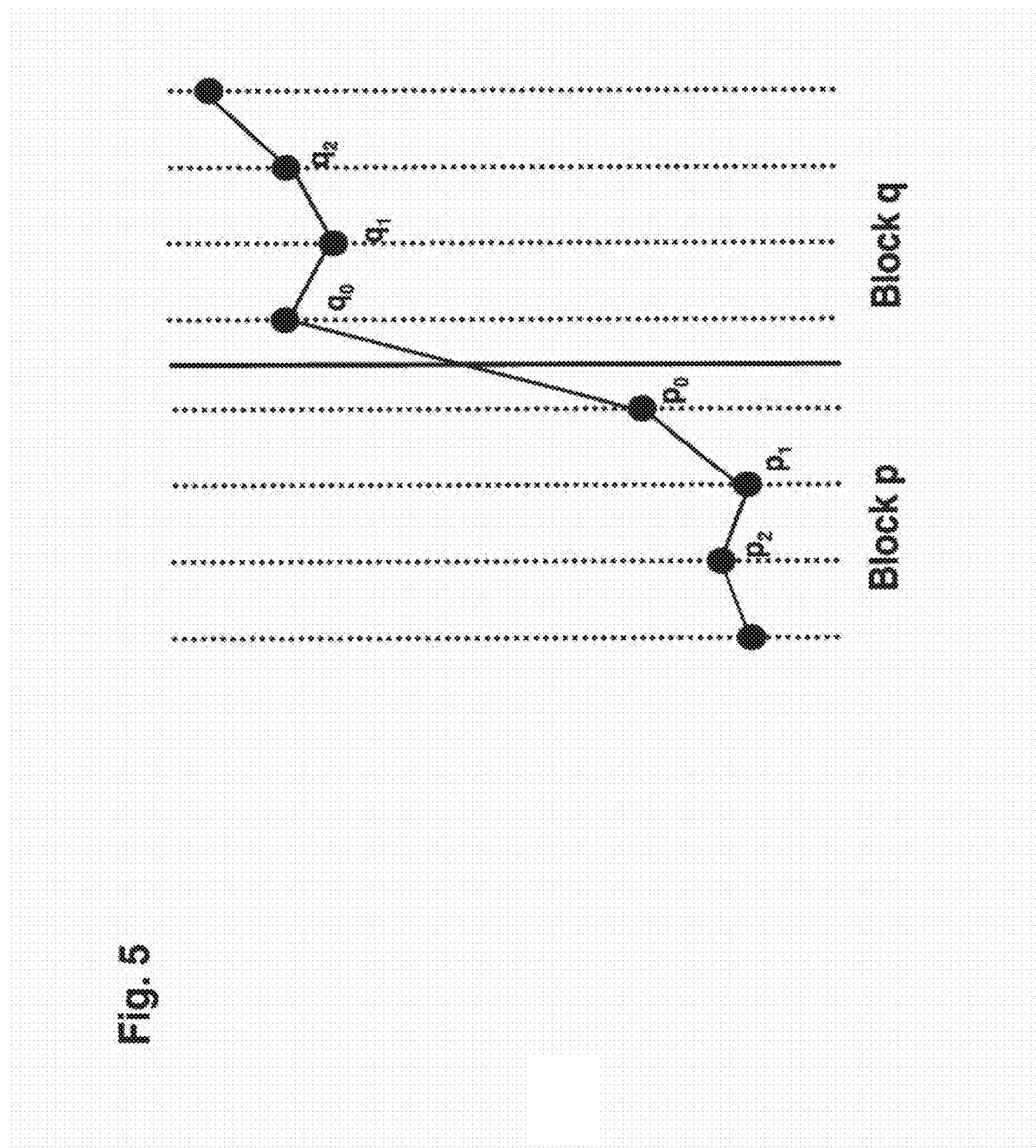
FIG. 5 is a schematic drawing illustrating the decision process for each sample at the block boundary whether to filter or not according to H.264/MPEG-4AVC.
Figure 6:
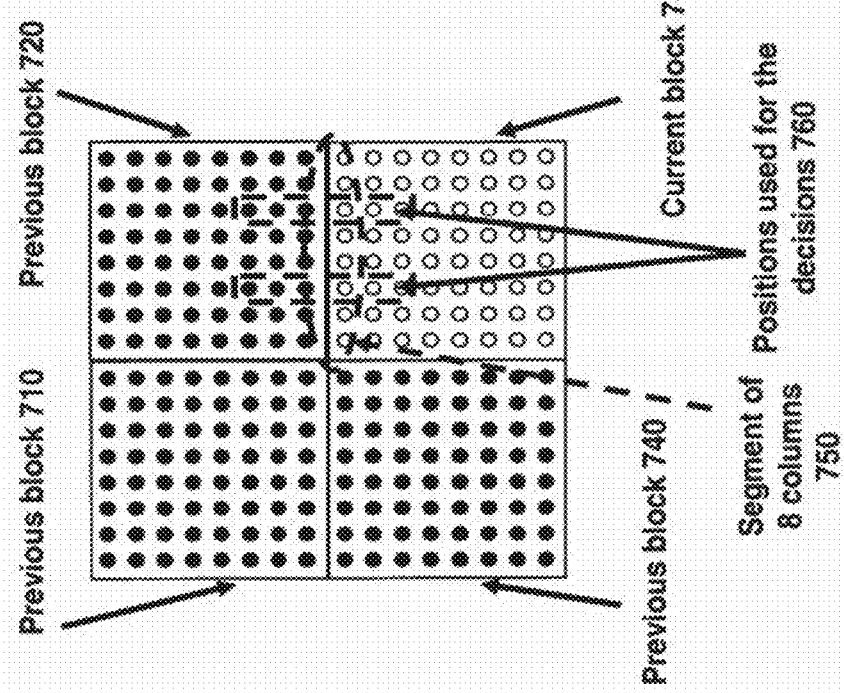
FIG. 6 is a schematic drawing illustrating the decision process for each sample at the block boundary whether to filter or not according to JCTVC-C403 for horizontal filtering of a vertical edge.
Figure 7:
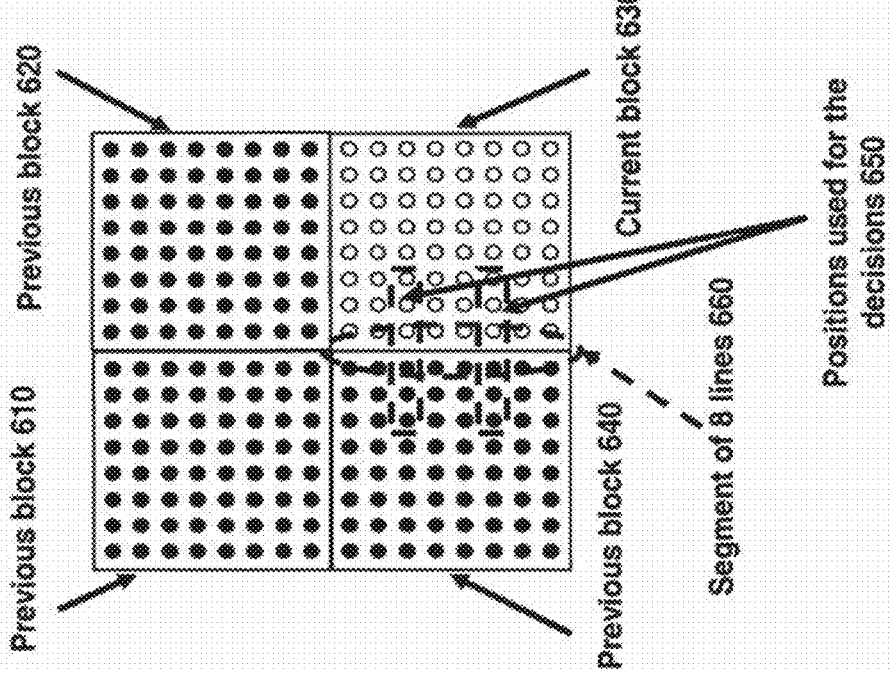
FIG. 7 is a schematic drawing illustrating a decision process for each sample at the block boundary whether to filter or not according to JCTVC-C403 for vertical filtering of a horizontal edge.
Figure 8:
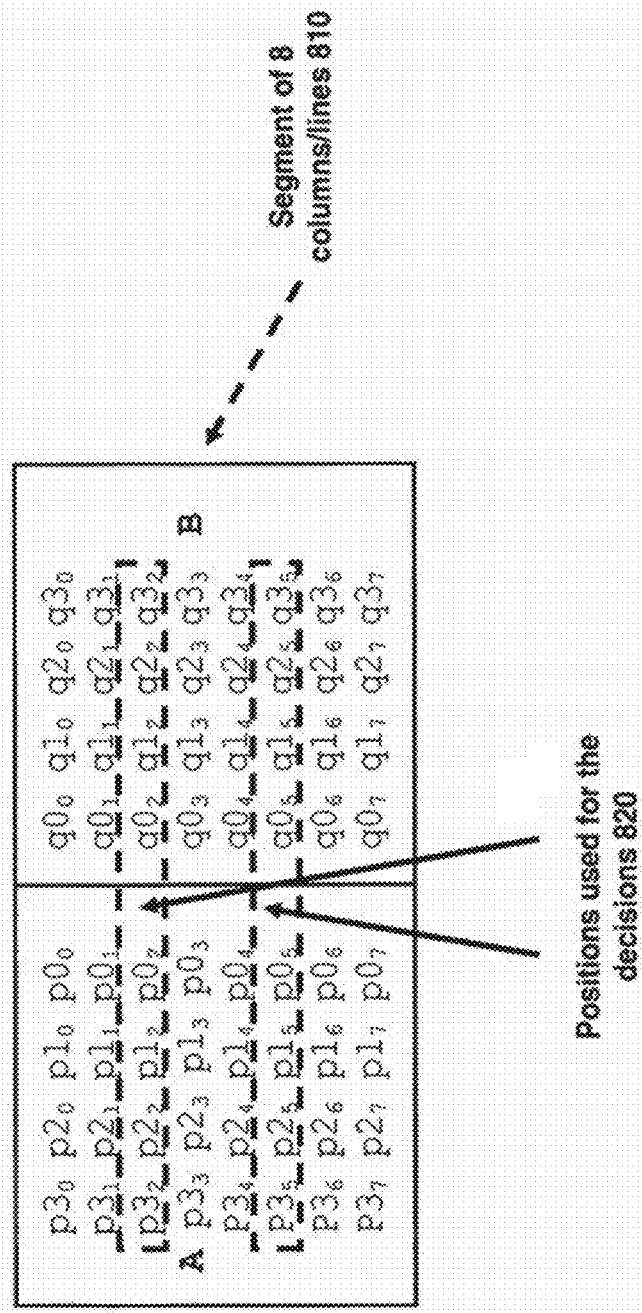
FIG. 8 is a schematic drawing illustrating the decision process for each segment of 8 lines/columns whether to filter or not according to JCTVC-C403.
Figure 13:
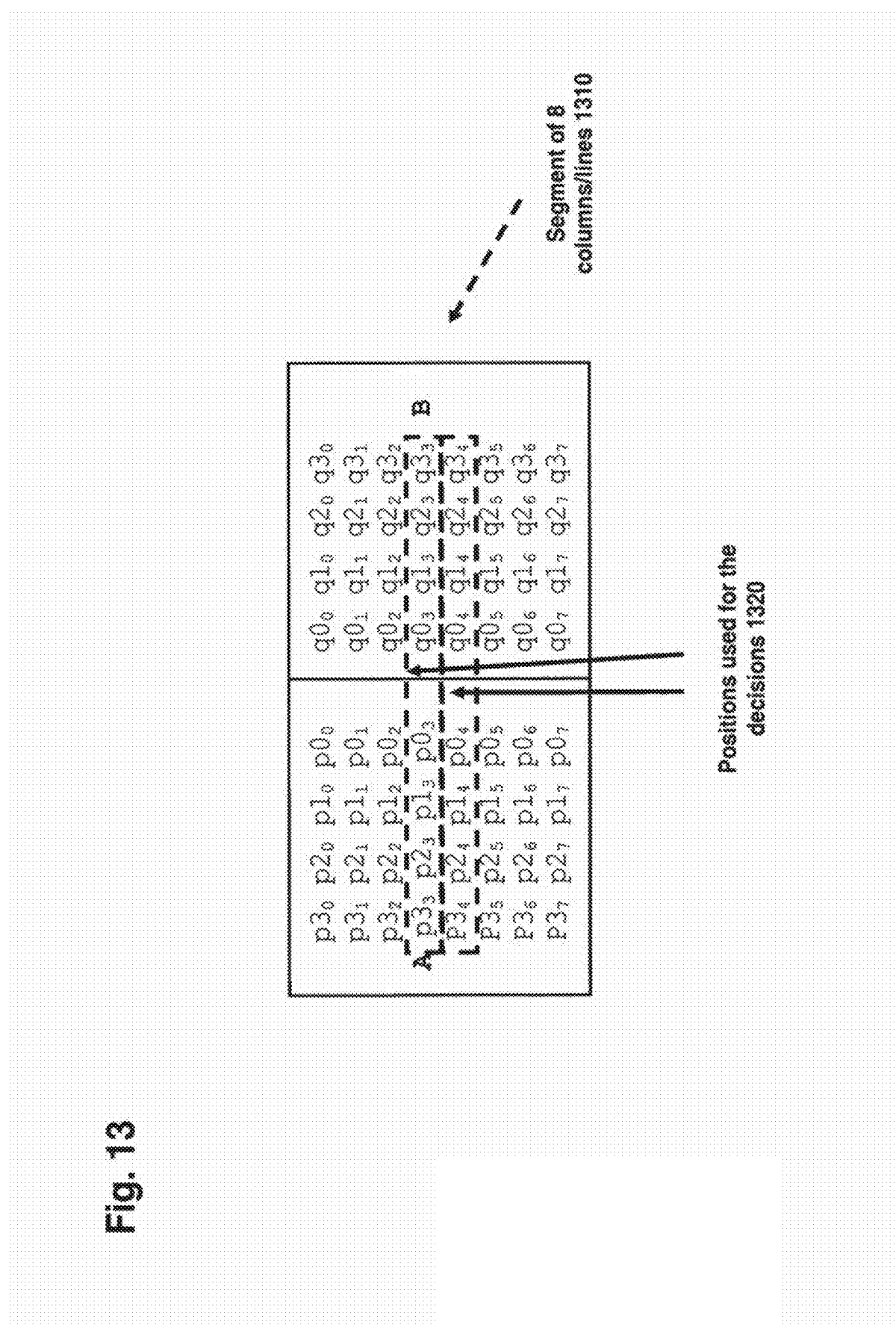
FIG. 13 is a schematic drawing illustrating the decision process for each segment of 8 lines/columns whether to filter or not according to JCTVC-D263.

The problem underlying the present invention is based on the observation that the currently employed approaches for deblocking filtering lead to either reduced filtering quality or to rather high computational expenses.

In order to provide a more efficient filtering approach, according to the present invention, the decisions related to the deblocking filtering are performed for segments of the blocks to be filtered by the deblocking filter rather than for the entire blocks. Moreover, the decisions are performed based on only a subset of the pixels in the block which are situated at the boundary.

In general, as also described in the background section, the decisions may be the decision on whether or not to filter a segment of the boundary and/or whether to apply the filter to pixels at a particular distance from the boundary (corresponding to the decision about the strength of the filter), etc.

Herein, a block is a smallest block of pixels (samples) being confined by boundaries which are processed by deblocking filtering. The processing at each boundary of a block includes decision on whether to apply the filtering and/or what kind of filter to apply and/or applying or not the filter according to the decision(s).As also described the backround section, the block size of which the boundaries are processed by deblocking filtering is typically an 8 by 8 pixel similar to H.264 and the HEVC standards as JCTVC-D403 and JCTVC-D263. A block may be further seen as being comprised of pixel lines perpendicular with respect to a specified boundary of the block.

The term boundary is referring to a logical line separating pixels of two neighbouring blocks. The boundary of a smallest block to be processed by deblocking filtering, extends over all pixel lines of the block oriented perpendicular to the boundary and also extends between two other boundaries of the block which are oriented perpendicularly.

A segment is a portion of a block including one or more pixel lines oriented perpendicular to the boundary with pixels to be processed by the deblocking filter. The segment of the block is a subset of the pixel lines of entire block, i.e. a proper partial subset, meaning that it includes less than all pixel lines of the block. Thus a segment extends over a certain number of pixel lines in a direction parallel to the boundary. However, a segment does not extend over all pixel lines of a block. Further, a segment of the boundary corresponds to the portion of the boundary where the segment of the block portion is situated at the boundary.

Pixels at the boundary of a block are pixels in a block being situated close to the boundary to an adjacent block. Pixels at the boundary may include the pixels directly at (closest to) the boundary, the pixels which are second closest to the boundary, and/or the third closest, etc.

The deblocking filtering is typically performed by a 1-dimensional filter, vertical or horizontal. The filter is applied orthogonally to the boundary, in particular, to the pixels at the boundary included in a pixel line of the block perpendicular to the boundary.

Figure 14:
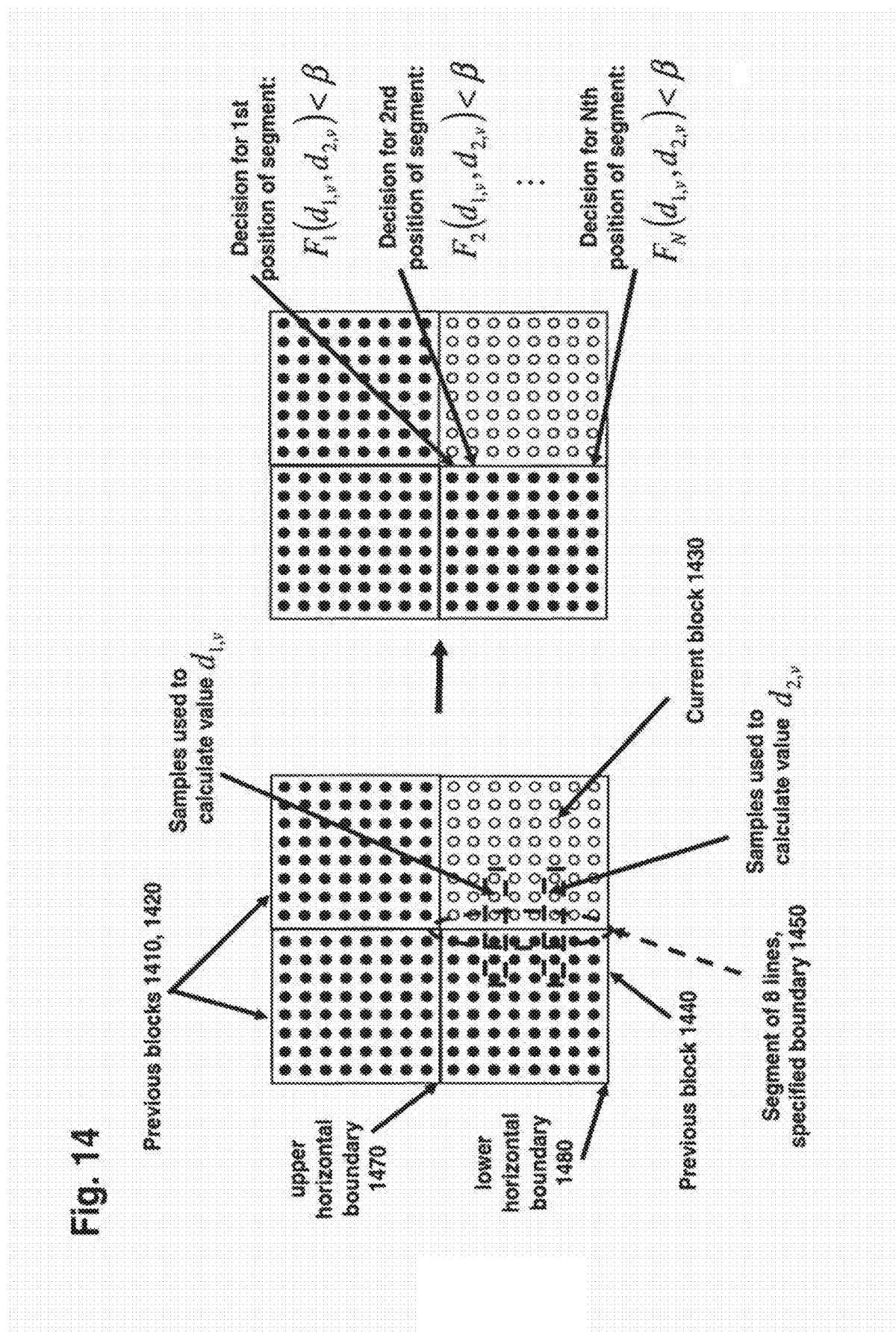
FIG. 14 is a schematic drawing illustrating the decision process for horizontal filtering of a vertical boundary according to an embodiment of the present invention.
Figure 15:
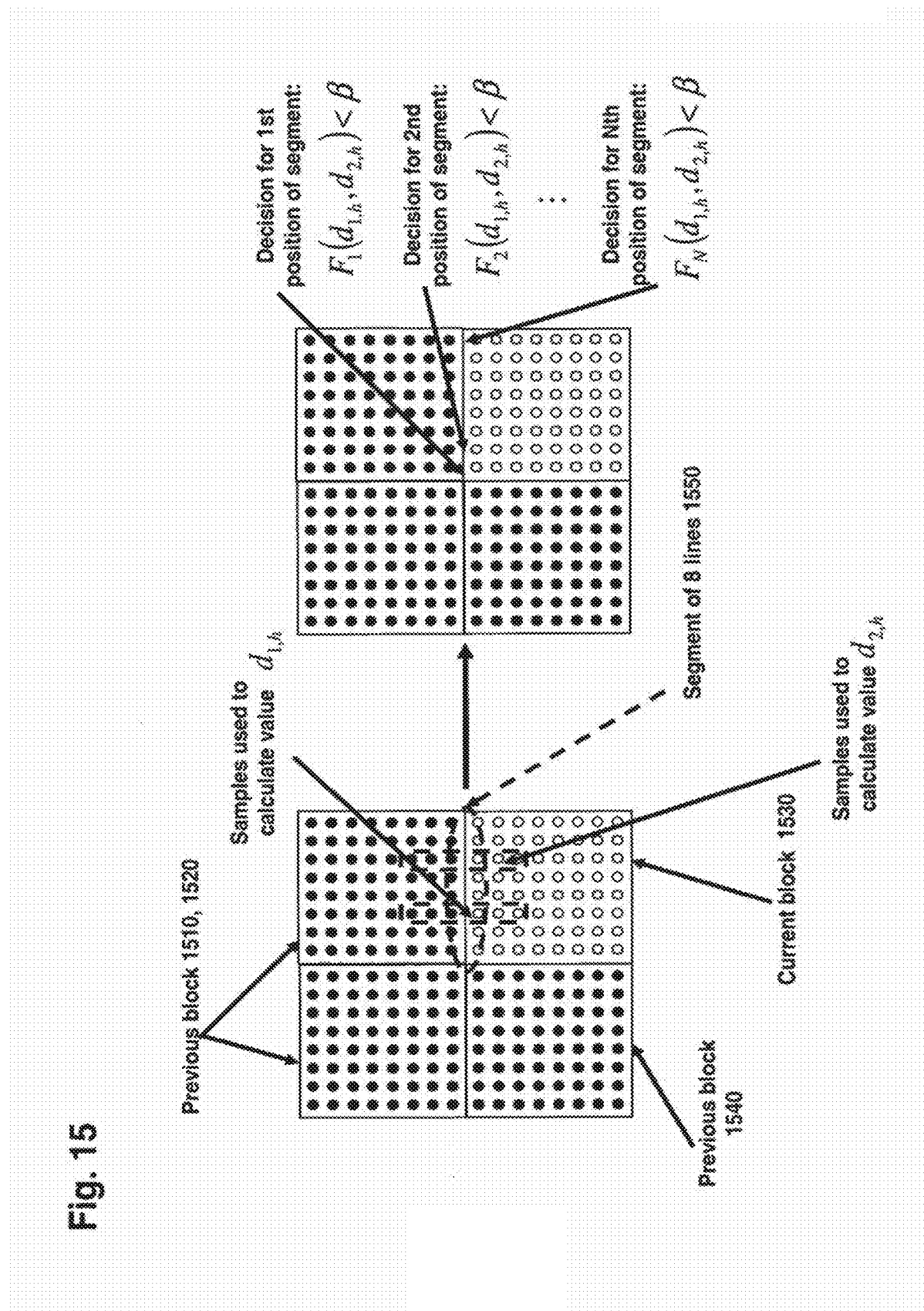
FIG. 15 is a schematic drawing illustrating the decisions for vertical filtering of a horizontal boundary according to an embodiment of the present invention.
Figure 16:
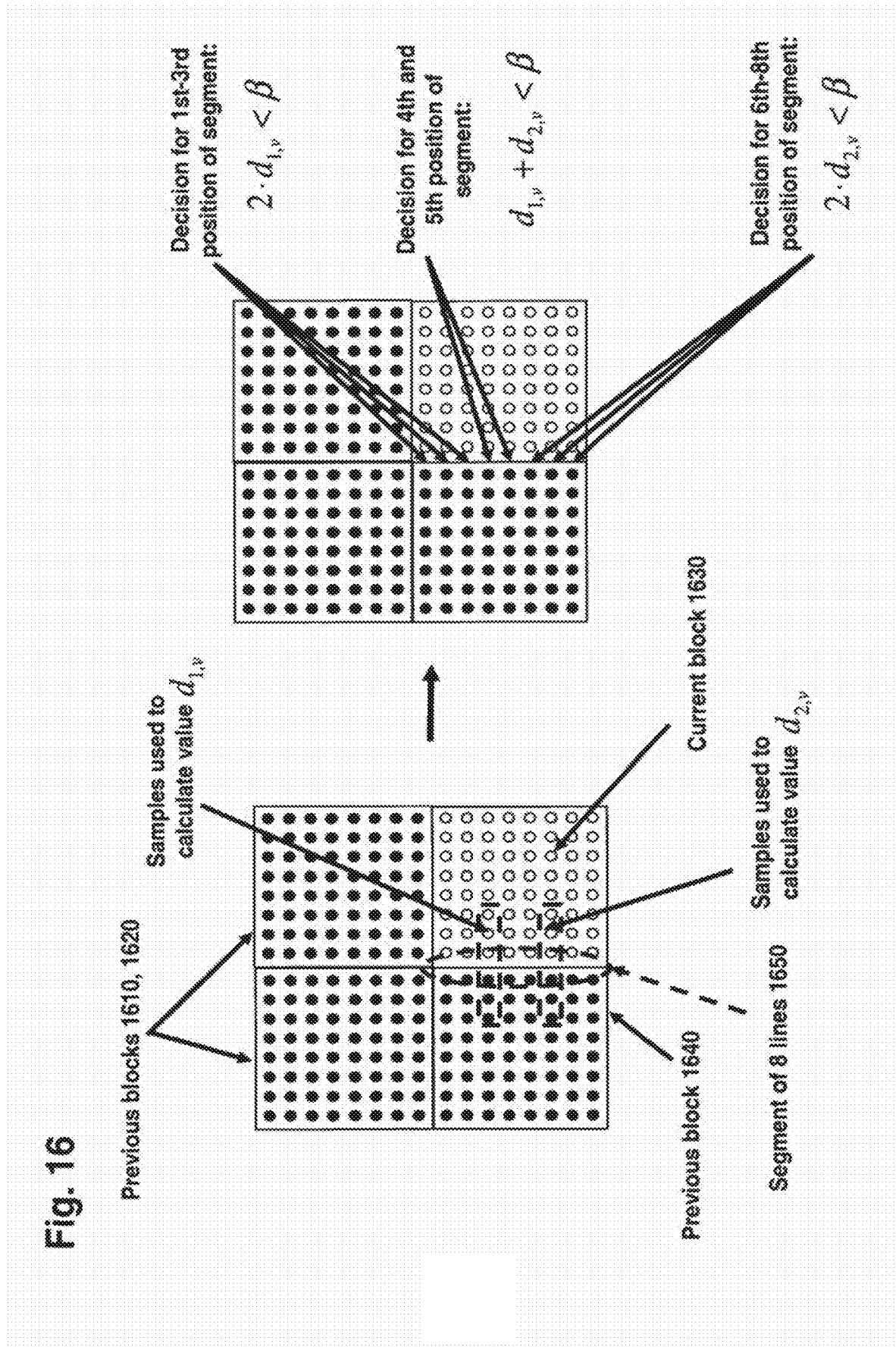
FIG. 16 is a schematic drawing illustrating the decision process for horizontal filtering of a vertical boundary according to an embodiment of the present invention.
Figure 17:
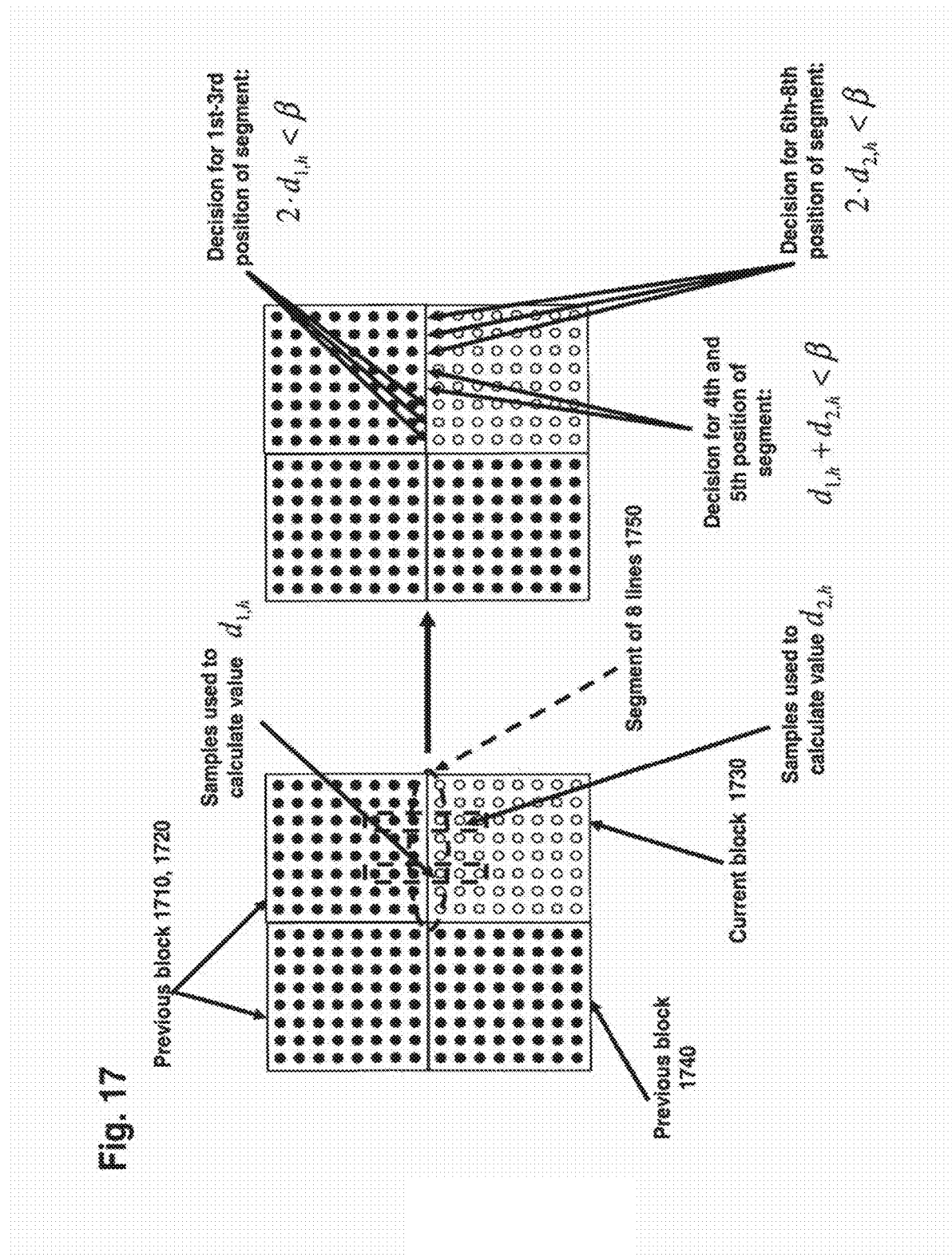
FIG. 17 is a schematic drawing illustrating the decisions for vertical filtering of a horizontal boundary according to an embodiment of the present invention.

FIGS. 14 and 16 illustrate the decision process for horizontal filtering of a vertical boundary between two adjacent image blocks according to an embodiment of the present invention. Similarly, FIGS. 15 and 17 illustrate the decision process for vertical filtering of a horizontal boundary between two adjacent image blocks according to an embodiment of the present invention.

FIG. 14 shows four 8×8 pixel image blocks, namely the previously processed blocks 1410, 1420, 1440 and the current block 1430 on the left hand side. Block 1410 is the top left neighbour of the current block 1430, block 1420 is the top neighbour of the current block 1430 and block 1440 is the left neighbour of the current block 1430. The vertical boundary 1450 between the left adjacent block 1440 and the current block 1430 is the boundary for which the decision for horizontal filtering is carried out. This boundary 1450 basically extends between and is at the same time confined by an upper horizontal boundary 1470 and the lower horizontal boundary 1480. The upper 1470 and lower 1480 horizontal boundaries may be filtered vertically. The previous block 1440 and the current block 1430 adjacent to the boundary 1450 are composed of 8 pixel lines oriented perpendicular to the boundary. Hence, the vertical boundary for horizontal filtering in FIG. 14 is extending over a segment of 8 pixel lines 1450. The boundary can be divided into segments, wherein the smallest segment is extending over one pixel line.

In order to decide whether or not to apply deblocking filter to segments of the block boundary 1450, pixels from a (proper partial) subset of the pixel lines from the current block 1430 and/or the previous block 1440 are used as a basis for decision. As also in the approaches described in the background section, the pixels from the subset of lines (rows) in the previous block 1440 and the current block 1430 are the pixels at the (close to) common boundary between these blocks. In the example of FIG. 14, two out of eight pixel lines are used for deciding whether or not to apply a deblocking filter to each segment of the boundary. In this case the $3^{rd}$ and 6th pixel line is chosen. These two pixel lines represent a (proper partial) subset of the 8 pixel lines that the previous 1440 and the current block 1430 are composed of. Herein, a proper partial subset of pixel lines of a block is defined as any number of pixel lines which is smaller than the total number of pixel lines that an image block is composed of. Subsequently, the samples from the subset of lines, in this case, from the two pixel lines, are used for performing individual decisions for segments of the boundary, as depicted on the right hand side of FIG. 14. This is achieved, for instance, by calculating line decision terms $d_{1,v}$ and $d_{2,v}$ as a function of the pixels from the subset of lines. The values $d_{1,v}$ and $d_{2,v}$ may be calculated similar as the values $d_{1,v}$ and $d_{2,v}$ according to JCTVC-C403 or JCTVC-D263, as described above. These values may be calculated, for instance, as gradients of the $1^{st}$ or the $2^{nd}$ order between the neighbouring pixels in each respective of the two neighbouring blocks 1440 and 1430, or between pixels from both blocks 1440 and 1430. These gradients may be calculated as differences between these pixels. Such measures are advantageous for estimating the blocking effect between two blocks.

Further, an individual decision value $F_N$, which corresponds to an individual function of the line decision terms $d_{1,v}$ and $d_{2,v}$, is compared with a threshold value $\beta$ for each segment of a number of segment from 1 to N:

$$F_N(d_{1,v}, d_{2,v}) < \beta.$$

In the case the above condition is true, filtering is applied to the individual segment of the vertical boundary 1450. It is noted that the line terms $d_{1,v}$ and $d_{2,v}$ do not necessarily have to be calculated in a separate step. The individual decision value may also be calculated without having pre-calculated and stored the line decision terms separately before. In this example, each boundary position corresponding to each line of the block(s) to be filtered is a segment and for each of these lines it is decided based on individual function of the pixels from the subset of lines whether the this boundary position is to be filtered or not. This corresponds in this example to interpolation or extrapolation (depending on the segment position) of the individual decision term based on 1) the pixels of the subset of block lines and 2) on the position of the segment.

FIG. 15 illustrates the decisions for vertical filtering of a horizontal boundary similar to the horizontal filtering of the vertical boundary described above with reference to FIG. 14. Here, instead of the $3^{rd}$ and the $6^{th}$ pixel line, the $3^{rd}$ and the $6^{th}$ pixel column are the basis for the filtering decisions. The information obtained from the subset of lines formed by the $3^{rd}$ and $6^{th}$ pixel columns corresponds to the calculated values, line decision terms, $d_{1,h}$, and $d_{2,h}$. Further, an individual decision value ($F_N$), which is an individual function of the line decision terms $d_{1,h}$ and $d_{2,h}$, is compared with a threshold value $\beta$ for each segment of a number of segment from 1 to N:

$$F_N(d_{1,h}, d_{2,h}) < \beta$$

In the case the above condition is true, filtering is applied to the individual segment of the horizontal boundary 1550. In this example, each line may be an individual segment, for which an individual Function $F_N$ is applied. The function is not necessarily computed as a function of the line decision terms, it may be also directly computed from the individual pixels in the subset lines.

FIG. 16 exemplifies a particular solution and implementation for the above individual functions of the calculated values based on the $3^{rd}$ and $6^{th}$ pixel line for individual segments of the boundary. In this case, three individual decisions for three respective block (boundary) segments are performed based on respective three individual decision values. In particular, FIG. 16 shows on the right hand side, that for the first to the third pixel line, value $d_{1,v}$ obtained based on the pixels of the $3^{rd}$ pixel line is utilized for the following decision:

$$2 \cdot d_{1,v} < \beta.$$

In the case the above condition is true, filtering is applied to the segment extending over the first to the third pixel line of the boundary 1650. However, this can also be seen as a same decision for the individual segments extending over the first, the second or the third pixel line respectively. Thus, the individual decision values for the first and the second pixel line can be also seen as a nearest neighbor interpolation of the individual decision value of the third segment. This means that the individual decision value used for the line for which the line decision term is calculated, is also used for the other lines within the same segment. For a further segment of the boundary, which corresponds to the fourth and fifth pixel line of the boundary, information from both the third and the sixth pixel line is used. The values $d_{1,v}$ and $d_{2,v}$ are utilized for the following decision:

$$d_{1,v} + d_{2,v} < \beta$$

In the case the above condition is true, filtering is applied to the segment extending over the fourth and the fifths pixel line of the boundary 1650. However, this can also be seen as a same decision for the individual segments extending over the fourth or the fifth pixel line respectively. For another segment of the boundary, which corresponds to the sixth to the eight pixel position of the boundary, the information of the sixth pixel line is utilized for the filtering decision. The value $d_{2,v}$ is utilized for the following decision:

$$2 \cdot d_{2,v} < \beta$$

In the case the above condition is true, filtering is applied to the segment being extending over the sixth to the eights pixel line of the boundary 1650. However, this can also be seen as a same decision for the individual segments extending over the sixth, the seventh or the eighth pixel line, respectively. Nevertheless, in order to achieve the advantages of the present invention, decision are performed for at least two segments of the boundary individually and at least two individually calculated decision values are applied in the decision process.

FIG. 17 shows, corresponding to FIG. 16, a particular solution and implementation for the above individual functions of the calculated values based on the $3^{rd}$ and $6^{th}$ pixel column for each segment of the horizontal boundary. In particular, FIG. 17 shows on the right hand side, that for the first to the third pixel column, the value $d_{1,h}$ obtained based on the $3^{rd}$ pixel column is utilized for the following decision:

$$2 \cdot d_{1,h} < \beta.$$

In the case the above condition is true, filtering is applied to the segment being extending over the first to the third pixel column of the boundary 1750. However, this can also be seen as a same decision for the individual segments extending over the first, the second or the third pixel column respectively. For a further segment of the boundary, which corresponds to the fourth and fifth pixel column of the boundary, information from the third and the sixth pixel column is used. Correspondingly, the values $d_{1,h}$ and $d_{2,h}$ are utilized for the following decision:

$$d_{1,h} + d_{2,h} < \beta$$

In the case the above condition is true, filtering is applied to the segment being extending over the fourth and the fifths pixel column of the boundary 1750. However, this can also be seen as a same decision for the individual segments extending over the fourth or the fifth pixel column respectively. For another segment of the boundary, which corresponds to the sixth to the eight pixel position of the boundary, the information of the sixth pixel column is utilized for the filtering decision. Correspondingly, the value $d_{2,h}$ is utilized for the following decision:

$$2 \cdot d_{2,h} < \beta$$

In the case the above condition is true, filtering is applied to the segment being extending over the sixth to the eights pixel column of the boundary 1750. However, this can also be seen as a same decision for the individual segments extending over the sixth, the seventh or the eighth pixel column, respectively.

To summarize according to the present embodiment of the invention, the process of judging whether or not to apply a deblocking filter to segments of the boundary of the block is conducted by judging individually for each segment of the boundary based on pixels comprised in a subset of pixel lines of the block and applying or not applying the deblocking filter to the segments of the boundary according to the result of the respective individual judgements.

Further, when judging whether or not to apply a deblocking filter to segments of the boundary of the block, an individual decision value for each segment of the boundary by using pixel values of pixels comprised in at least one pixel line of the subset of the pixel lines of the block is obtained and compared with a threshold value for each individual segment of the boundary.

At least one of the individual decision values from the obtained individual decision values is based on only one pixel line of the subset of the pixel lines. At further individual decision value based on one pixel line of the subset of the pixel lines may be obtained by applying nearest neighbour interpolation to the firstly obtained decision value.

Further, at least another individual decision value may be based on at least two pixel lines of the subset of the pixel lines. This latter individual decision value may be a linear combination of individual decision values which are based on one pixel line of the subset of the pixel lines.

Figure 18:
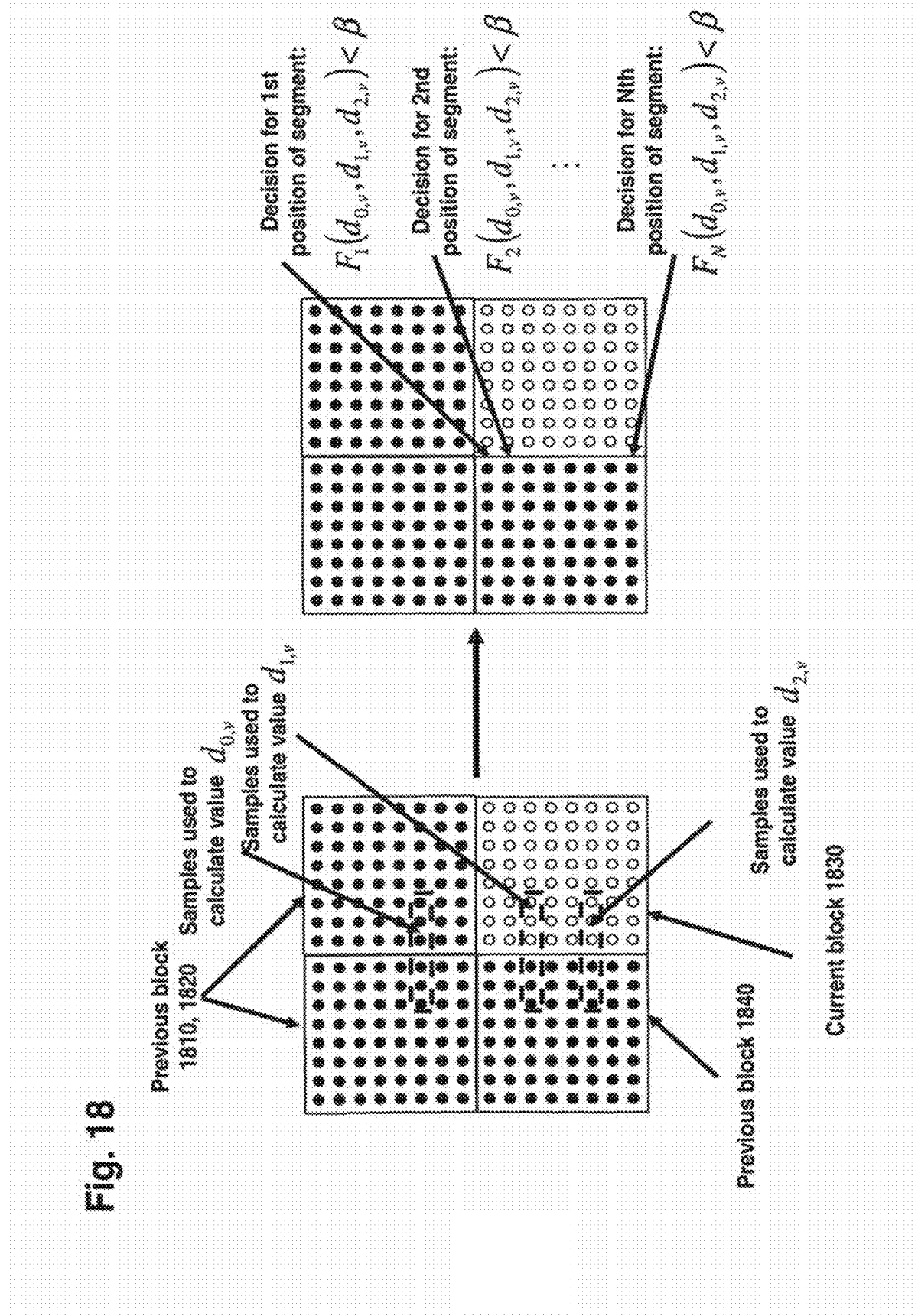
FIG. 18 is a schematic drawing illustrating the decisions for horizontal filtering of a vertical boundary according to an embodiment of the present invention.

According to another embodiment of the present invention, the process of judging whether or not to apply a deblocking filter to segments of the boundary of the block is based on pixels comprised in pixel lines of another block, which is adjacent to the block and situated across another boundary which perpendicular to the boundary which is currently processed, in addition to being based on pixels comprised in a subset of the pixel lines of the block. Hence, in order to perform individual decisions for segments of the boundary, not only information comprised in the subset of pixel lines of the block is used, but also pixel lines (rows or columns) of adjacent or previous blocks respectively. This is illustrated for example in FIG. 18 for a decision for horizontal filtering of a vertical boundary/edge. In particular, as an example, in FIG. 18 additional information for individual decisions of segments is obtained from pixels of the $3^{rd}$ line of the two upper previous blocks 1810, 1820 of the four image blocks 1810, 1820, 1830 and 1840, as shown on the left hand side. These pixel values of the the $3^{rd}$ line of the previous blocks 1810 and 1820 is used for calculating the decision term $d_{0,v}$ in addition to calculating the decision terms $d_{1,v}$, $d_{2,v}$ by pixel values of a subset of pixel lines of the current 1830 and previous block 1840. As shown on the right hand side, individual decisions for segments are now based on the calculated values $d_{1,v}$ and $d_{2,v}$ being itself based on the $3^{rd}$ and $6^{th}$ pixel lines of the previous 1840 and the current block 1830 adjacent to the vertical boundary, and also on the calculated values $d_{0,v}$ being based on the $3^{rd}$ pixel line of the previous blocks 1810 and 1820. Subsequently, an individual decision value $F_N$, which is an individual function of the previously obtained information, the calculated values (decision terms) $d_{1,v}$, $d_{2,v}$, and $d_{0,v}$, is compared with a threshold value $\beta$ for each segment of a number of segment from 1 to N:

$$F_N(d_{0,v}, d_{1,v}, d_{2,v}) < \beta.$$

Figure 19:
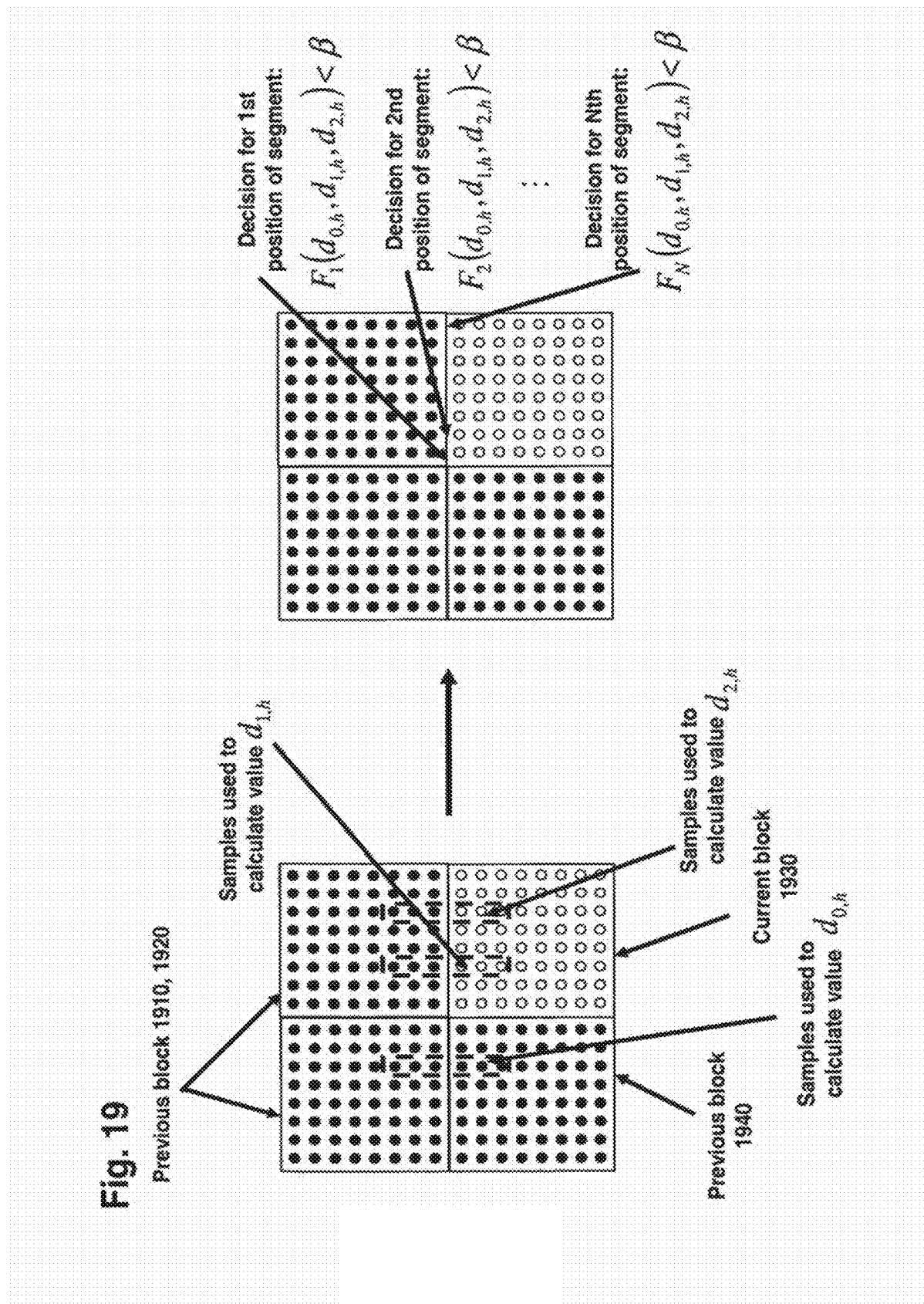
FIG. 19 is a schematic drawing illustrating the decision for vertical filtering of a horizontal boundary according to an embodiment of the present invention.

In the case the above condition is true, filtering is applied to the individual segment of the vertical boundary. Similarly, this principle can be also applied for decisions for vertical filtering of a horizontal boundary as illustrated in FIG. 19.

Figure 20:
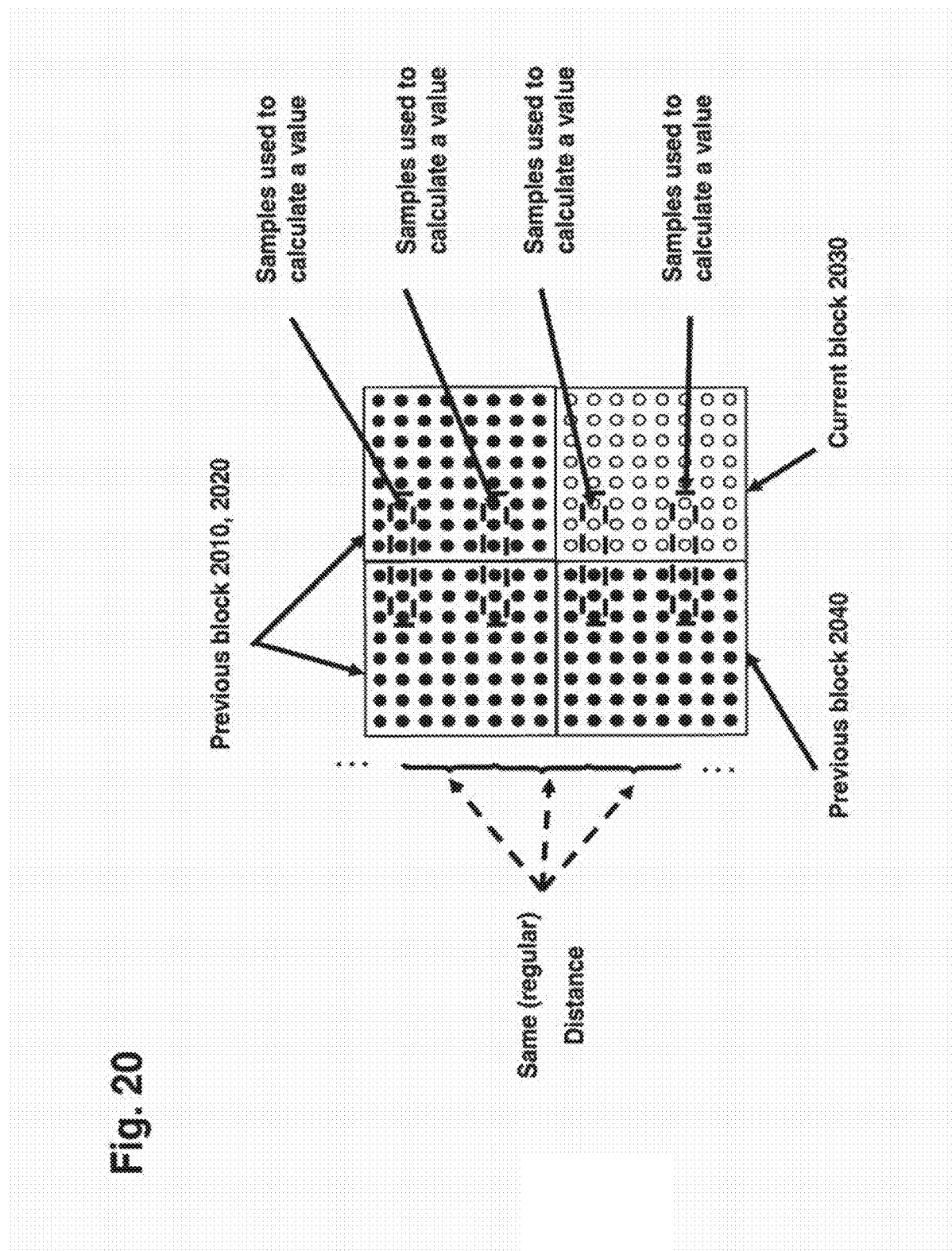
FIG. 20 is a schematic drawing illustrating the decision process according to an embodiment of the present invention.

According to another embodiment of the present invention, in the process of judging whether or not to apply a deblocking filter to segments of the boundary of the block, the pixel lines serving as a basis for judging are regularly distributed in a direction parallel to the boundary which is processed. As example of this embodiment, FIG. 20 illustrates the decisions for horizontal filtering of a vertical boundary between the previous block 2040 and the current block 2030. Here, the pixel lines which are used as a basis for decisions on deblocking filtering of segments of the vertical boundary are spaced regularly in a direction parallel to the vertical boundary. In other words, the pixel lines for calculating, for example a line decision term d, have a same regular distance from each other. In the example of FIG. 20, all pixel line used as a basis for decisions for deblocking filtering are spaced apart by three pixel lines, which are not used as a basis for decisions for deblocking filtering. This embodiment may be beneficial for achieving a more efficient deblocking filtering decision.

Figure 21:
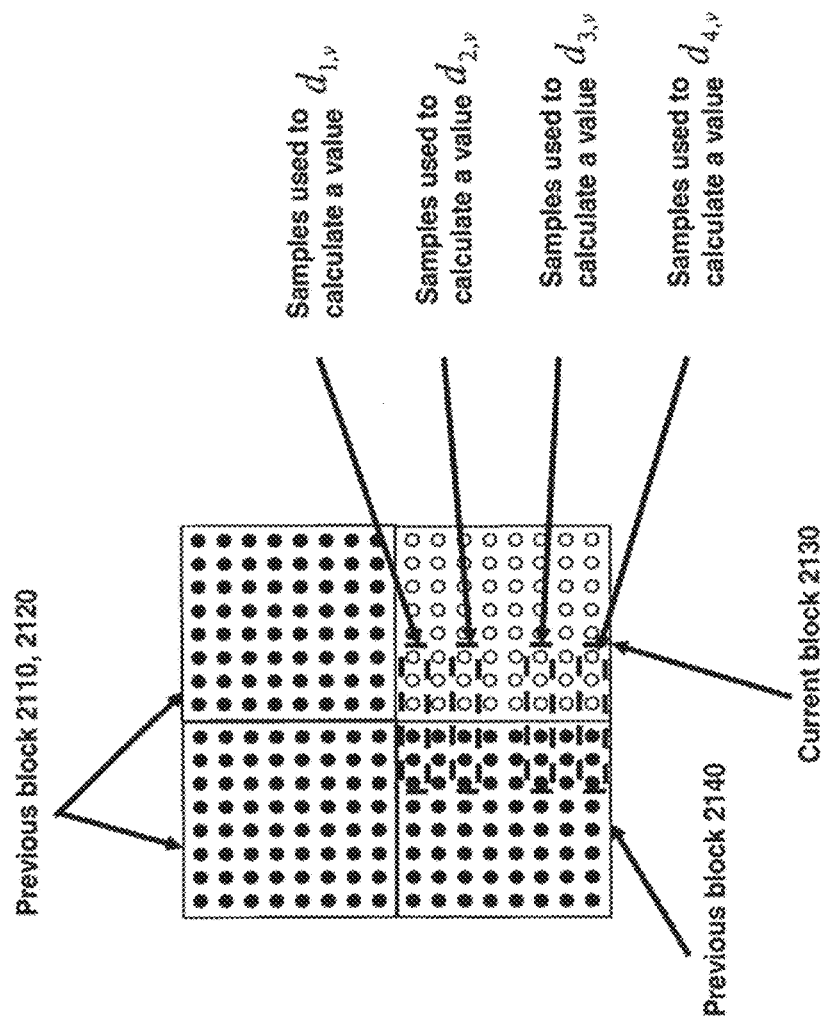
FIG. 21 is a schematic drawing illustrating the decision process according to an embodiment of the present invention.
Figure 22:
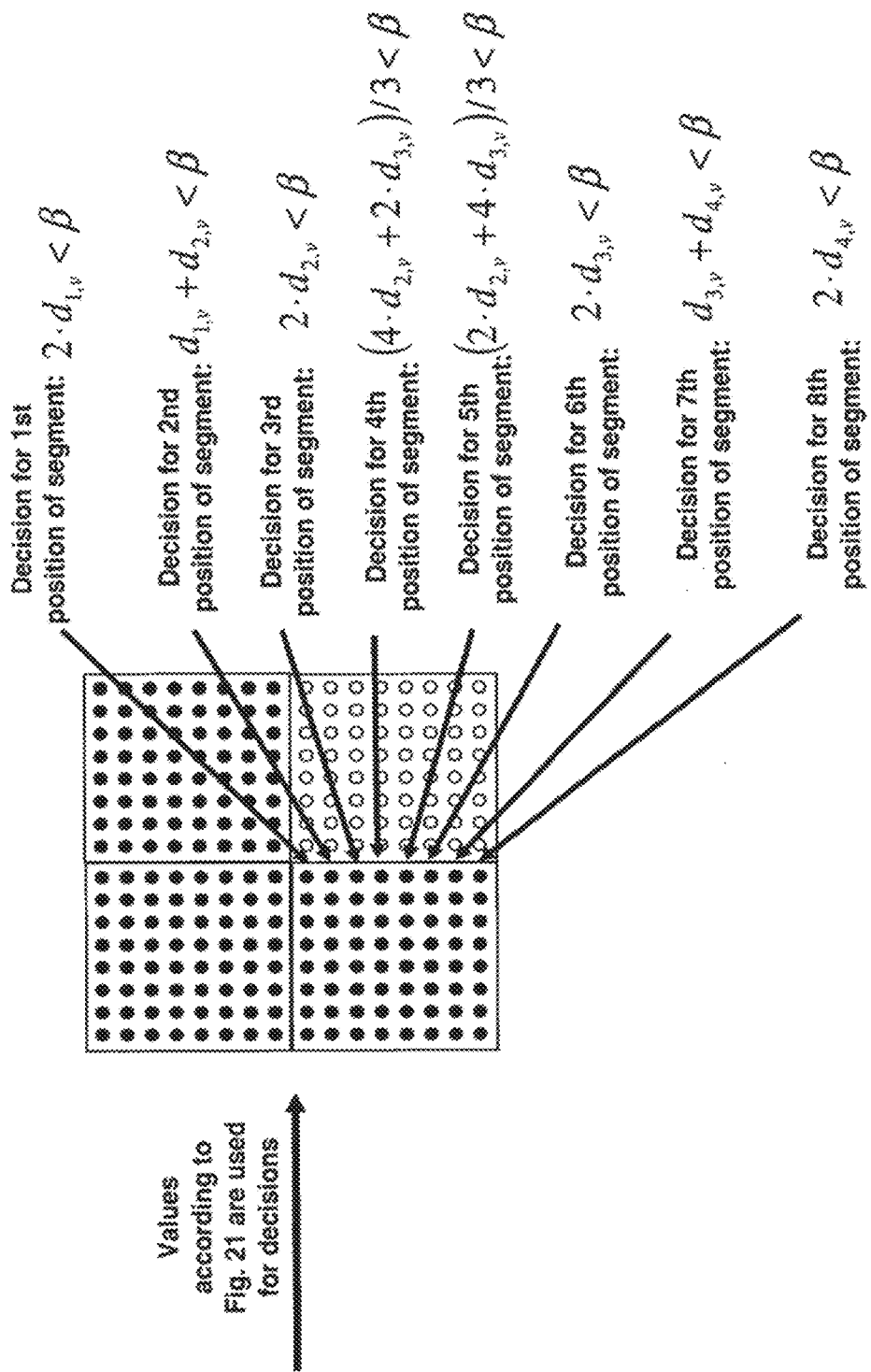
FIG. 22 is a schematic drawing illustrating the decision process according to an embodiment of the present invention.

In another embodiment of the present invention, in the process of judging whether or not to apply a deblocking filter to segments of the boundary of the block, individual decision values based on one pixel line of the subset of the pixel lines are interpolated linearly in order to obtain individual decision values for each segment of the boundary which is then compared to a threshold value. FIGS. 21 and 22 illustrate the decision for vertical filtering of a horizontal edge according to this embodiment. In particular, the subset of pixel lines which is used as a basis for individual decisions for each segment of the boundary is now constituted by four pixel lines out of eight pixel lines that the block is composed of. In FIG. 21, this is the $1^{rst}$, $3^{rd}$, $6^{th}$ and $8^{th}$ pixel line. Based thereon, the values $d_{1,v}$, $d_{2,v}$, $d_{3,v}$ and $d_{4,v}$ (line decision term) are calculated and used for obtaining the individual decision values, as shown in FIG. 22, for each segment constituting the vertical boundary between the previous block 2140 and the current block 2130. In particular, the condition for judging whether or not to apply a deblocking filter at the first segment which corresponds to the $1^{rst}$ pixel line is the following:

$$2 \cdot d_{1,v} < \beta.$$

The condition for judging whether or not to apply a deblocking filter for the second segment which corresponds to the second pixel line is the following:

$$d_{1,v} + d_{2,v} < \beta$$

The condition for judging whether or not to apply a deblocking filter for the third segment which corresponds to the third pixel line is the following:

$$2 \cdot d_{2,v} < \beta$$

The condition for judging whether or not to apply a deblocking filter for the fourth segment which corresponds to the fourth pixel line is the following:

$$(4 \cdot d_{2,v} + 2 \cdot d_{3,v})/3 < \beta$$

Alternatively, the condition for judging whether or not to apply a deblocking filter for the fourth segment which corresponds to the fourth pixel line could be the following:

$$(4 \cdot d_{2,v} + 2 \cdot d_{3,v}) < 3 \cdot \beta$$

The condition for judging whether or not to apply a deblocking filter for the fifth segment of the boundary which is corresponding to the fifth pixel position is the following:

$(2 \cdot d_{2,v} + 4 \cdot d_{3,v})/3 < \beta$

Alternatively, the condition for judging whether or not to apply a deblocking filter for the fifth segment of the boundary which is corresponding to the fifth pixel position is the following:

$(2 \cdot d_{2,v} + 4 \cdot d_{3,v}) < 3 \cdot \beta$

The condition for judging whether or not to apply a deblocking filter for the sixth segment of the boundary which corresponds to the sixth pixel position is the following:

$2 \cdot d_{3,v} < \beta$

The condition for judging whether or not to apply a deblocking filter for the seventh segment of the boundary which corresponds to the seventh pixel position is the following:

$d_{3,v} + d_{4,v} < \beta$

The condition for judging whether or not to apply a deblocking filter for the eighths segment of the boundary which corresponds to the eight pixel position is the following:

$2 \cdot d_{4,v} < \beta$

In the case one of the above conditions is true, the filtering is applied to the respective individual segment of the vertical boundary. According to the above approach, individual decisions for segments, are performed by using linear combinations of the values $d_{1,v}$, $d_{2,v}$, $d_{3,v}$ and $d_{4,v}$ (line decision terms). Moreover, the above approach corresponds to an interpolation of individual decision values obtained for segments extending over one pixel position at the boundary. Further, it is understood that the same approach can be applied for judging whether or not to apply a deblocking filter at a horizontal edge/boundary.

To summarize, in order to deblock with a high coding efficiency and low computational expense and low memory bandwidth, decision and/or the line decision terms are calculated not for each individual position (as also for JCTVC-C403 and JCTVC-D263). This leads to limited memory bandwidth and limited computational expense. However, individual functions of the calculated values (line decision terms) are used in order to perform individual and accurate decisions at each position of an edge. A general example is shown in FIG. 14 and FIG. 15. A more specific example is shown in FIG. 16 and FIG. 17. As a specific solution, also calculated values of other, e.g. neighboring, segments are used in the function, see FIG. 18 and FIG. 19. It may be beneficial to use a regular distribution of the positions used to calculate the values, see FIG. 20. Specific a further specific solution, for each segment of an edge of 8 edge positions, 4 values are calculated, see FIG. 21-22. For each of the edge positions, individual decisions are performed by the use of linear combinations of the 4 calculated values. The effect of the invention is to increase of coding efficiency with same low computational expense and same low memory bandwidth.

In the following, the efficiency of the present invention over prior art is shown as an example. In the HM2.0, one single decision for enabling the deblocking is performed for an edge segment of eight columns/lines using two calculated decision values. In contrast to the HM2.0, H.264/MPEG-4 AVC uses eight individual decisions based on eight individually calculated decision values for each edge segment. The change of the decisions to ones similar as in H.264/MPEG-4 AVC can reduce the bit rate at the same quality by 0.2% in average over all test cases. However, the calculation of additional decision values is associated with additional computational expense. In order to achieve the same average bit rate reduction at a lower additional computational expense, a modification of the decisions is invented. The invention performs eight individual decisions but needs to calculate only four decision values for each edge segment. The same average bit rate reduction of 0.2% is achieved compared to HM2.0 (I-HE: 0.1%, I-LC: 0.1%, RA-HE: 0.2%, RA-LC: 0.2%, LD-HE: 0.3%, LD-LC: 0.3%) with approximately no encoder/decoder run time increase in average. For the low delay high efficiency configuration, an average bit rate reduction of 0.7% in achieved for the Class E sequences. An increased subjective quality is noticeable at the same bit rate.

Figure 23:
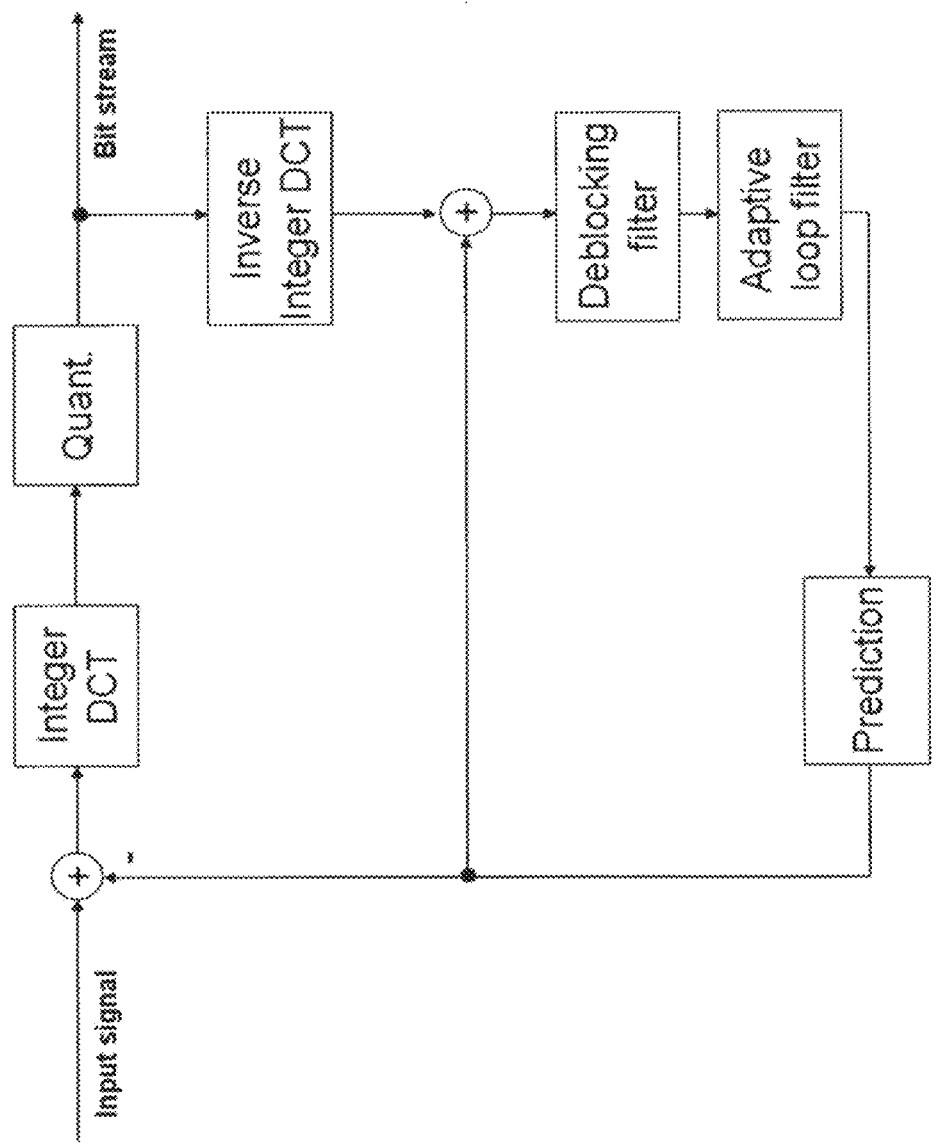
FIG. 23 is a generalized block diagram of the hybrid video encoder according to the HM 2.0.
Figure 24:
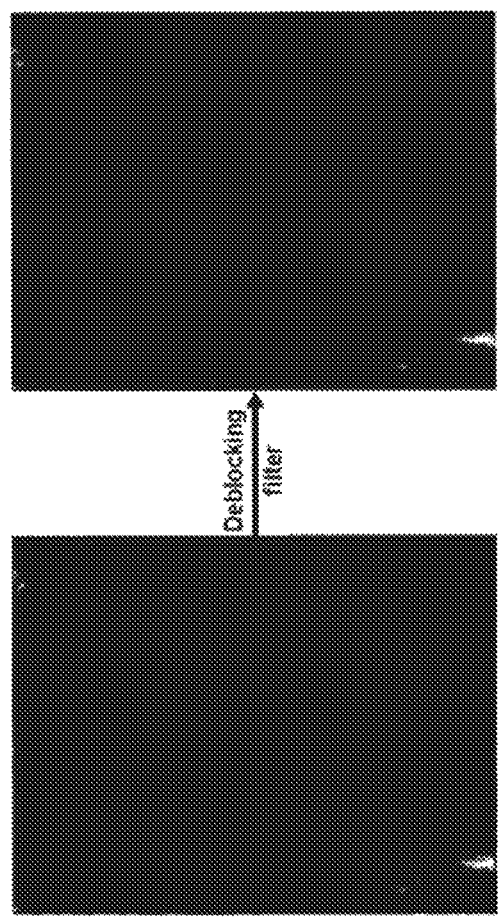
FIG. 24 is an illustration of the signal before and after the deblocking filter for a region of the example test sequence Kimono.

The current HM 2.0 (see for instance, HM2.0 software: http://hevc.kw.bbc.co.uk/trac/browser/tags/HM-2.0 and T. Wiegand, W.-J. Han, J.-R. Ohm, G. J. Sullivan, High Efficiency Video Coding (HEVC) text specification Working Draft 1, JCTVC-C403, Guangzou, China, October 2010, both is in the following referred to as HM 2.0) applies hybrid coding. In FIG. 23 the generalized block diagram of the hybrid coder is shown. In a first step, the input signal to be coded is predicted block-wise by either motion compensated prediction or Intra prediction. The resulting prediction error is block-wise transform coded by applying an approximation of the discrete cosine transform (Integer DCT) followed by a quantization of the coefficients. Due to the block wise motion compensated prediction and a block wise prediction error coding, so called blocking artifacts often become visible in the decoded images. These blocking artifacts tend to be annoying for human observers. In order to reduce these annoying blocking artifacts, an adaptive deblocking filter is applied. The deblocked signal is further filtered by the use of an adaptive loop filter before being output and stored for further predictions. FIG. 24 illustrates the signal before and after the deblocking filter for a region of the example test sequence Kimono.

Figure 25:
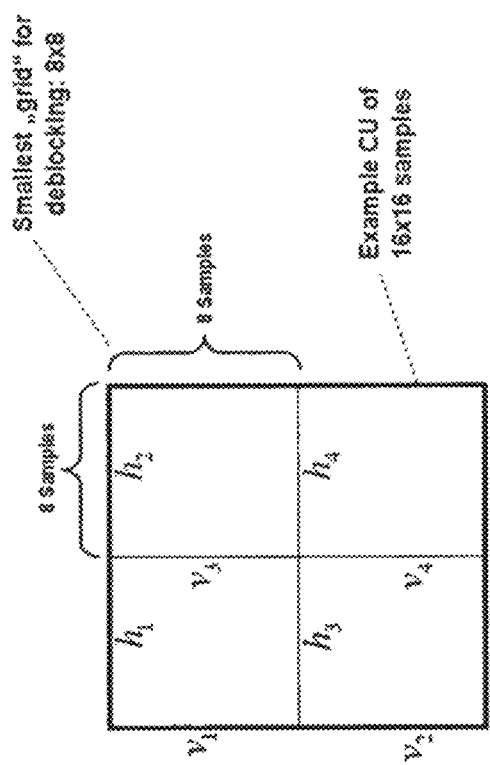
FIG. 25 is a schematic drawing illustrating vertical edges and the horizontal edges of an example coding unit (CU) of the size 16×16 samples

The deblocking of images is performed based on coding units (CU), which may have various sizes, e.g. 8×8 samples, 16×16 samples. Vertical and horizontal edges of prediction and transform blocks are deblocked. Each edge consists of one or several segments, whereas a segment consists of 8 consecutive lines or columns. The segments $v_i$ of the vertical edges are deblocked before the segments $h_i$ of the horizontal edges. FIG. 25 shows an example coding unit of the size 16×16 samples and the positions of the corresponding 4 segments $v_1, \ldots, v_4$ and four segments $h_1, \ldots, h_4$. The order of deblocking the vertical edges is from top to bottom and from left to right. The order of deblocking the horizontal edges is from left to right and from top to bottom. In the following, the samples on the respective sides of the segments of the edges are denoted as A and B, see FIG. 26 (from JCT-VC, Test Model under Consideration, JCTVC-B205_draft007, Geneva, Switzerland, 21-28 Jul. 2010). The segment A corresponds to the left neighboring partition to B for vertical edges and to the above neighboring partition to B for horizontal edges. For each segment of 8 lines/columns, the decisions and filtering operations are performed as explained in the following section.

In a first step, in the decisions according to the HM2.0, the two vales $d_2$ and $d_5$ are calculated by the use of the samples of two lines/columns as illustrated in FIG. 27:

$$d_2=|p2_2-2\cdot p1_2+p0_2|+|q2_2-2\cdot q1_2+q0_2|$$

$$d_5=|p2_5-2\cdot p1_5+p0_5|+|q2_5-2\cdot q1_5+q0_5|.$$

By the use of the two values $d_2$ and $d_5$, it is decided by the threshold operation $$d_2+d_5<\beta$$

if all 8 lines/columns of the corresponding segment are filtered or not. In order to perform the decisions, 20 operations are required for each segment of 8 lines/columns.

In contrast to the HM2.0, H.264/MPEG-4 AVC applies individual decisions (decisions similar as in H.264/MPEG-4 AVC) for each line/column. In order to investigate decisions similar as in H.264/MPEG-4 AVC, an individual value d, is calculated for each of the 8 lines/columns as illustrated in FIG. 28:

$$d_i=|p2_i-2\cdot p1_i+p0_i|+|q2_i-2\cdot q1_i+q0_i| \text{ with } i=0,\ldots,7.$$

By the use of the individual values $d_1$, it is decided for each line/column by the threshold operation $$2\cdot d_i<\beta$$

if a line/column of the corresponding segment is filtered or not. In order to perform the decisions, 88 operations are required for each segment of 8 lines/columns.

In order to perform the decisions for a segment of 8 lines/columns, HM2.0 requires 20 operations. If the decisions are performed similar as in H.264/MPEG-4 AVC, 88 operations are required.

In this embodiment, decisions are proposed which compromise the ones of HM2.0 and H.264/MPEG-4 AVC with respect to computational expense, measured by number of required operations. Four values $d_0$, $d_2$, $d_5$, and $d_7$ are calculated for each segment of 8 lines/columns as illustrated in FIG. 29:

$$d_i=|p2_i-2\cdot p1_i+p0_i|+|q2_i-2\cdot q1_i+q0_i| \text{ with } i=0,2,5,7.$$

By the use of these values, it is decided for each individual line/column by the threshold operations $$2\cdot d_i<\beta \text{ for } i=0,2,5,7$$

$$d_0+d_2<\beta \text{ for } i=1$$

$$d_5+d_7<\beta \text{ for } i=6$$

$$(4\cdot d_2+2\cdot d_5)<3\cdot\beta \text{ for } i=3$$

$$(4\cdot d_5+2\cdot d_2)<3\cdot\beta \text{ for } i=4$$

if a line/column of the corresponding segment is filtered or not. In order to perform the decisions, only 58 operations are required for each segment of 8 lines/columns.

Experiments and results are described in the following. The decisions similar as in H.264/MPEG-4 AVC, as well as the decisions compromising HM2.0 and H.264/MPEG-4 AVC, are both integrated into the reference software of HM2.0.

Experiments and results for BD-bit rate and run time ratios are described in the following. Following the common conditions (see for instance, F. Bossen, Common test conditions and software reference configurations, JCTVC-D500, Daegu, Korea, January, 2011) the performance of all six test cases is evaluated, which is Intra, Random access, and Low delay, each in high efficiency and low complexity operation mode. For all run time measurements, computers of the same configuration are used.

Figure 30:
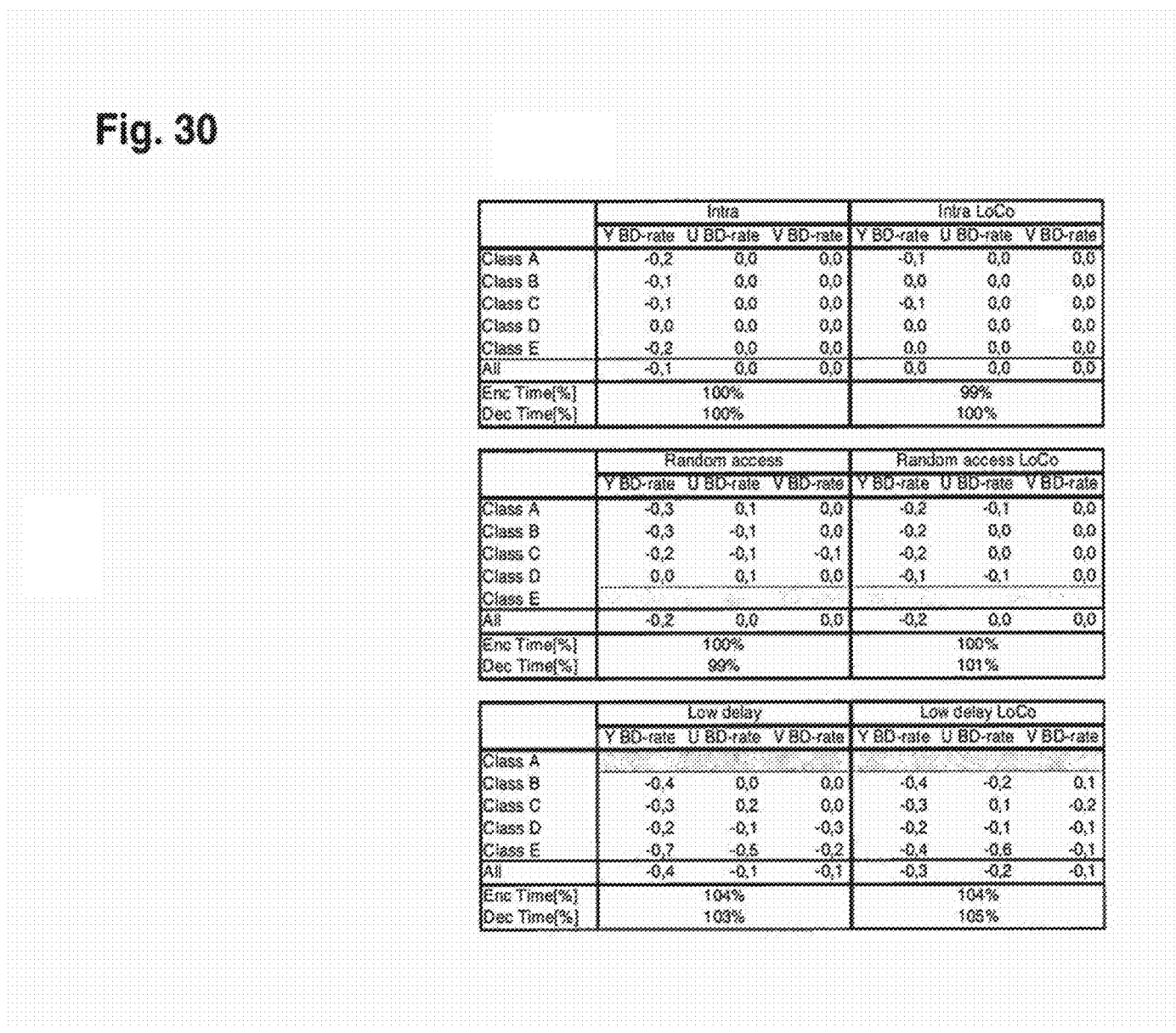
Figure 31:
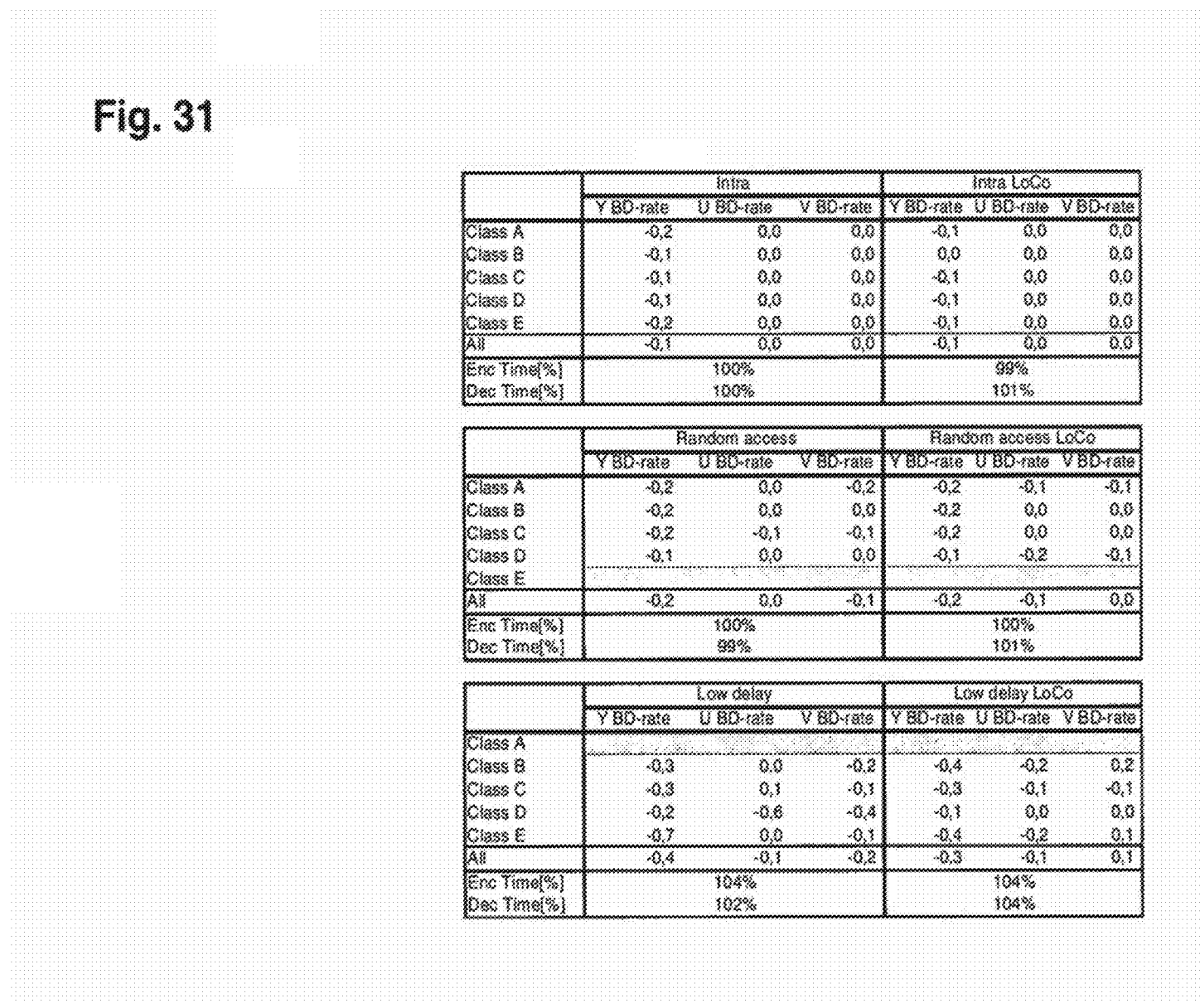

The BD-rate results as well as the encoder-/decoder run time ratios compared to the reference HM2.0 are shown in FIG. 30 for the decisions similar as in H.264/MPEG-4 AVC and in FIG. 31 for the decisions compromising HM2.0 and H.264/MPEG-4 AVC. Negative BD-rate numbers show a gain compared to the reference. Run-time ratios less than 100% show reflect that the run time is lower than the one of the reference. The following results can be observed for both cases: The bit rate reduction is 0.2% in average of over all test sequences and configurations and 0.7% in average for LD-LC, Class E. Approximately no encoder-/decoder run time increases in average.

A subjective evaluation is described in the following. In CE12, various test sequences have been selected for subjective evaluations. For these test sequences, the subjective quality of the proposal compared to the reference has been performed with the results shown in the table of FIG. 32. For five out of the six test sequences, no difference in subjective quality is noticeable. For one out of the six test sequences, the proposal is clearly sharper than the reference without increased blocking. In addition, the proposal shows less color artifacts.

Figure 34:
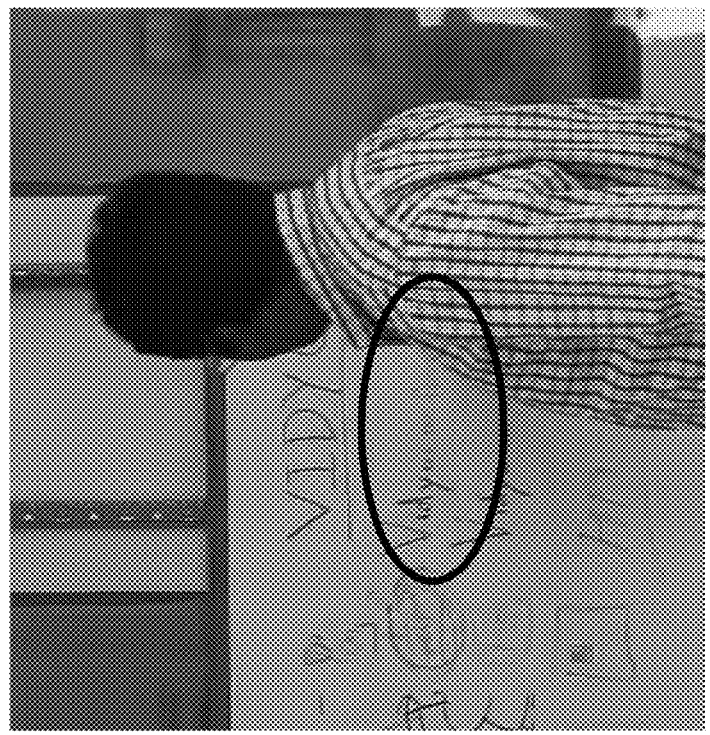
FIG. 34 shows the cropped part of a deblocked frame of the test sequence Vidyo3 in the case of the proposal. Test case: Low delay, High Efficiency, QP37.
Figure 33:
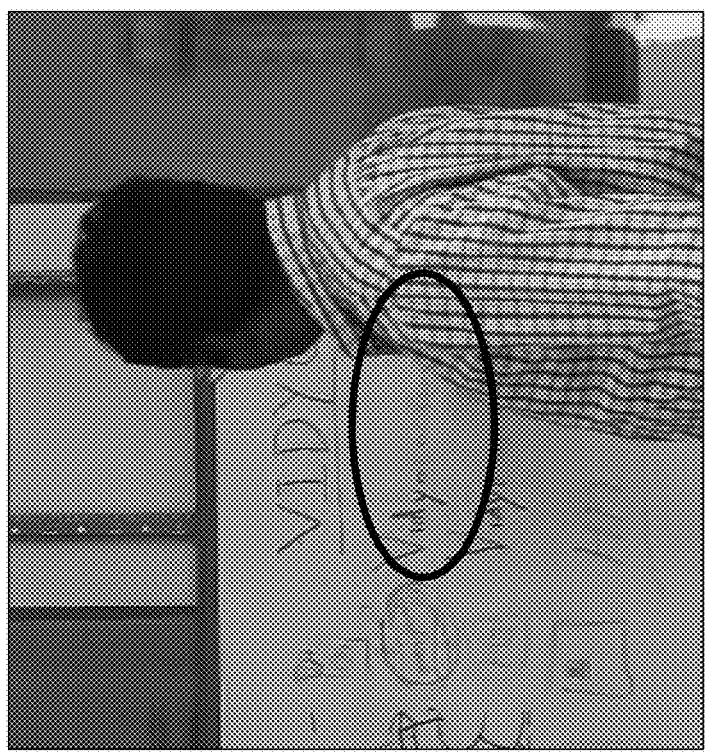
FIG. 33 shows the cropped part of a deblocked frame of the test sequence Vidyo3 in the case of the reference HM 2.0.Test case: Low delay, High Efficiency, QP37.

The increase of the sharpness is illustrated in FIG. 33 and FIG. 34. In FIG. 33, a cropped part of a deblocked frame of the test sequence Vidyo3 is shown for the case of the reference HM2.0, low delay, high efficiency, QP37. FIG. 34 shows the same cropped part for the case of the proposed deblocking.

Figure 36:
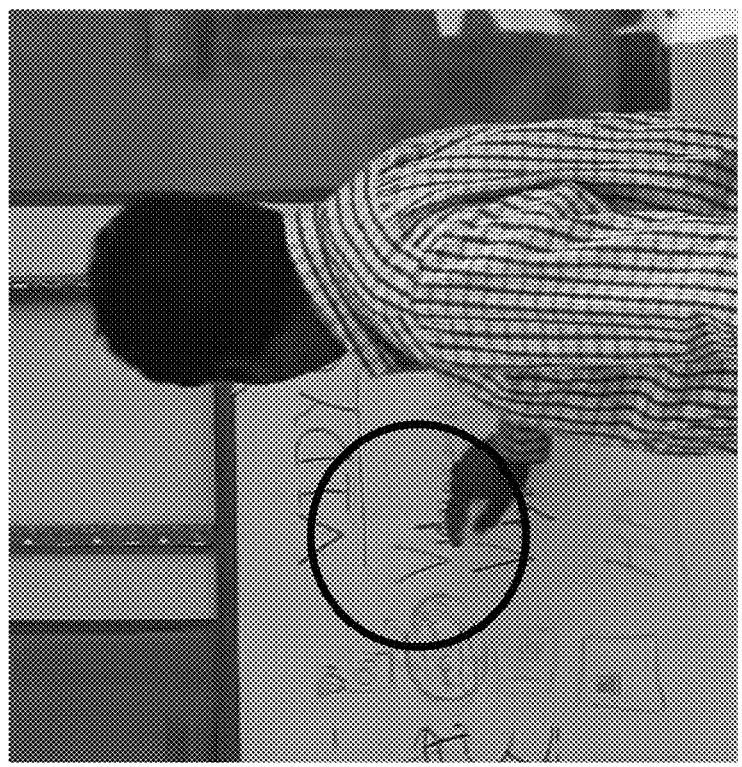
FIG. 36 shows the cropped part of a deblocked frame of the test sequence Vidyo3 in the case of the proposal. Test case: Low delay, High Efficiency, QP37.
Figure 35:
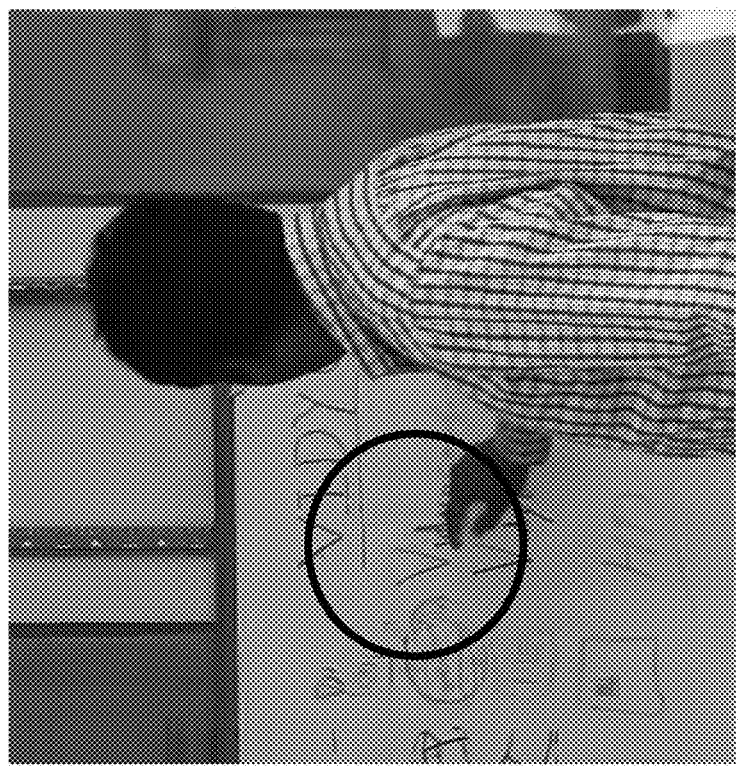
FIG. 35 shows the cropped part of a deblocked frame of the test sequence Vidyo3 in the case of the reference HM 2.0. Test case: Low delay, High Efficiency, QP37.

The reduction of color artifacts is illustrated in FIG. 35, a cropped part of a deblocked frame of the test sequence Vidyo3 is shown for the case of the reference HM2.0, low delay, high efficiency, QP37. FIG. 36 shows the same cropped part for the case of the proposed deblocking.

Figure 37:
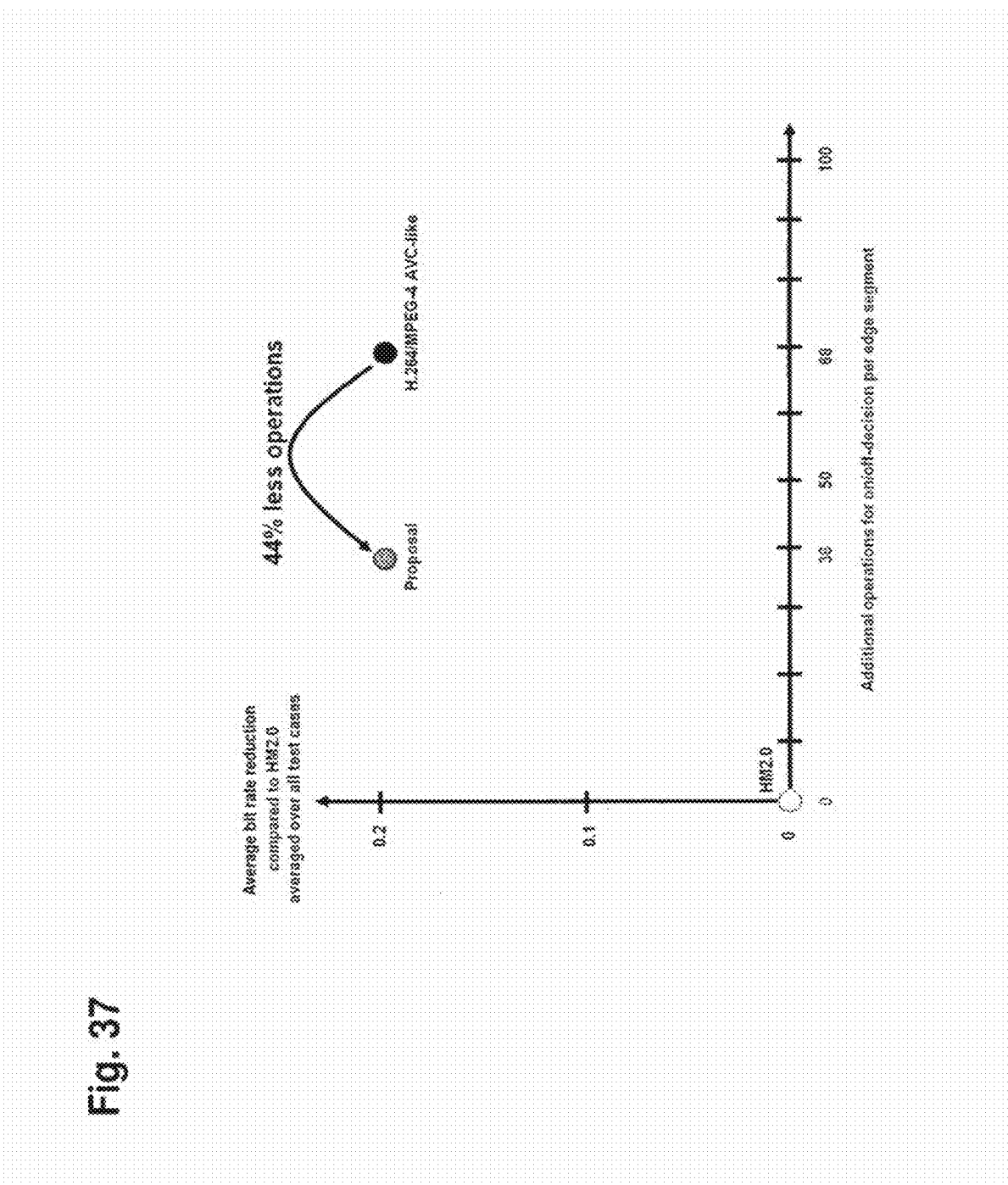
FIG. 37 illustrates the BD-bit rate reduction averaged over all test cases and test sequences versus additional number of required operations per edge segment compared to the reference HM2.0.

In the following the coding efficiency versus the complexity is described. In FIG. 37, the achieved bit rate reduction averaged over all test cases and test sequences is shown versus the additional number of required operations per edge segment of 8 lines/columns, both compared to the reference HM2.0. It can be observed that the decisions compromising H.264/MPEG-4 AVC achieve the same average bit rate reduction of 0.2% compared to the reference but with 44% less operations than decisions similar as in H.264/MPEG-4 AVC.

All embodiments of the present invention as described above can be combined.

The processing described in each of embodiments can be simply implemented in an independent computer system, by recording, in a recording medium, a program for implementing the configurations of the video coding method and the video decoding method described in each of embodiments. The recording media may be any recording media as long as the program can be recorded, such as a magnetic disk, an optical disk, a magnetic optical disk, an IC card, and a semiconductor memory.

Hereinafter, the applications to the video coding method and the video decoding method described in each of embodiments and systems using thereof will be described.

Figure 38:
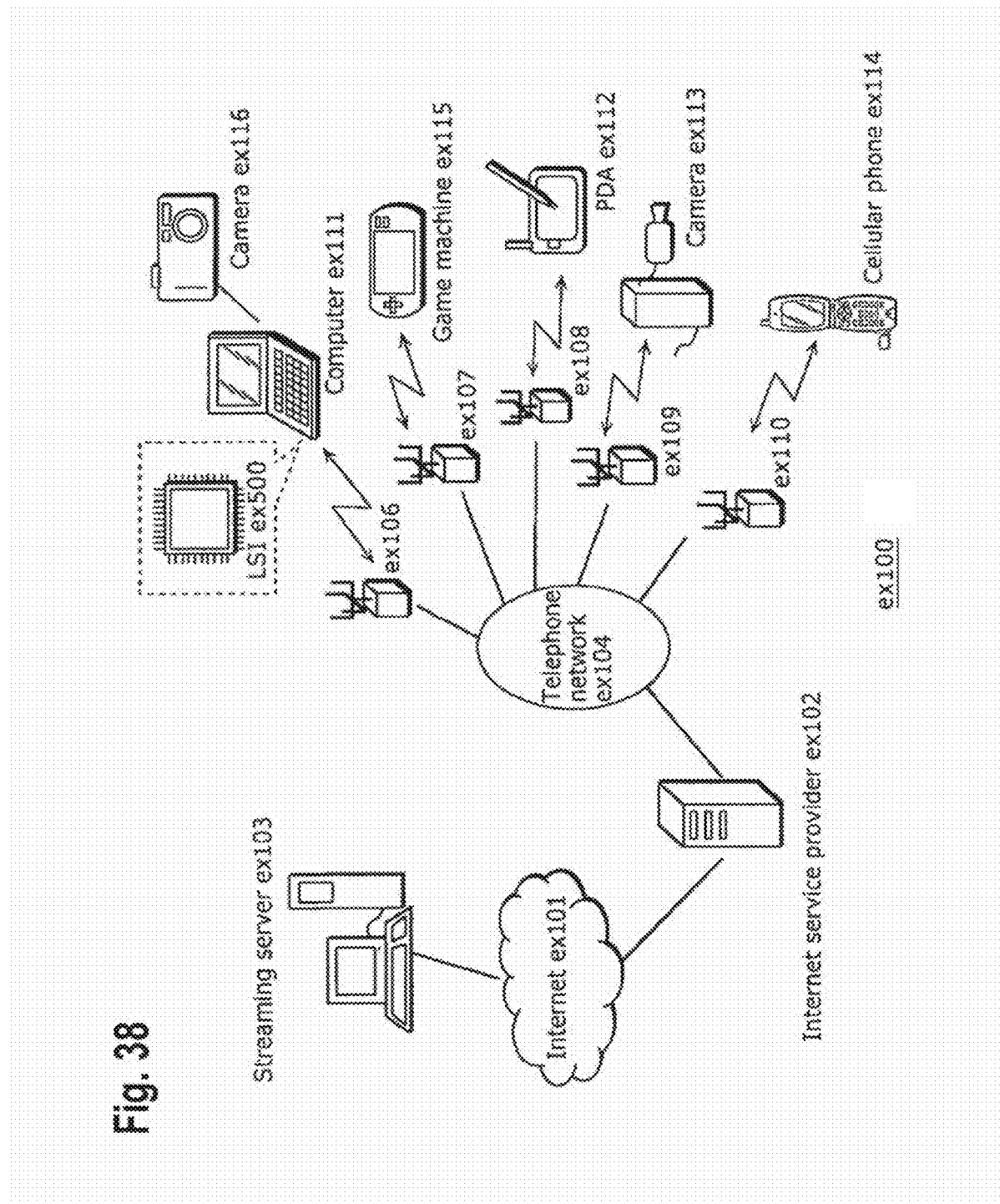
FIG. 38 is a schematic drawing illustrating an overall configuration of a content providing system for implementing content distribution services.

FIG. 38 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 38, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital video camera, is capable of capturing both still images and video.

Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments, and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the image data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100.

In other words, the clients can receive and decode information transmitted by the user, and reproduce the decoded data in real time in the content providing system ex100, so that the user who does not have any particular right and equipment can implement personal broadcasting.

Figure 39:
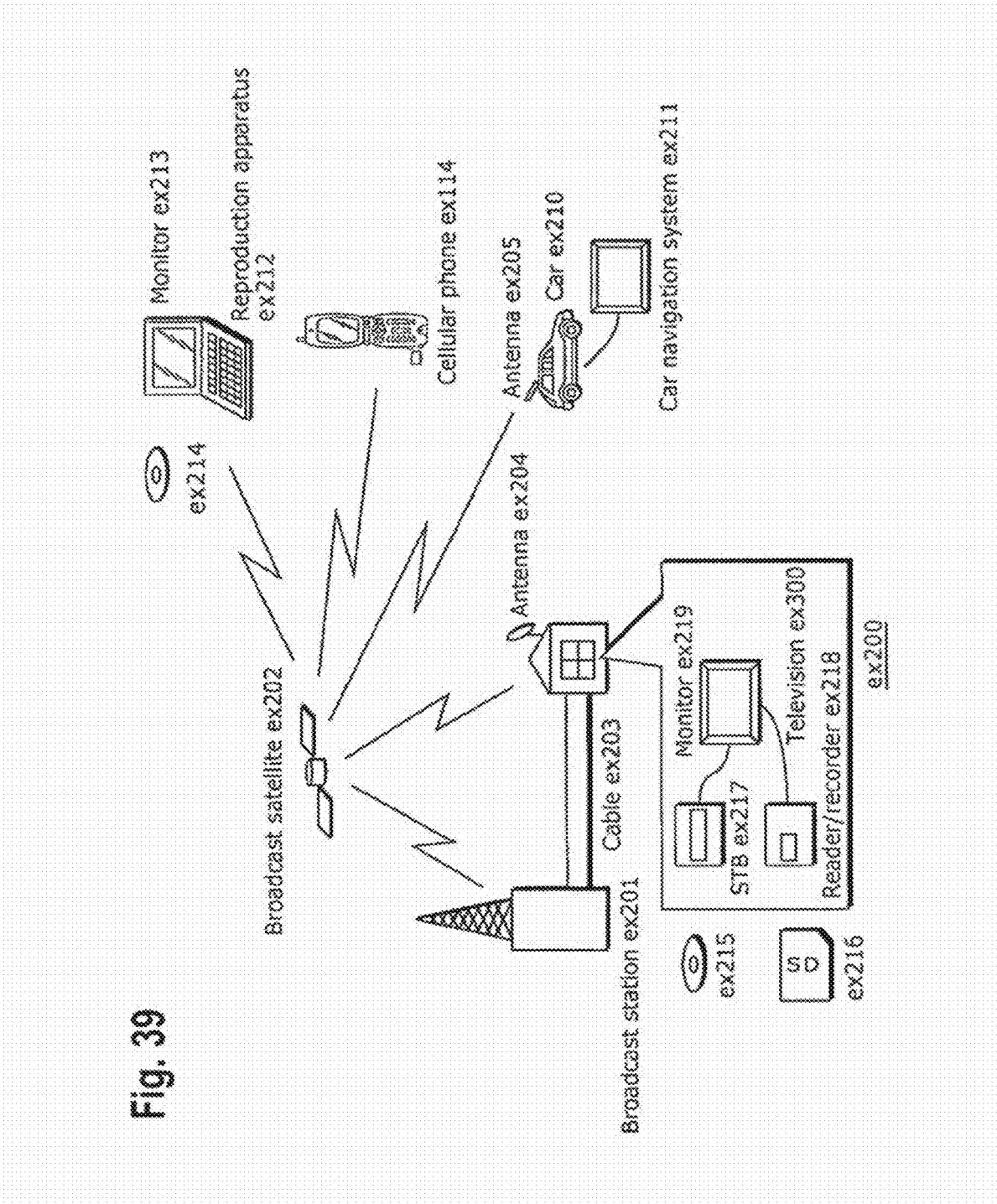
FIG. 39 is a schematic drawing illustrating an overall configuration of a digital broadcasting system.

Aside from the example of the content providing system ex100, at least one of the video coding apparatus and the video decoding apparatus described in each of embodiments may be implemented in a digital broadcasting system ex200 illustrated in FIG. 39. More specifically, a broadcast station ex201 communicates or transmits, via radio waves to a broadcast satellite ex202, multiplexed data obtained by multiplexing audio data and others onto video data. The video data is data coded by the video coding method described in each of embodiments. Upon receipt of the multiplexed data, the broadcast satellite ex202 transmits radio waves for broadcasting. Then, a home-use antenna ex204 with a satellite broadcast reception function receives the radio waves.

Next, a device such as a television (receiver) ex300 and a set top box (STB) ex217 decodes the received multiplexed data, and reproduces the decoded data.

Furthermore, a reader/recorder ex218 (i) reads and decodes the multiplexed data recorded on a recording media ex215, such as a DVD and a BD, or (i) codes video signals in the recording medium ex215, and in some cases, writes data obtained by multiplexing an audio signal on the coded data. The reader/recorder ex218 can include the video decoding apparatus or the video coding apparatus as shown in each of embodiments. In this case, the reproduced video signals are displayed on the monitor ex219, and can be reproduced by another device or system using the recording medium ex215 on which the multiplexed data is recorded. It is also possible to implement the video decoding apparatus in the set top box ex217 connected to the cable ex203 for a cable television or to the antenna ex204 for satellite and/or terrestrial broadcasting, so as to display the video signals on the monitor ex219 of the television ex300. The video decoding apparatus may be implemented not in the set top box but in the television ex300.

Figure 40:
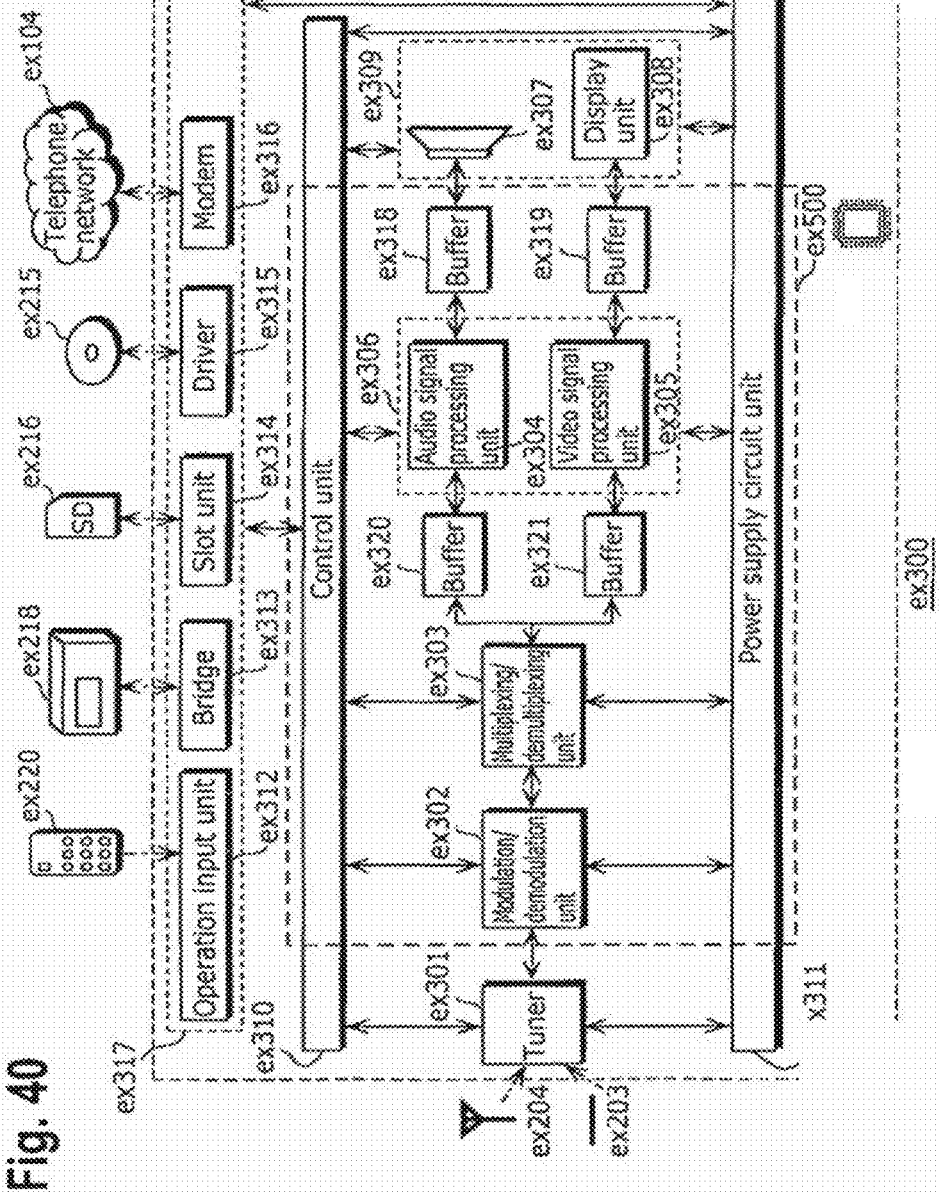
FIG. 40 is a block diagram illustrating an example of a configuration of a television.

FIG. 40 illustrates the television (receiver) ex300 that uses the video coding method and the video decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively; and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 41:
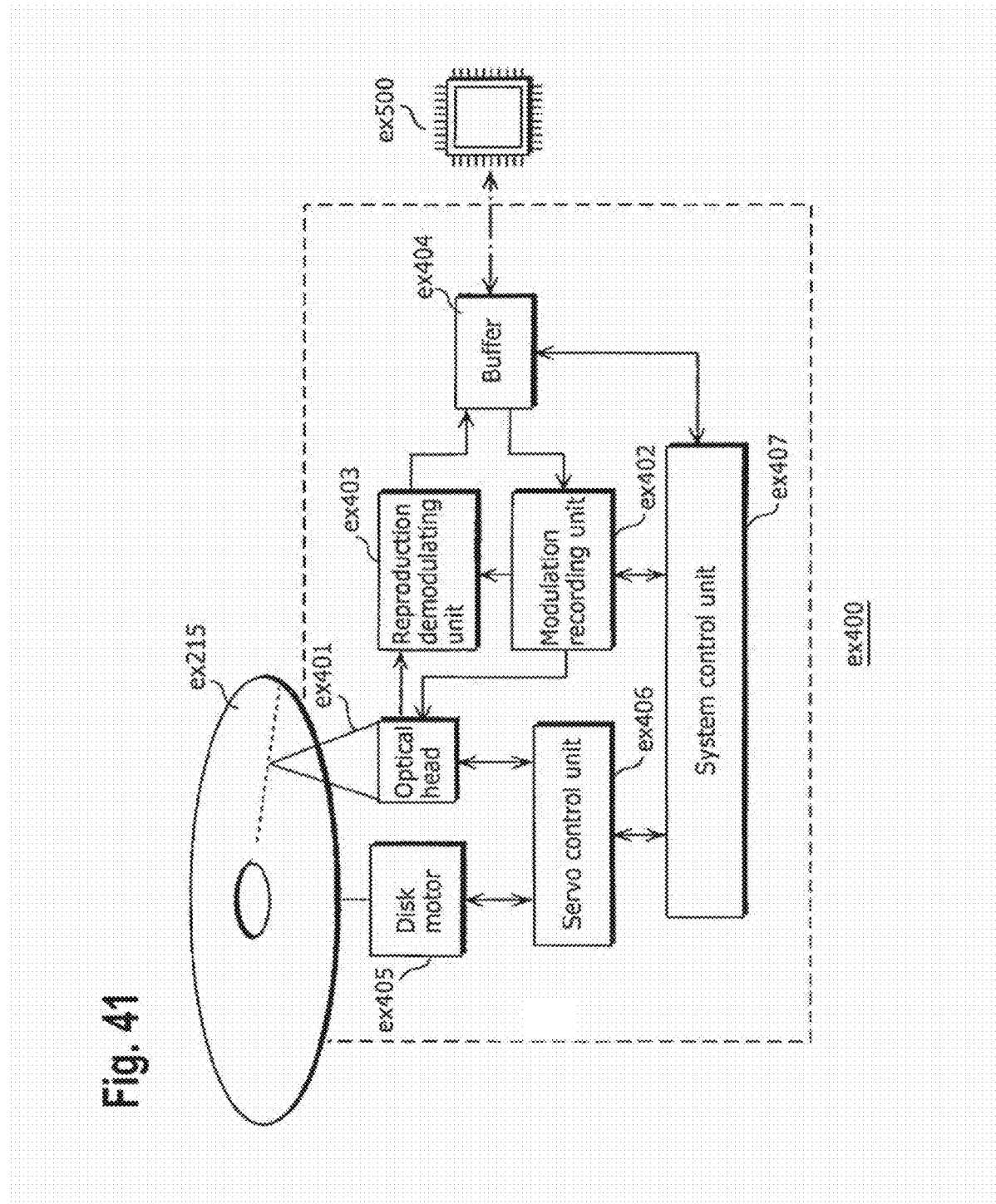
FIG. 41 is a block diagram illustrating an example of a configuration of an information reproducing/recording unit that reads and writes information from or on a recording medium that is an optical disk.

As an example, FIG. 41 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 42:
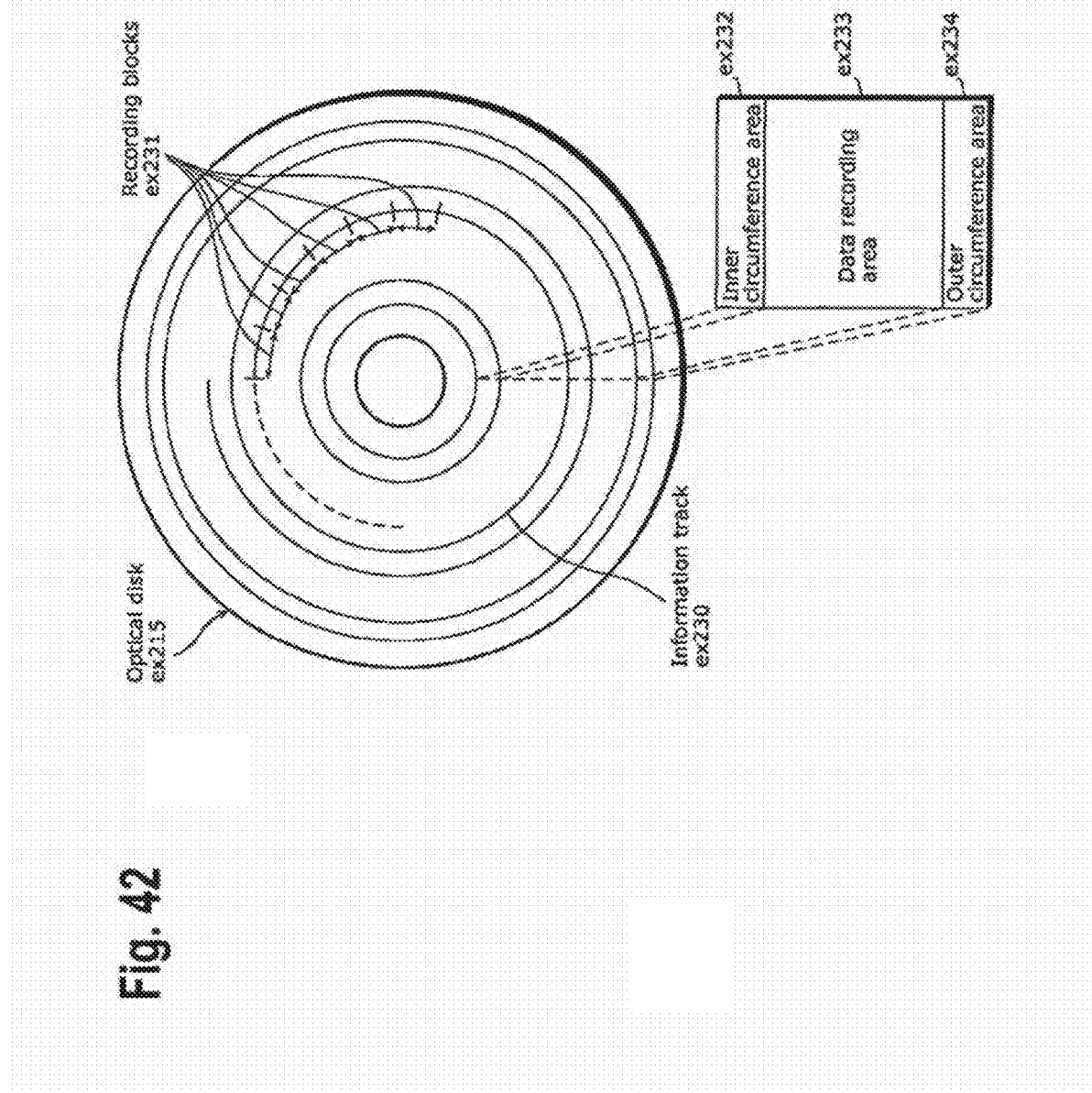
FIG. 42 is a schematic drawing showing an example of a configuration of a recording medium that is an optical disk.

FIG. 42 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 40. The same will be true for the configuration of the computer ex111, the cellular phone ex114, and others.

Figure 43A:
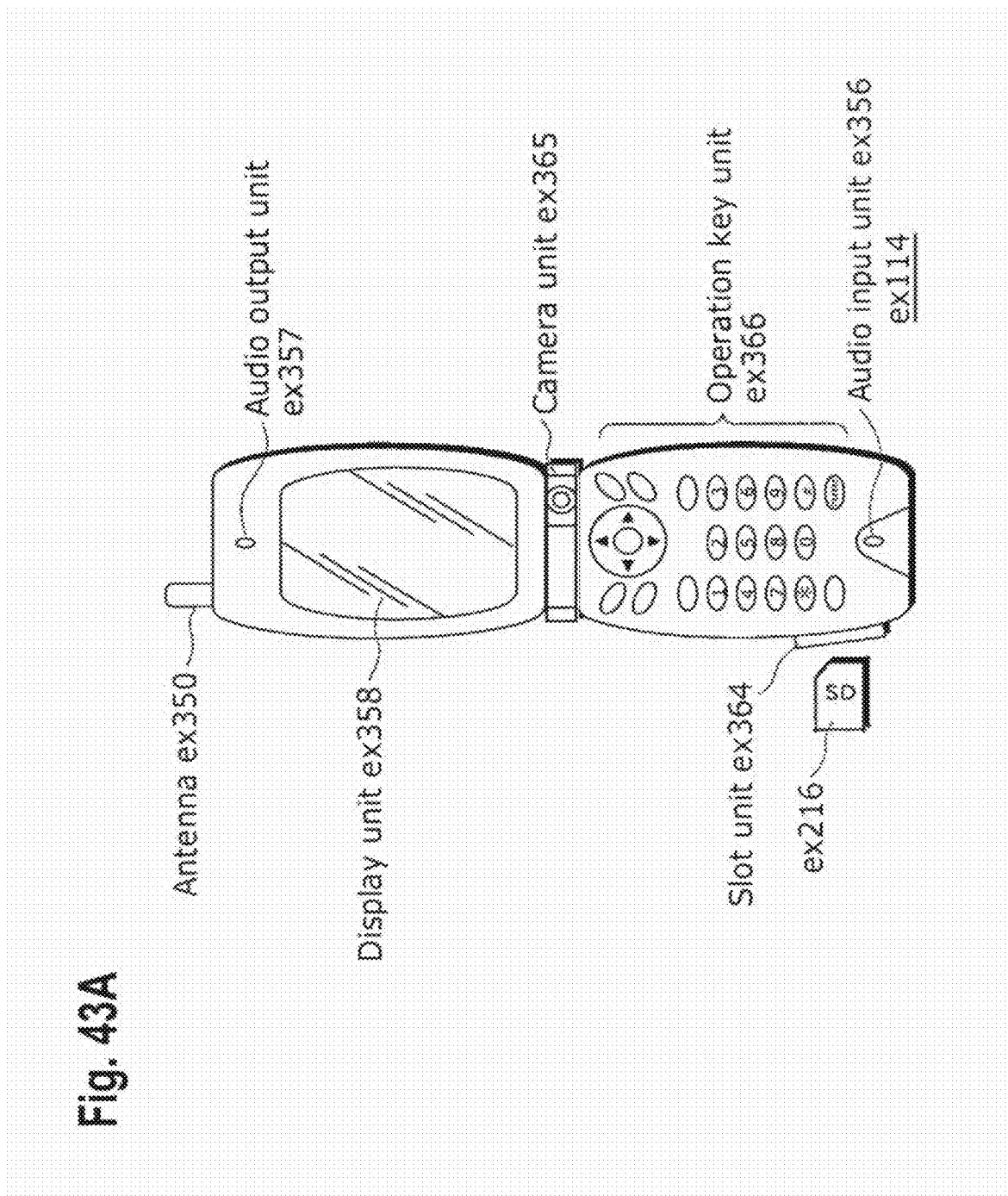
FIG. 43A is a schematic drawing illustrating an example of a cellular phone.

FIG. 43A illustrates the cellular phone ex114 that uses the video coding method and the video decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 43B:
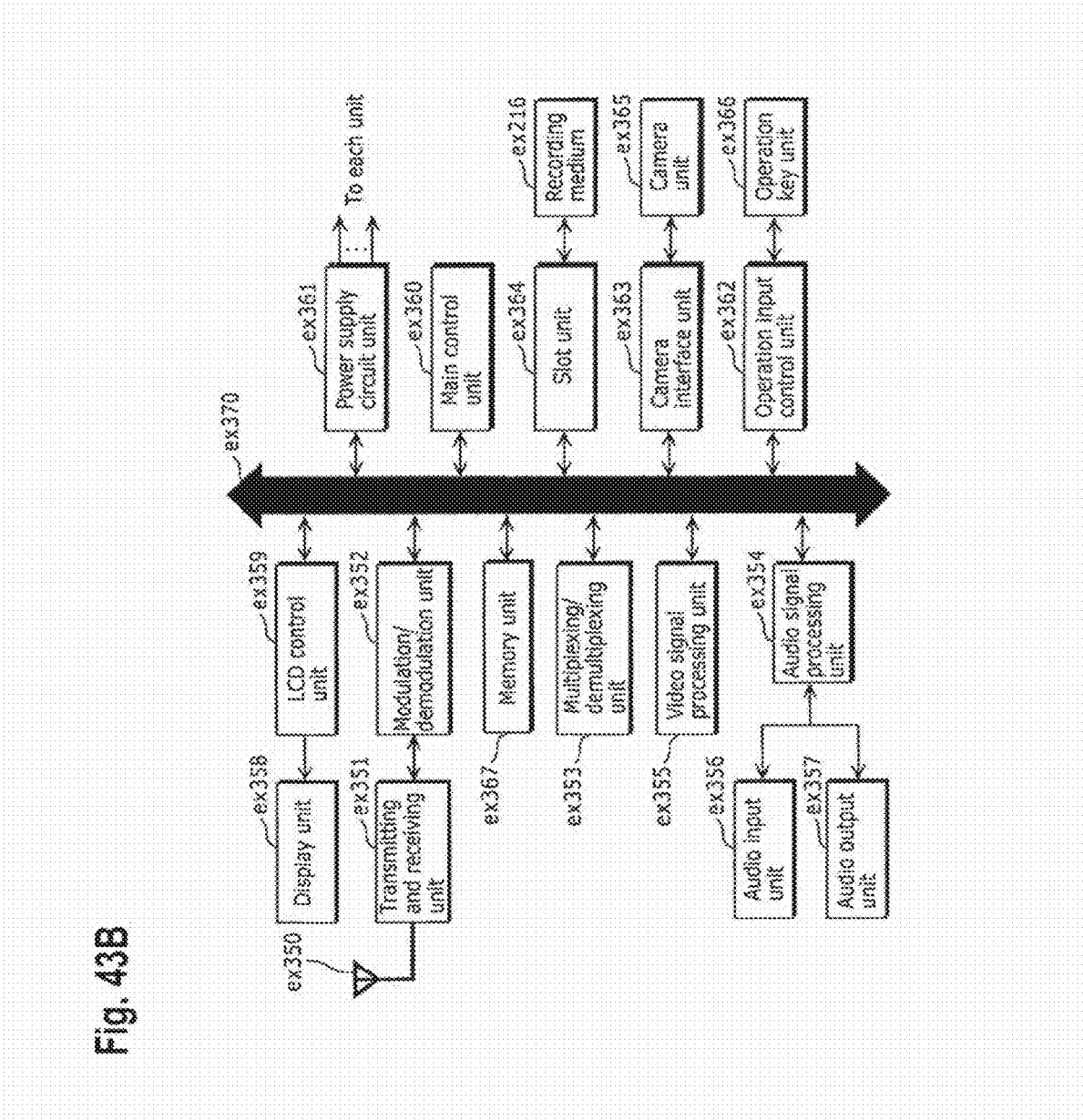
FIG. 43B is a block diagram showing an example of a configuration of the cellular phone.

Next, an example of a configuration of the cellular phone ex114 will be described with reference to FIG. 43B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350.

Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex356.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the video coding method shown in each of embodiments, and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method.

Then, the modulation/demodulation unit ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a video decoding method corresponding to the coding method shown in each of embodiments, and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the video coding method and the video decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Video data can be generated by switching, as necessary, between (i) the video coding method or the video coding apparatus shown in each of embodiments and (ii) a video coding method or a video coding apparatus in conformity with a different standard, such as MPEG-2, H.264/AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the video coding method and by the video coding apparatus shown in each of embodiments will be hereinafter described. The multiplexed data is a digital stream in the MPEG2-Transport Stream format.

Figure 44:
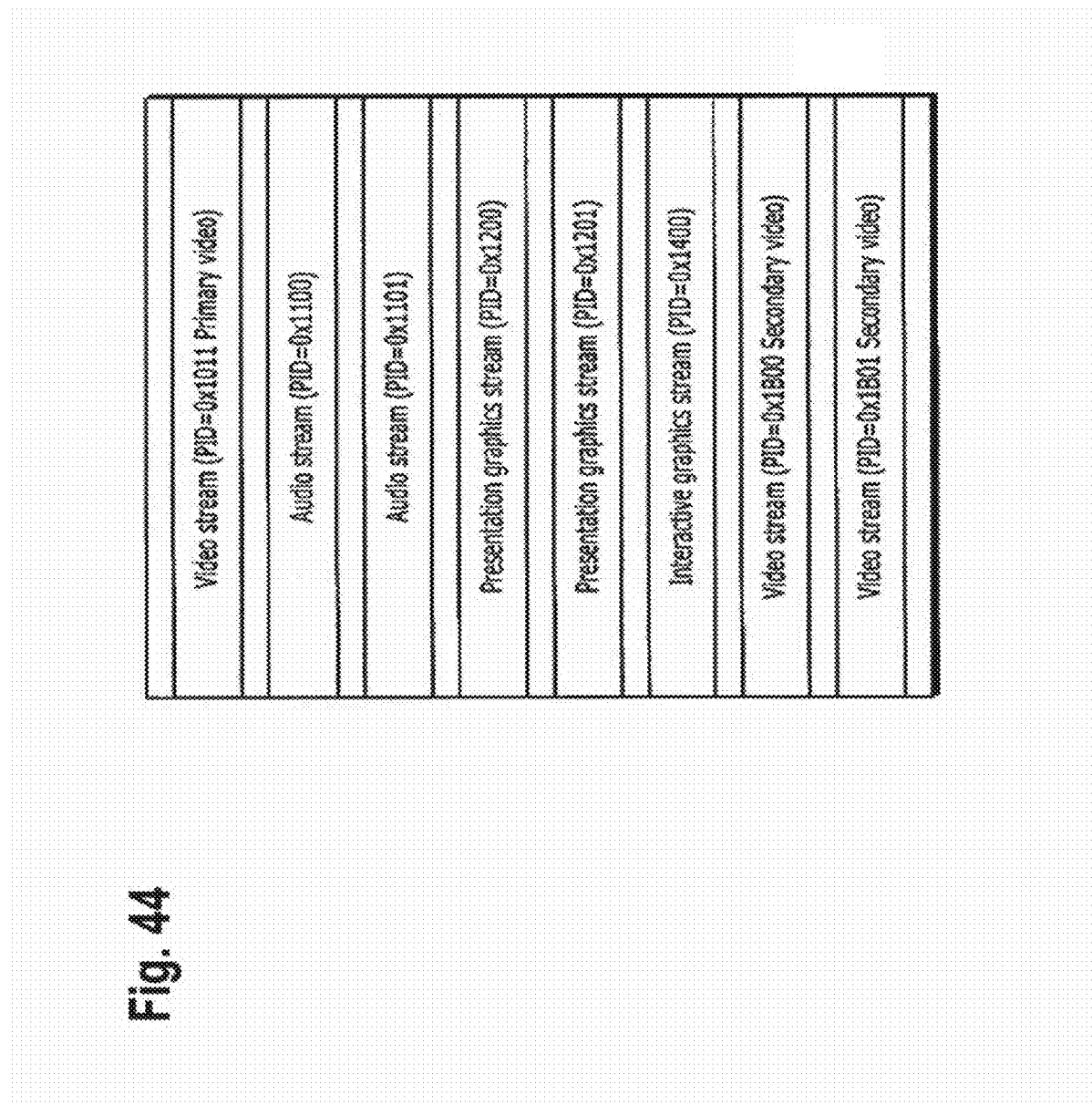
FIG. 44 is a schematic drawing showing a structure of multiplexed data.

FIG. 44 illustrates a structure of the multiplexed data. As illustrated in FIG. 44, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the video coding method or by the video coding apparatus shown in each of embodiments, or in a video coding method or by a video coding apparatus in conformity with a conventional standard, such as MPEG-2, H.264/AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary video to be mixed with the primary audio.

Figure 45:
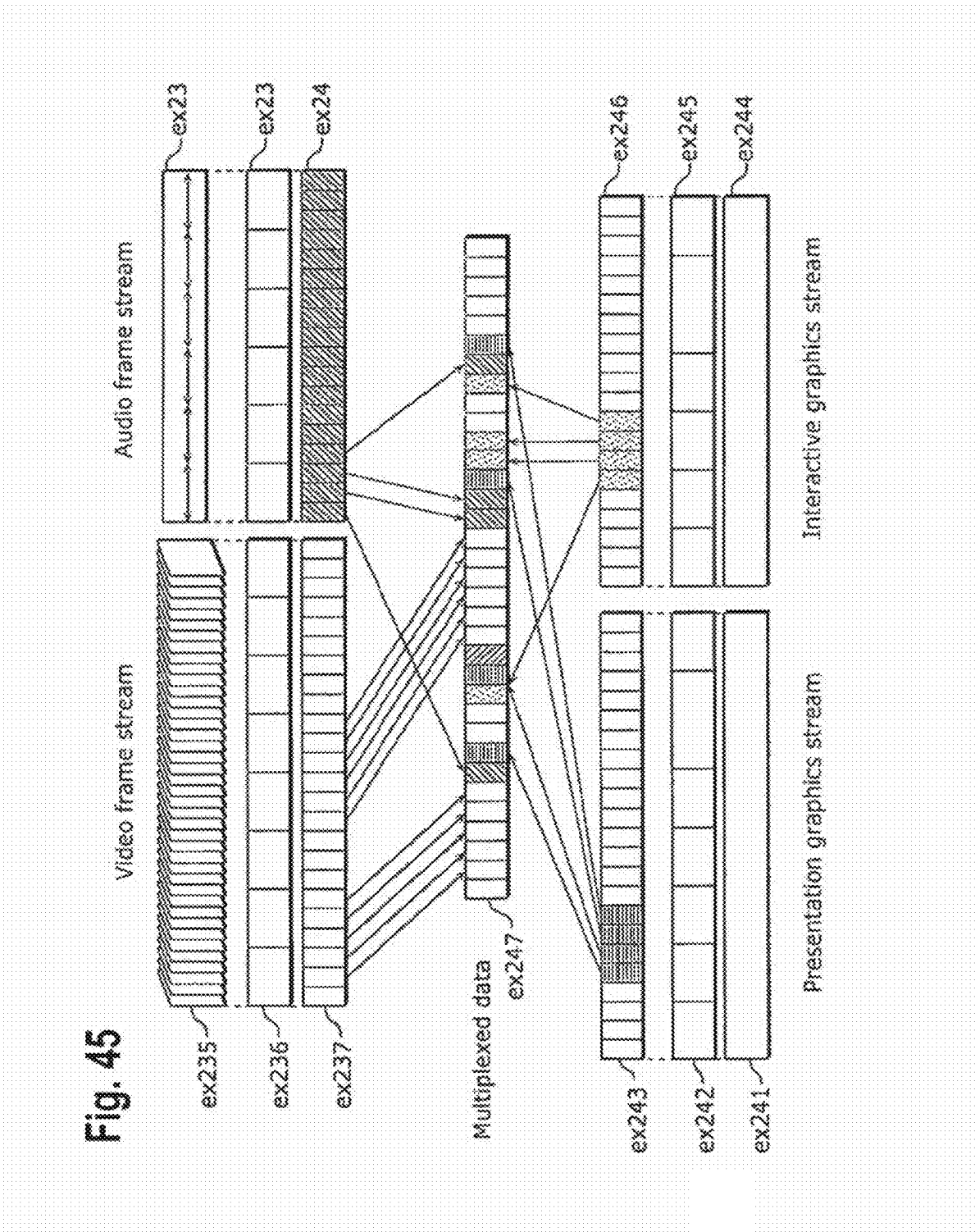
FIG. 45 is a drawing schematically illustrating how each of the streams is multiplexed in multiplexed data.

FIG. 45 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 46:
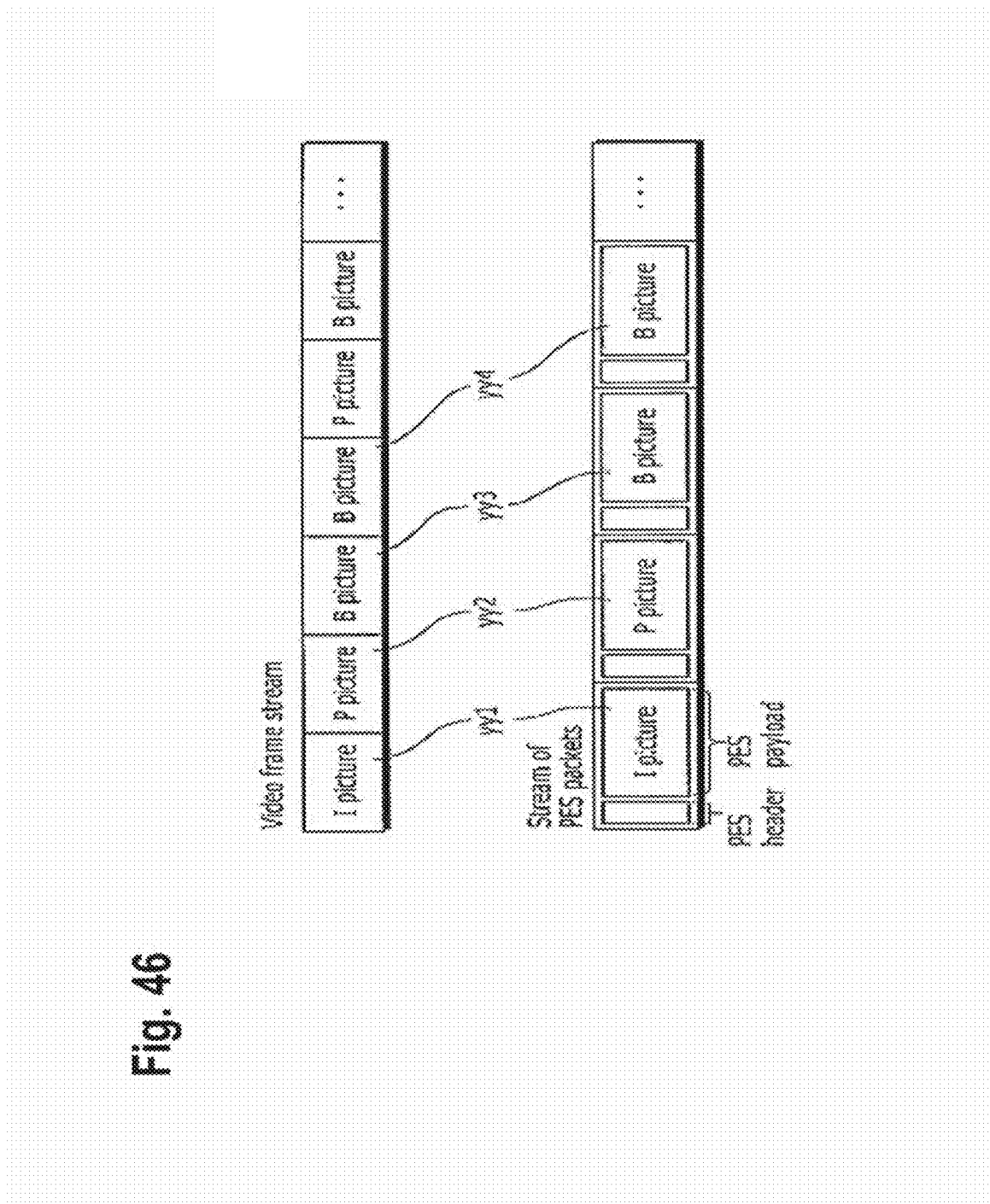
FIG. 46 is a schematic drawing illustrating how a video stream is stored in a stream of PES packets in more detail.

FIG. 46 illustrates how a video stream is stored in a stream of PES packets in more detail. The first bar in FIG. 20 shows a video frame stream in a video stream. The second bar shows the stream of PES packets. As indicated by arrows denoted as yy1, yy2, yy3, and yy4 in FIG. 20, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 47:
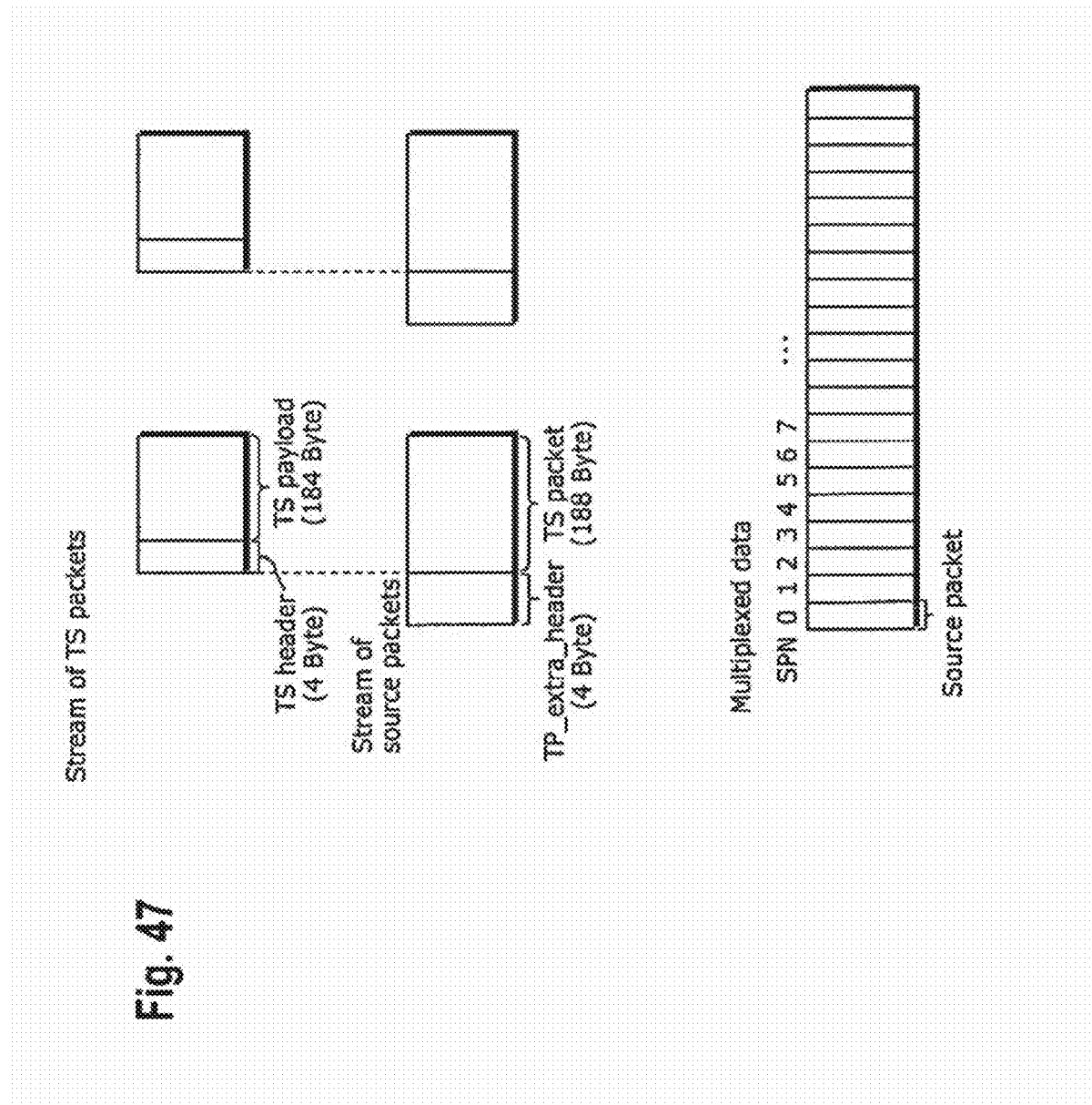
FIG. 47 is a schematic drawing showing a structure of TS packets and source packets in the multiplexed data.

FIG. 47 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 47. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 48:
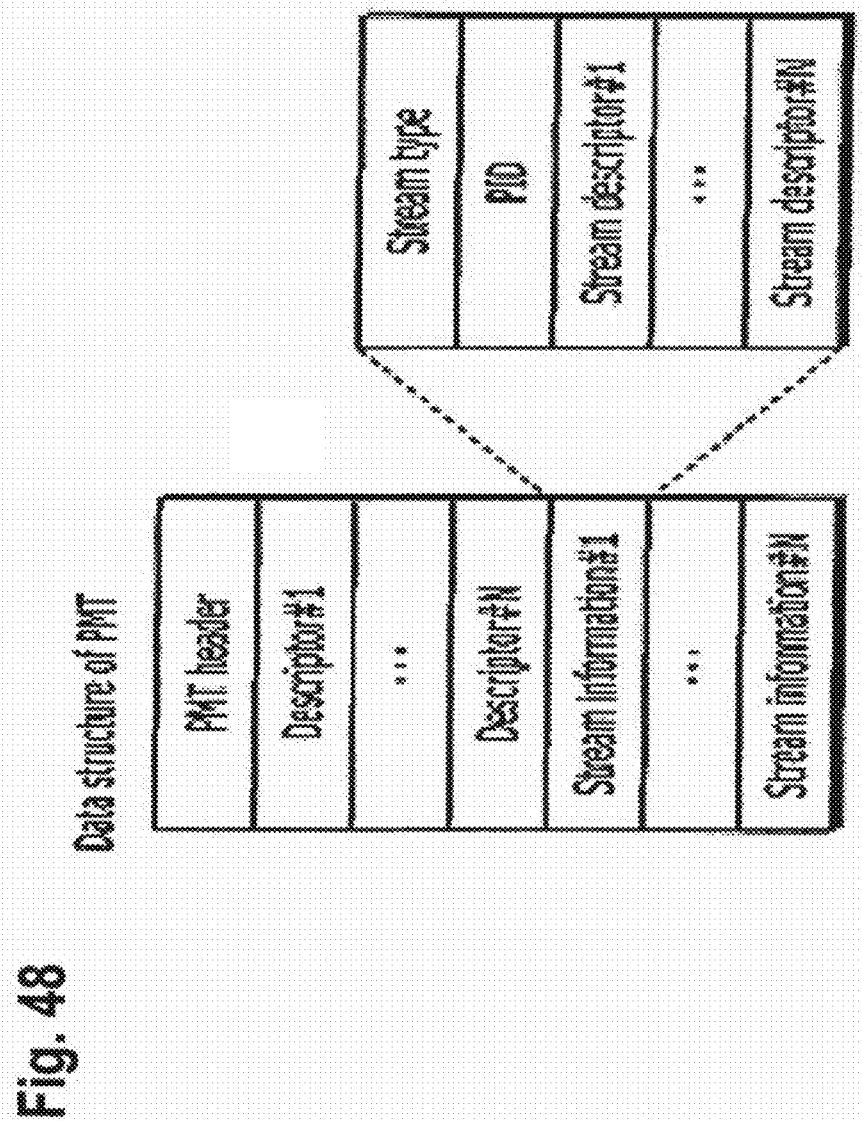
FIG. 48 is a schematic drawing showing a data structure of a PMT.

FIG. 48 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 49:
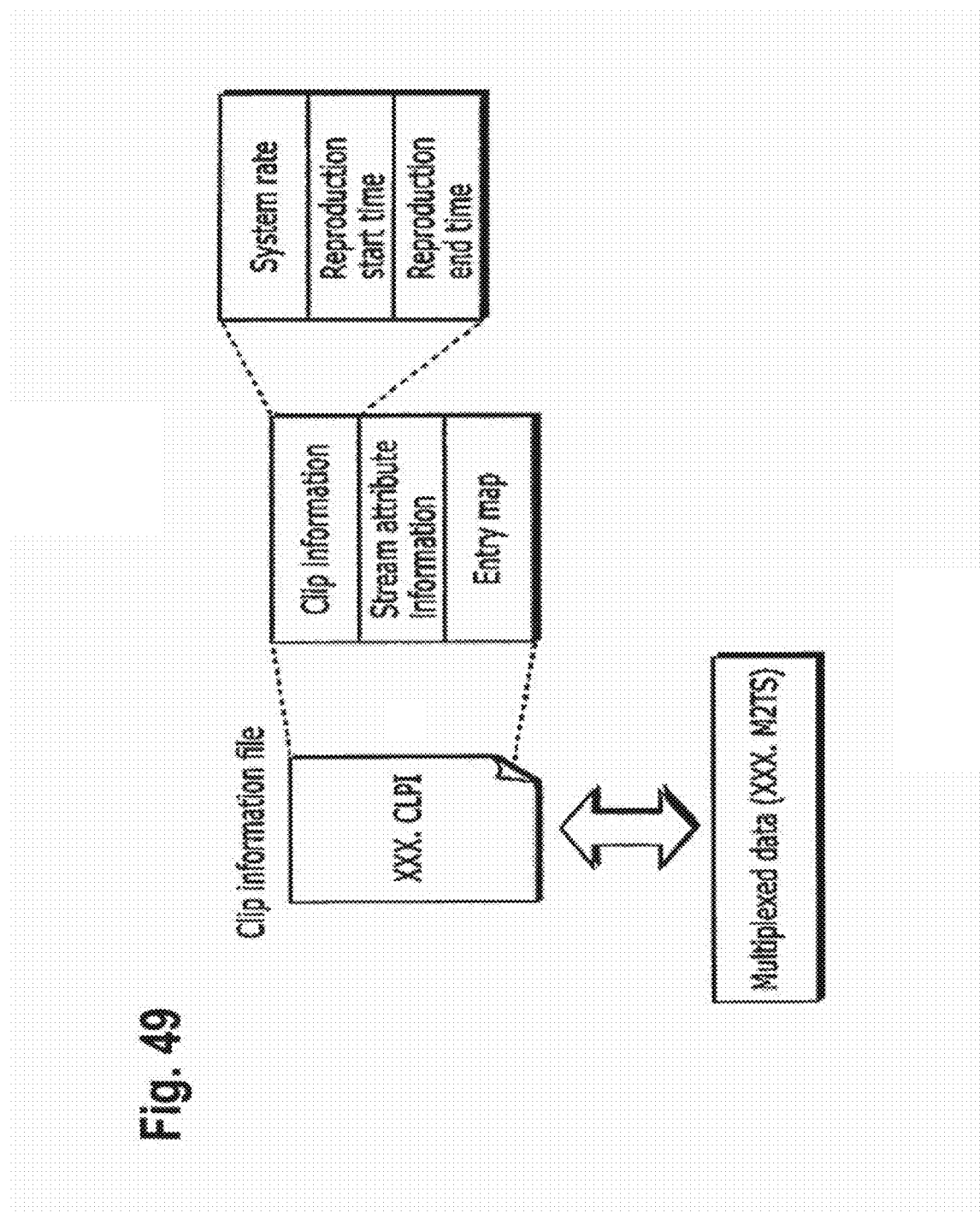
FIG. 49 is a schematic drawing showing an internal structure of multiplexed data information.

Each of the multiplexed data information files is management information of the multiplexed data as shown in FIG. 49. The multiplexed data information files are in one to one correspondence with the multiplexed data, and each of the files includes multiplexed data information, stream attribute information, and an entry map.

As illustrated in FIG. 49, the multiplexed data includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 50:
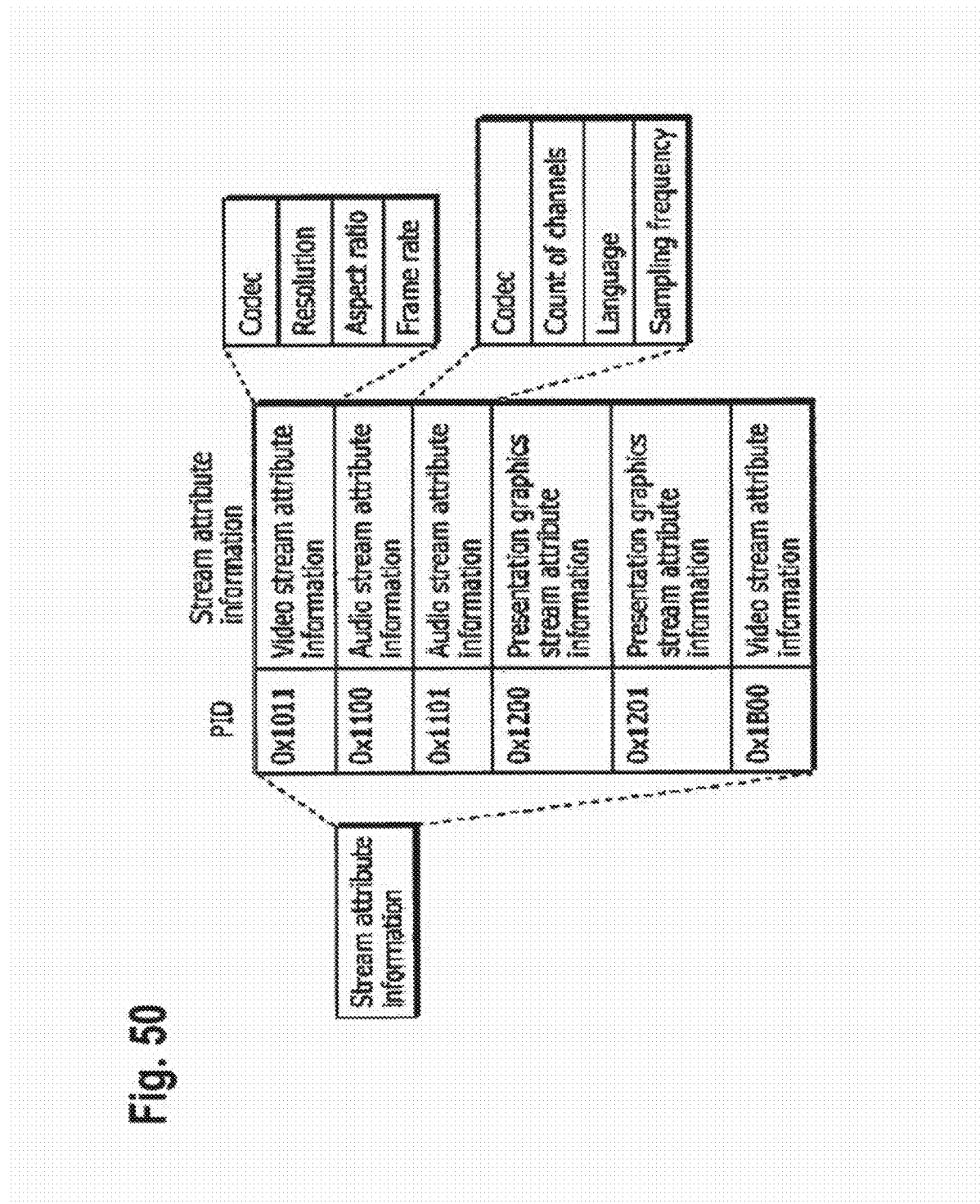
FIG. 50 is a schematic drawing showing an internal structure of stream attribute information.

As shown in FIG. 50, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

The multiplexed data to be used is of a stream type included in the PMT. Furthermore, when the multiplexed data is recorded on a recording medium, the video stream attribute information included in the multiplexed data information is used. More specifically, the video coding method or the video coding apparatus described in each of embodiments includes a step or a unit for allocating unique information indicating video data generated by the video coding method or the video coding apparatus in each of embodiments, to the stream type included in the PMT or the video stream attribute information. With the configuration, the video data generated by the video coding method or the video coding apparatus described in each of embodiments can be distinguished from video data that conforms to another standard.

Figure 51:
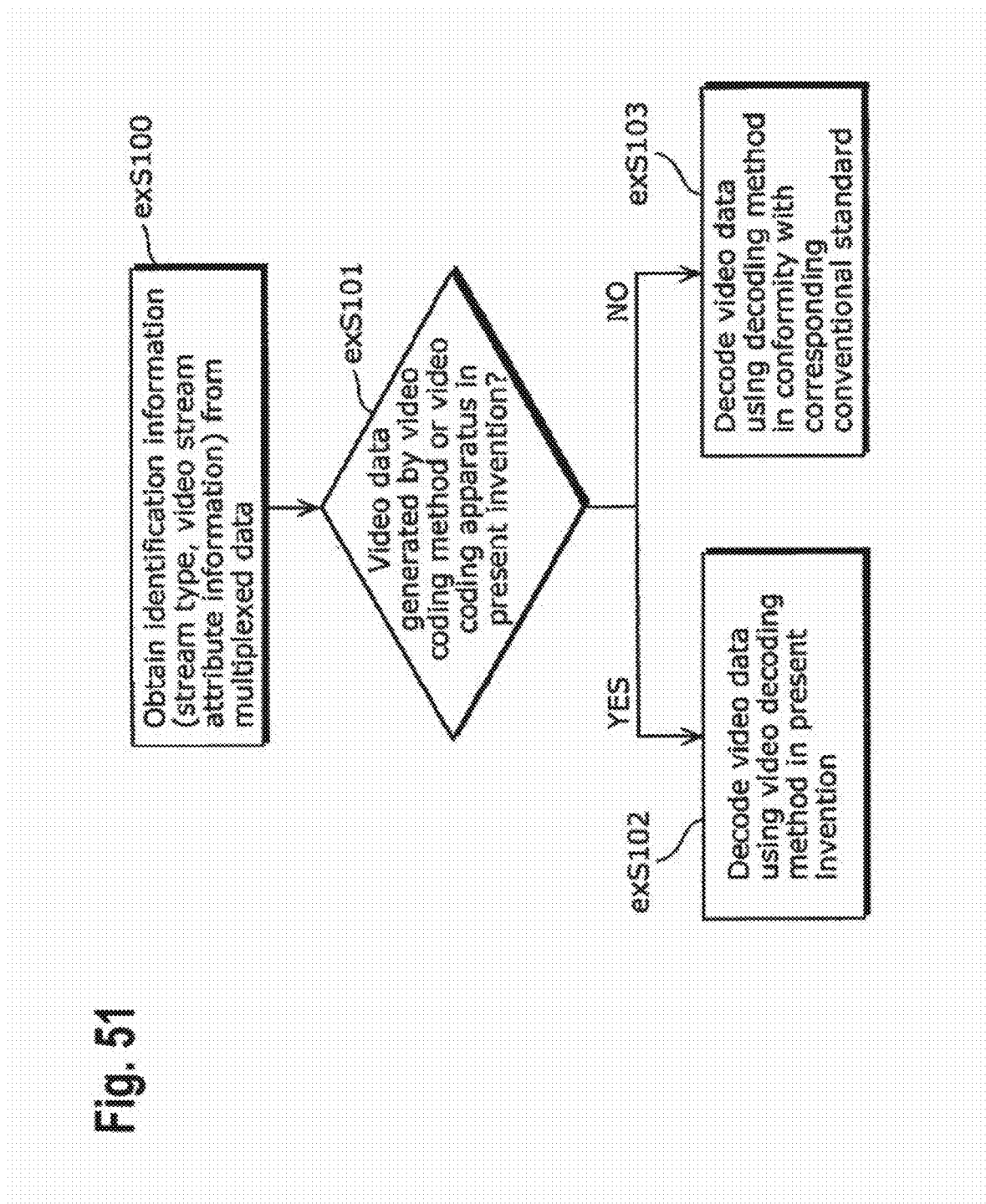
FIG. 51 is a schematic drawing showing steps for identifying video data.

Furthermore, FIG. 51 illustrates steps of the video decoding method. In Step exS100, the stream type included in the PMT or the video stream attribute information is obtained from the multiplexed data. Next, in Step exS101, it is determined whether or not the stream type or the video stream attribute information indicates that the multiplexed data is generated by the video coding method or the video coding apparatus in each of embodiments. When it is determined that the stream type or the video stream attribute information indicates that the multiplexed data is generated by the video coding method or the video coding apparatus in each of embodiments, in Step exS102, decoding is performed by the video decoding method in each of embodiments. Furthermore, when the stream type or the video stream attribute information indicates conformance to the conventional standards, such as MPEG-2, H.264/AVC, and VC-1, in Step exS103, decoding is performed by a video decoding method in conformity with the conventional standards.

As such, allocating a new unique value to the stream type or the video stream attribute information enables determination whether or not the video decoding method or the video decoding apparatus that is described in each of embodiments can perform decoding. Even when multiplexed data that conforms to a different standard, an appropriate decoding method or apparatus can be selected. Thus, it becomes possible to decode information without any error. Furthermore, the video coding method or apparatus, or the video decoding method or apparatus can be used in the devices and systems described above.

Figure 52:
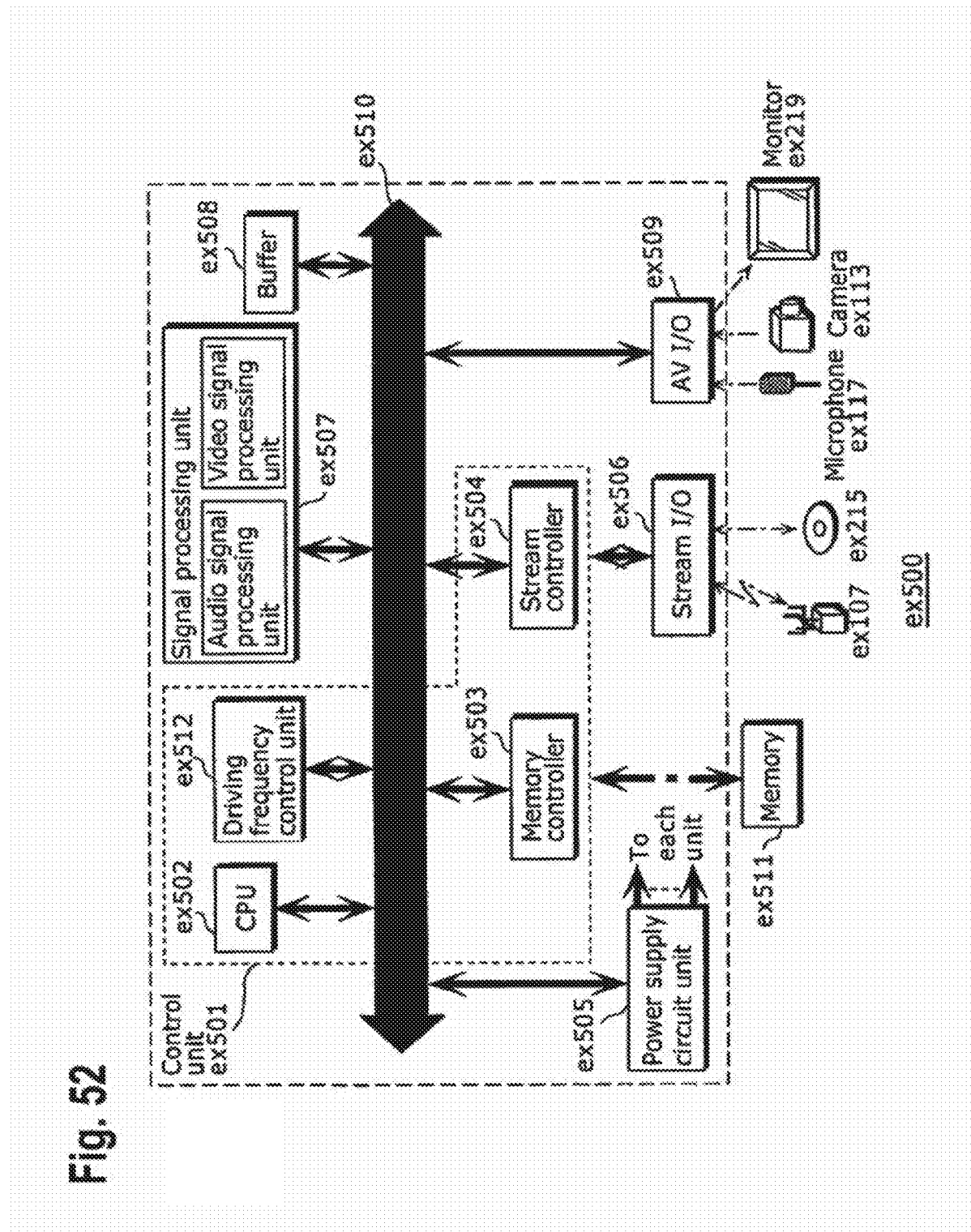
FIG. 52 is a schematic block diagram illustrating an example of a configuration of an integrated circuit for implementing the video coding method and the video decoding method according to each of embodiments.

Each of the video coding method, the video coding apparatus, the video decoding method, and the video decoding apparatus in each of embodiments is typically achieved in the form of an integrated circuit or a Large Scale Integrated (LSI) circuit. As an example of the LSI, FIG. 52 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV 10 ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream 10 ex506 provides the multiplexed data outside. The provided multiplexed data is transmitted to the base station ex107, or written on the recording media ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex510 includes the CPU ex502, the memory controller ex503, the stream controller ex504, the driving frequency control unit ex512, the configuration of the control unit ex510 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

When video data generated in the video coding method or by the video coding apparatus described in each of embodiments is decoded, compared to when video data that conforms to a conventional standard, such as MPEG-2, H.264/AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 53:
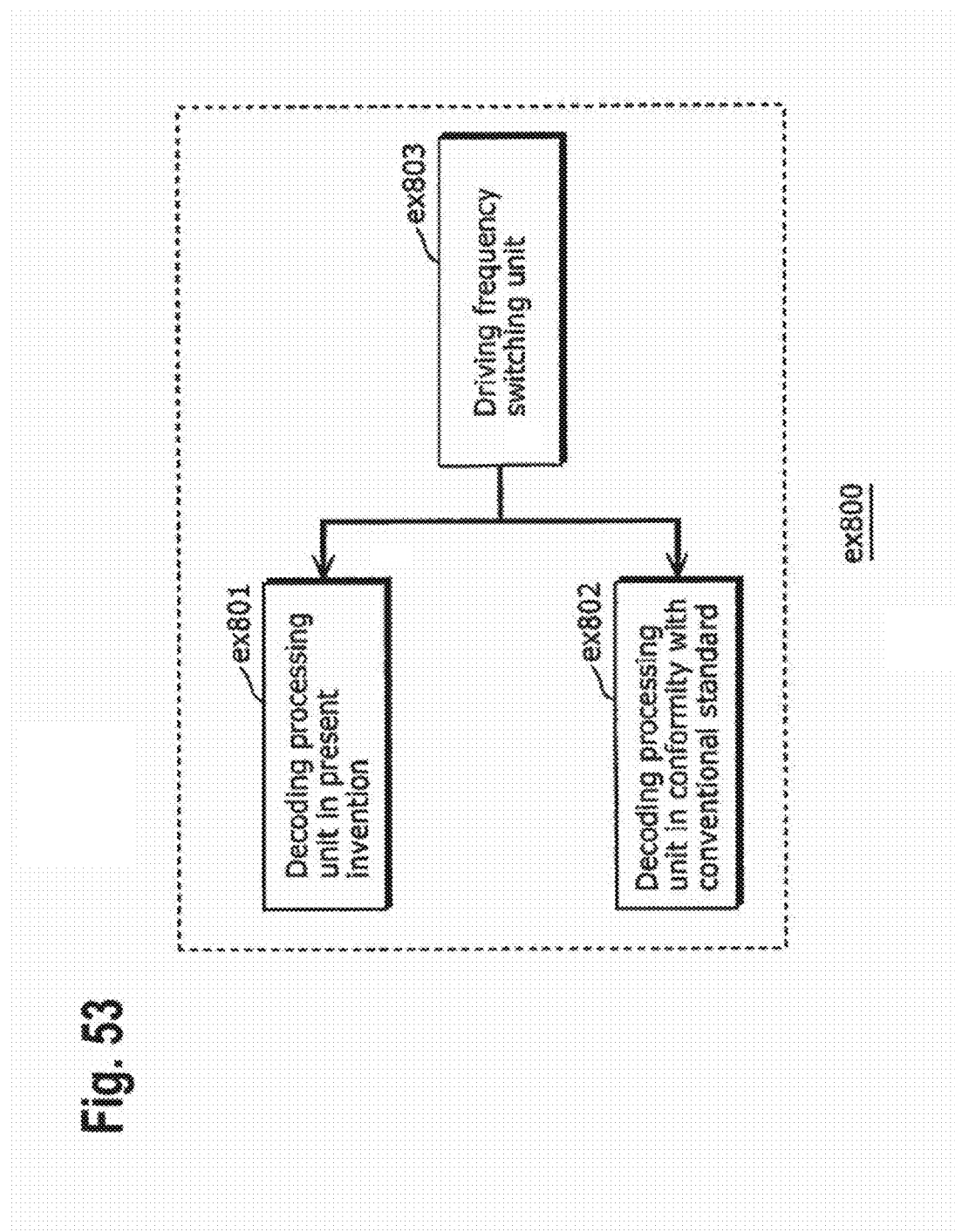
FIG. 53 is a schematic drawing showing a configuration for switching between driving frequencies.

In order to solve the problem, the video decoding apparatus, such as the television ex300 and the LSI ex500 is configured to determine to which standard the video data conforms, and switch between the driving frequencies according to the determined standard. FIG. 53 illustrates a configuration ex800. A driving frequency switching unit ex803 sets a driving frequency to a higher driving frequency when video data is generated by the video coding method or the video coding apparatus described in each of embodiments. Then, the driving frequency switching unit ex803 instructs a decoding processing unit ex801 that executes the video decoding method described in each of embodiments to decode the video data. When the video data conforms to the conventional standard, the driving frequency switching unit ex803 sets a driving frequency to a lower driving frequency than that of the video data generated by the video coding method or the video coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 26. Here, each of the decoding processing unit ex801 that executes the video decoding method described in each of embodiments and the decoding processing unit ex802 that conforms to the conventional standard corresponds to the signal processing unit ex507 in FIG. 50. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described is probably used for identifying the video data. The identification information is not limited to the one described above but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 55. The driving frequency can be selected by storing the look-up table in the buffer ex508 and in an internal memory of an LSI, and with reference to the look-up table by the CPU ex502.

Figure 54:
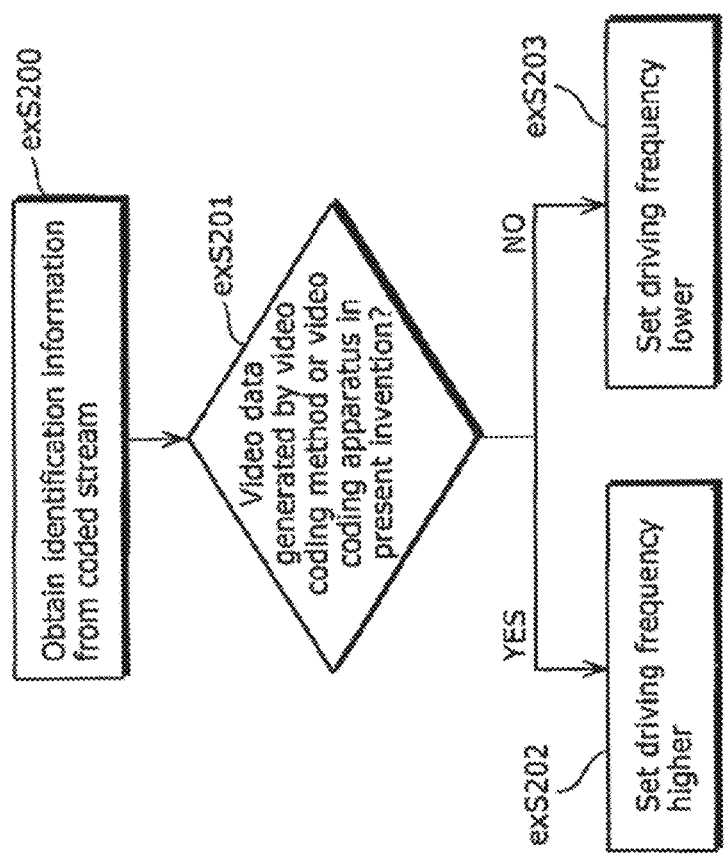
FIG. 54 is a schematic drawing showing steps for identifying video data and switching between driving frequencies.

FIG. 54 illustrates steps for executing a method. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the video coding method and the video coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, H.264/AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the video coding method and the video coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with H.264/AVC is larger than the processing amount for decoding video data generated by the video coding method and the video coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the video coding method and the video coding apparatus described in each of embodiments, the voltage to be applied to the LSI ex500 or the apparatus including the LSI ex500 is probably set higher. When the identification information indicates that the video data conforms to the conventional standard, such as MPEG-2, H.264/AVC, and VC-1, the voltage to be applied to the LSI ex500 or the apparatus including the LSI ex500 is probably set lower. As another example, when the identification information indicates that the video data is generated by the video coding method and the video coding apparatus described in each of embodiments, the driving of the CPU ex502 does not probably have to be suspended. When the identification information indicates that the video data conforms to the conventional standard, such as MPEG-2, H.264/AVC, and VC-1, the driving of the CPU ex502 is probably suspended at a given time because the CPU ex502 has extra processing capacity. Even when the identification information indicates that the video data is generated by the video coding method and the video coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, H.264/AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

There are cases where a plurality of video data that conforms to different standards, is provided to the devices and systems, such as a television and a mobile phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the video decoding method described in each of embodiments and the decoding processing unit that conforms to the conventional standard, such as MPEG-2, H.264/AVC, and VC-1 are partly shared. Ex900 in FIG. 56A shows an example of the configuration. For example, the video decoding method described in each of embodiments and the video decoding method that conforms to H.264/AVC have, partly in common, the details of processing, such as entropy coding, inverse quantization, deblocking filtering, and motion compensated prediction. The details of processing to be shared may include use of a decoding processing unit ex902 that conforms to H.264/AVC. In contrast, a dedicated decoding processing unit ex901 is probably used for other processing unique to the present invention. Since the present invention is characterized by application of deblocking filtering, for example, the dedicated decoding processing unit ex901 is used for such filtering. Otherwise, the decoding processing unit is probably shared for one of the entropy decoding, inverse quantization, spatial or motion compensated prediction, or all of the processing. The decoding processing unit for implementing the video decoding method described in each of embodiments may be shared for the processing to be shared, and a dedicated decoding processing unit may be used for processing unique to that of H.264/AVC.

Furthermore, ex1000 in FIG. 56B shows another example in that processing is partly shared. This example uses a configuration including a dedicated decoding processing unit ex1001 that supports the processing unique to the present invention, a dedicated decoding processing unit ex1002 that supports the processing unique to another conventional standard, and a decoding processing unit ex1003 that supports processing to be shared between the video decoding method in the present invention and the conventional video decoding method. Here, the dedicated decoding processing units ex1001 and ex1002 are not necessarily specialized for the processing of the present invention and the processing of the conventional standard, respectively, and may be the ones capable of implementing general processing. Furthermore, the configuration can be implemented by the LSI ex500.

As such, reducing the scale of the circuit of an LSI and reducing the cost are possible by sharing the decoding processing unit for the processing to be shared between the video decoding method in the present invention and the video decoding method in conformity with the conventional standard.

Most of the examples have been outlined in relation to an H.264/AVC based video coding system, and the terminology mainly relates to the H.264/AVC terminology. However, this terminology and the description of the various embodiments with respect to H.264/AVC based coding is not intended to limit the principles and ideas of the invention to such systems. Also the detailed explanations of the encoding and decoding in compliance with the H.264/AVC standard are intended to better understand the exemplary embodiments described herein and should not be understood as limiting the invention to the described specific implementations of processes and functions in the video coding. Nevertheless, the improvements proposed herein may be readily applied in the video coding described. Furthermore the concept of the invention may be also readily used in the enhancements of H.264/AVC coding and/or HEVC currently discussed by the JCT-VC.

To summarize, the present invention relates to deblocking filtering, which may be advantageously applied for block-wise encoding and decoding of image or video signal. In particular, the present invention relates to performing an efficient and accurate decision on whether or not to apply deblocking filtering on an image block. The efficient and accurate decision is achieved by performing individual decisions on whether or not to apply deblocking filtering for segments of a boundary between adjacent image blocks, wherein the individual decision are based on pixels comprised in a subset of the pixel lines that the image blocks are composed of.

The invention claimed is:

1. An apparatus for processing an image to provide deblocking filtering, the image being divided into a plurality of blocks, each block including a plurality of pixel lines perpendicular to a boundary with a block, the apparatus comprising:
a processor; and
a non-transitory memory having stored thereon executable instructions, which when executed, cause the processor to perform the steps of:
dividing one or more of the plurality of blocks into a plurality of portions fewer than the plurality of pixel lines, each of the plurality of portions consisting of two or more pixel lines, and each of the plurality of portions having a number of the two or more pixel lines less than all of the plurality of pixel lines;

calculating a decision value for each of the plurality of portions of a block based on values of pixels in a subset of pixel lines of the block;

judging whether or not to apply a deblocking filter to each of the plurality of portions of the block based on the respective decision value calculated for the portion; and applying the deblocking filter to each of the plurality of portions of the block, when the step of judging judges to apply the deblocking filter to each of the plurality of portions of the block, wherein the step of judging whether or not to apply a deblocking filter to each of the plurality of portions of the block includes a step of comparing the respective decision value calculated for the portion with a threshold value, and wherein each of the subset of pixel lines locates at a different position from each other in the block.

2. The apparatus according to claim 1, wherein the block size is 8×8, the subset of pixel lines includes 1st line of the block and 8th line of the block.

* * * * *